US012346635B2

(12) United States Patent
Horsman et al.

(10) Patent No.: US 12,346,635 B2
(45) Date of Patent: Jul. 1, 2025

(54) TILE PLANNING AND DESIGN

(71) Applicant: Soil-Max, Inc., Terre Haute, IN (US)

(72) Inventors: Bryan David Horsman, Terre Haute, IN (US); Ryan Christopher Zook, Clinton, IN (US); Joseph Henry Irwin, Jr., West Terre Haute, IN (US); Brian Allan Dewey, Mount Prospect, IL (US)

(73) Assignee: SOIL-MAX, INC., Terre Haute, IN (US)

( * ) Notice: Subject to any disclaimer, the term of this patent is extended or adjusted under 35 U.S.C. 154(b) by 893 days.

(21) Appl. No.: 17/403,652

(22) Filed: Aug. 16, 2021

(65) Prior Publication Data

US 2022/0050935 A1 Feb. 17, 2022

Related U.S. Application Data

(60) Provisional application No. 63/066,622, filed on Aug. 17, 2020.

(51) Int. Cl.
*G06F 30/13* (2020.01)
*G06F 30/12* (2020.01)
*G06F 113/08* (2020.01)

(52) U.S. Cl.
CPC .............. *G06F 30/13* (2020.01); *G06F 30/12* (2020.01); *G06F 2113/08* (2020.01)

(58) Field of Classification Search
CPC ................................ G06F 30/13; G06F 30/12
See application file for complete search history.

(56) References Cited

U.S. PATENT DOCUMENTS

2016/0275211 A1* 9/2016 Shuler ..................... G06F 30/13
2018/0349520 A1* 12/2018 Bhalla ................ G06Q 10/0631
2019/0050510 A1* 2/2019 Mewes .................. G06N 3/045
2019/0230875 A1* 8/2019 Mewes ................ A01B 79/005
2020/0071912 A1* 3/2020 Kennedy ............... G06T 19/006

OTHER PUBLICATIONS

Falasy, A. and Cooke R. (2024), "Development of Application Tools for Burying and Sizing of Subsurface Drain Tiles", Irrigation & Drainage Systems Engineering, vol. 13, Issue 1 (Year: 2024).*

* cited by examiner

*Primary Examiner* — Bijan Mapar
(74) *Attorney, Agent, or Firm* — Goodhue, Coleman & Owens, P.C.

(57) ABSTRACT

A computer implemented method for drainage tile planning includes steps of presenting a first user interface to a user associated with a field in which drainage tile is to be installed and defining a set of drainage tile plan requirements by receiving through the first user interface and from the user associated with the field by: defining a boundary around the field by displaying a map including the field and receiving through the first user interface and from the user associated with the field a plurality of selections by the user associated with the field of edges of the field displayed on the map, and defining at least one desired drainage outlet position within the field by receiving through the user interface and from the user associated with the field a selection of the at least one desired drainage outlet position on the map.

18 Claims, 97 Drawing Sheets

| Name | Pipe | Length (ft) | Min Grade (%) | Min Depth (in) | Max Depth (in) | Target Depth (in) |
|---|---|---|---|---|---|---|
| M1 | 12" Dual Wall | 60 | 0.05 | 47 | 48 | 48 |
| M2 | 8" Knife Cut | 1,479 | 0.08 | 41 | 60 | 44 |
| M3 | 8" Knife Cut | 995 | 0.08 | 41 | 60 | 42 |
| M4 | 6" Knife Cut | 1,004 | 0.10 | 32 | 48 | 36 |
| M5 | 6" Knife Cut | 348 | 0.10 | 32 | 48 | 36 |
| M6 | 6" Knife Cut | 245 | 0.10 | 32 | 48 | 36 |
| M7 | 6" Knife Cut | 1,152 | 0.10 | 34 | 48 | 40 |
| M8 | 6" Knife Cut | 756 | 0.10 | 40 | 48 | 42 |
| M9 | 6" Dual Wall | 20 | 0.10 | 42 | 44 | 42 |

882

FIG. 95
950
FLOW-X
9214
924
Speed:
1
Map
Accuracy:
4 m
922
9216
952
Soilmax
926
9218
S 1st St
928
Google
Stop Tracking
942

TILE PLANNING AND DESIGN

RELATED APPLICATIONS

This application claims priority to U.S. Provisional Patent Application No. 63/066,622, filed Aug. 17, 2020, hereby incorporated by reference in its entirety.

FIELD OF THE INVENTION

The present invention relates to agricultural drainage tile. More particularly, but not exclusively, the present invention relates to methods and systems for facilitating agricultural tile planning and design.

BACKGROUND

There are numerous advantages provided by installing proper drainage tile systems. These include improved crop health and growth, allowing earlier planting, reduction of financial risks, and environmental benefits. Therefore, it is desirable to install drainage tile systems in agricultural land. However, landowners typically have limited knowledge and experience regarding planning and designing tile systems. Therefore, they need to rely upon the services of others such as the company that sells the drainage tile or the company which installs the drainage tile. There may be problems with doing so.

Installing a tile system can be an expensive endeavor both in terms of costs of the tile as well as the installation costs. Where the company that sells the tile is also developing the tile plan there is the concern that the tile plan may be biased towards using more tile lines than necessary. Similarly, if the company performing installation is also developing the tile plan the tile plan may be biased towards what is most financially beneficial for the company or is otherwise most aligned with their capabilities or preferences. They also may have limited experience or training regarding designing tile plans. Where landowners are installing tile themselves, landowners may not be comfortable or experienced with independently developing their own tile plans and may make mistakes which result in unnecessary time and expense or a tile drainage system which underperforms. What is needed are independent and professional tile plans and designs.

A further problem relates to identifying and collecting data necessary for completion of a proper tile plan and design. There are numerous pieces of data related to the field, its use, a landowner's use of the field, and factors that may impact the creation and implementation of a tile plan. Yet because of a lack of a systematic approach, failure to obtain relevant data and incorporate such data into a tile plan results in tile plans that are not effective, less effective, more expensive than required, or otherwise sub-optimal.

Therefore, what is needed are improved methods and systems for facilitating the data collection and creation of appropriate tile plans.

SUMMARY

Therefore, it is a primary object, feature, or advantage of the present invention to improve over the state of the art.

It is a further object, feature, or advantage of the present invention to provide methods and systems to facilitate tile planning and design including by connecting landowners in need of a tile design with tile designers willing and able to provide such services.

It is a still further object, feature, or advantage of the present invention to assist a landowner or other user in identifying one or more fields which needs a tile plan.

Another object, feature, or advantage is to determine where within a field one or more outlets should be placed.

Yet another object, feature, or advantage is to facilitate information from a landowner or other user which may be used in constructing an appropriate tile plan for a field.

A still further object, feature, or advantage is to facilitate data collection for utilities which may affect a tile plan.

Yet another object, feature, or advantage is to provide a user interface capable of obtaining information needed to complete a tile plan such that the tile plan may be developed remotely from the field being tiled.

Another object, feature, or advantage is to provide a user interface capable of allowing a user to guide the data collection process as well as to automate communication of the data to a tile planner.

A further object, feature or advantage is to provide a user interface capable of providing location tracking to allow a user to identify location of utilities or other objects.

Yet another object, feature, or advantage if to allow a tile planner to prepare a tile plan for a field or other land area without physically visiting the field or other land area.

A still further object, feature, or advantage is to collect information necessary for a tile plan in an organized and systematic way and then communicate this information to a tile planner so as to make the tile planning process simple and reliable for the land owner and for the tile planner.

Another object, feature, or advantage is to perform an analysis on data collected for use in constructing a tile plan.

Yet another object, feature, or advantage is to assist a user in determining specifications for a tile plan and making recommendations and/or suggestions to assist the user in determining the specifications for the tile plan.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a system for facilitating tile planning of fields is provided. The system includes a server platform comprising one or more processors configured for storing instructions on a non-transitory computer readable medium, the instructions defining a first component for interacting with a user associated with a field in which drainage tile is to be installed wherein the first component provides for collecting data from the user including a boundary around the field and a desired position of at least one drainage outlet within the field. The system may further include a second component for interacting with a tile planner and a third component for interacting with an administrator for the system.

The first component may provide for collecting information such as desired tile spacing from the user and a drain coefficient from the user. The first component may further provide for collecting equipment information from the user wherein the equipment information includes a tile plow model, a plow maximum depth, and boot sizes available for the plow. The first component may further provide for collecting field information from the user wherein the field information includes presence of utility in the field, presence of existing tile in the field. The first component may further provide for collecting elevation data from the user. The system may further include a fourth component, wherein the fourth component provides for collecting elevation data from a source other the user based on location of the field.

Another aspect of the present disclosure relates to a system for drainage tile planning. The system may include one or more hardware processors configured by machine-readable instructions for drainage tile planning. The machine-readable instructions may be configured to define a boundary around the field by displaying a map including the field and receiving through a first user interface and from a user associated with the field a plurality of selections by the user associated with field, the edges of the field displayed on the map, and defining at least one desired drainage outlet position within the field by receiving through the user interface and from the user associated with the field a selection of the at least one desired drainage outlet position on the map. The machine-readable instructions may be configured to store the set of drainage tile plan requirements on a non-transitory machine-readable storage medium. The machine-readable instructions may be configured to perform an analysis of the drainage tile plan requirements received through the first user interface. The machine-readable instructions may be configured to present through the first user interface results of the analysis of the drainage tile plan requirements to the user associated with the field. The machine-readable instructions may be configured to communicate over a network the set of drainage tile plan requirements and the analysis of the drainage tile plan requirements to a second user interface, the second user interface associated with a tile planner. The machine-readable instructions may be configured to present through the second user interface the set of drainage tile plan requirements and the analysis of the drainage tile plan requirements. The machine-readable instructions may be configured to receive through the second user interface a tile plan from the tile planner. The machine-readable instructions may be configured to store the tile plan on the non-transitory computer readable storage medium. The machine-readable instructions may be configured to communicate over the network the tile plan to the first user interface.

According to another aspect, a computer implemented method for drainage tile planning includes steps of presenting a first user interface to a user associated with a field in which drainage tile is to be installed and defining a set of drainage tile plan requirements by receiving through the first user interface and from the user associated with the field by: defining a boundary around the field by displaying a map including the field and receiving through the first user interface and from the user associated with the field a plurality of selections by the user associated with the field of edges of the field displayed on the map, and defining at least one desired drainage outlet position within the field by receiving through the user interface and from the user associated with the field a selection of the at least one desired drainage outlet position on the map.

BRIEF DESCRIPTION OF THE DRAWINGS

Illustrated embodiments of the disclosure are described in detail below with reference to the attached drawing figures, which are incorporated by reference herein.

Illustrated embodiments of the disclosure are described in detail below with reference to the attached drawing figures, which are incorporated by reference herein.

FIG. 16 is a screen display showing a satellite map to "Start a Tile Plan" after the user logged in.

DETAILED DESCRIPTION

Figure 1:
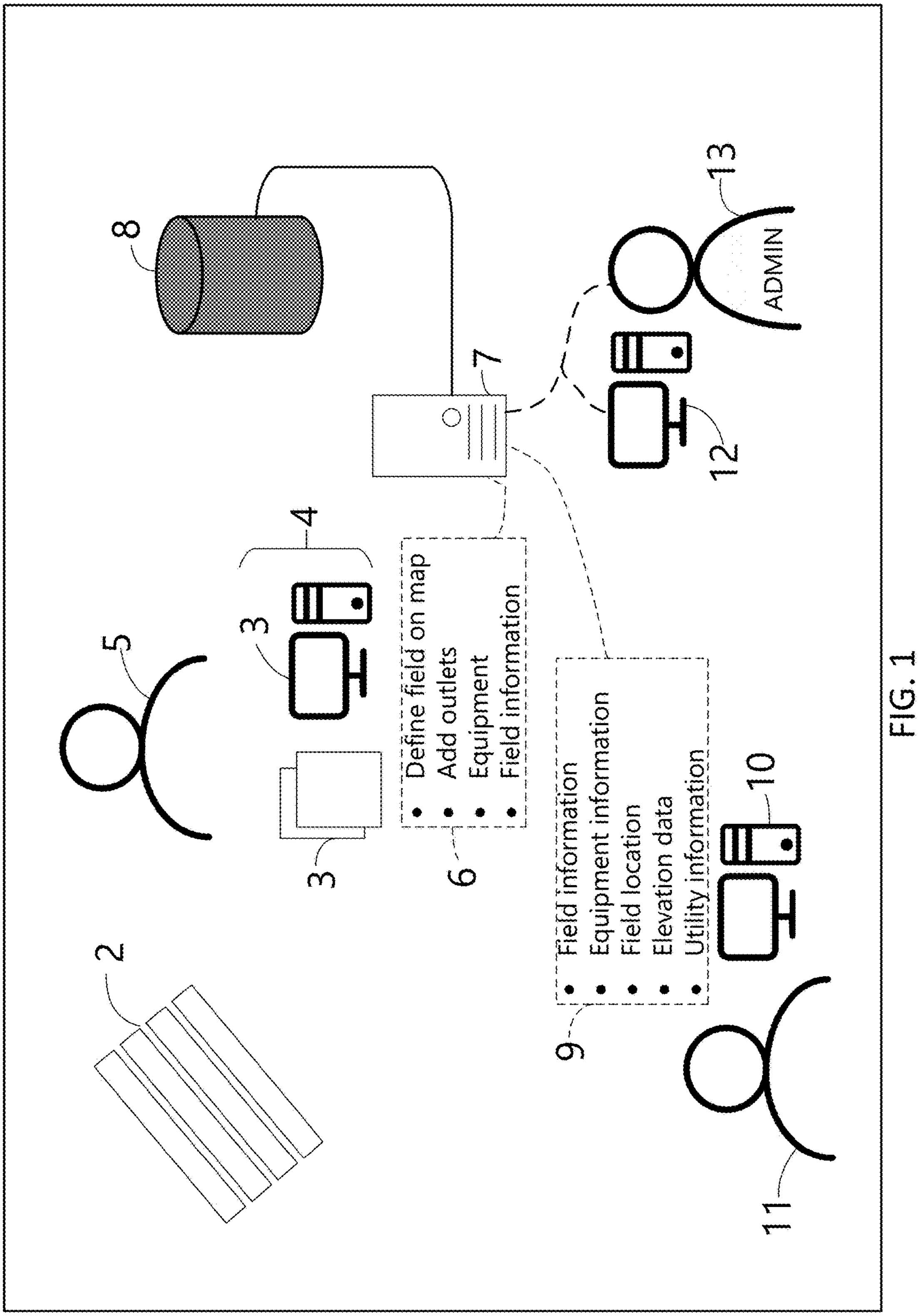
FIG. 1 is a pictorial representation of an overview of one aspect of the invention.

Before invention embodiments are disclosed and described, it is to be understood that no limitation to the particular structures, process steps, or functions disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a processor" includes a plurality of such sensors.

In this disclosure, "comprises," "comprising," "containing", "including", "includes", and "having" and the like can have the meaning ascribed to them in U.S. Patent law and are generally interpreted to be open ended terms.

The terms 'first,' "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," or "in one example" herein do not necessarily all refer to the same embodiment or aspect or example. It is further to be understood that any features or functionality described herein may be combined regardless of whether they are described as being part of the same embodiment, aspect, or example.

The present disclosure provides methods and systems for tile planning. In some embodiments, methods and systems are provided which help crop producers or other landowners facilitate tile planning by allowing them to locate their field on a map and indicate other characteristics of the field, the location of drainage outlets, the location of utilities, the equipment available for implementing the tile plan or other data. Methods and systems are provided for collecting the information including through the use of location tracking using a mobile device, facilitating review of the information from the crop producers or other landowners, assigning an experienced individual to provide a tile plan based on the information provided and/or information from third parties. The tile plan may then be delivered electronically to the crop producer or other landowner. Once the tile plan has been delivered it may be implemented in the field.

According to one aspect, a fully function system is provided which provides different types of users with different types of access to various functions provided the system. In order to show and describe various aspects of the invention, screen displays are provided which include user interface elements. Various terminology may be used to describe the user interface elements which are displayed on the display(s) associated with a computing device. This may include terms such as fields, regions, panels, icons, buttons, links, menus, or other terminology. It is to be understood that numerous variations in the specific manner in which input is collected, data is displayed, or a user instructs the software to perform an action are fully contemplated and that which is described is merely exemplary.

FIG. 1 is an overview according to one embodiment. In FIG. 1 a system 1 is shown. An agricultural field 2 is shown which is a field which is to be tiled. Prior to tiling the field, the tile drainage system for the field 2 needs to be planned. The field 2 is associated with a crop producer or landowner 5, sometimes referred to as a "user" when using the system of the present invention. A computing device 4 such as a mobile phone, tablet, laptop, desktop, internet appliance, or other computing device is used by the producer/landowner 5. There may be a software application 3 stored and executed on the computing device 4. In some embodiments, the software application 3 may be a mobile app. Alternatively, the software application may be a web app. The software application 3 may interact over a network (such as the internet) with a server platform 7. The server platform 7 is also in operative communication with a data store 8 which may be a database used to store information about the agricultural field, the users, tile planners, or administrators or information associated with the process explained herein. Such information may include field information, equipment information, field location elevation data, utility information, and other information. The crop producer/landowner 5 interacts through a user interface associated with the software application or a web-based user interface to identify and further define the field 2. This may involve drawing or confirming boundaries for the field on a map. In addition, drainage outlets for the field may be added by the crop producer/landowner or other user. Available equipment for use in tiling may also be specified by the user as well as other field information which may be used in formulating an appropriate tile plan. Utility information may also be collected such as the location of electrical lines, telecommunication lines, water lines, sewer lines, and other types of utilities.

A tile planner 11 is another type of user which may access the server 7 through a computing device 10. The server 7 may communicate data 9 such as field information, equipment information, field location, and elevation data to the computing device 10 associated with the tile planner which the tile planner may then use in constructing an appropriate tile plan. An administrator 13 may use a computing device 12 to manage or administer software on the server 7 in various ways as will be explained in greater detail.

Figure 2:
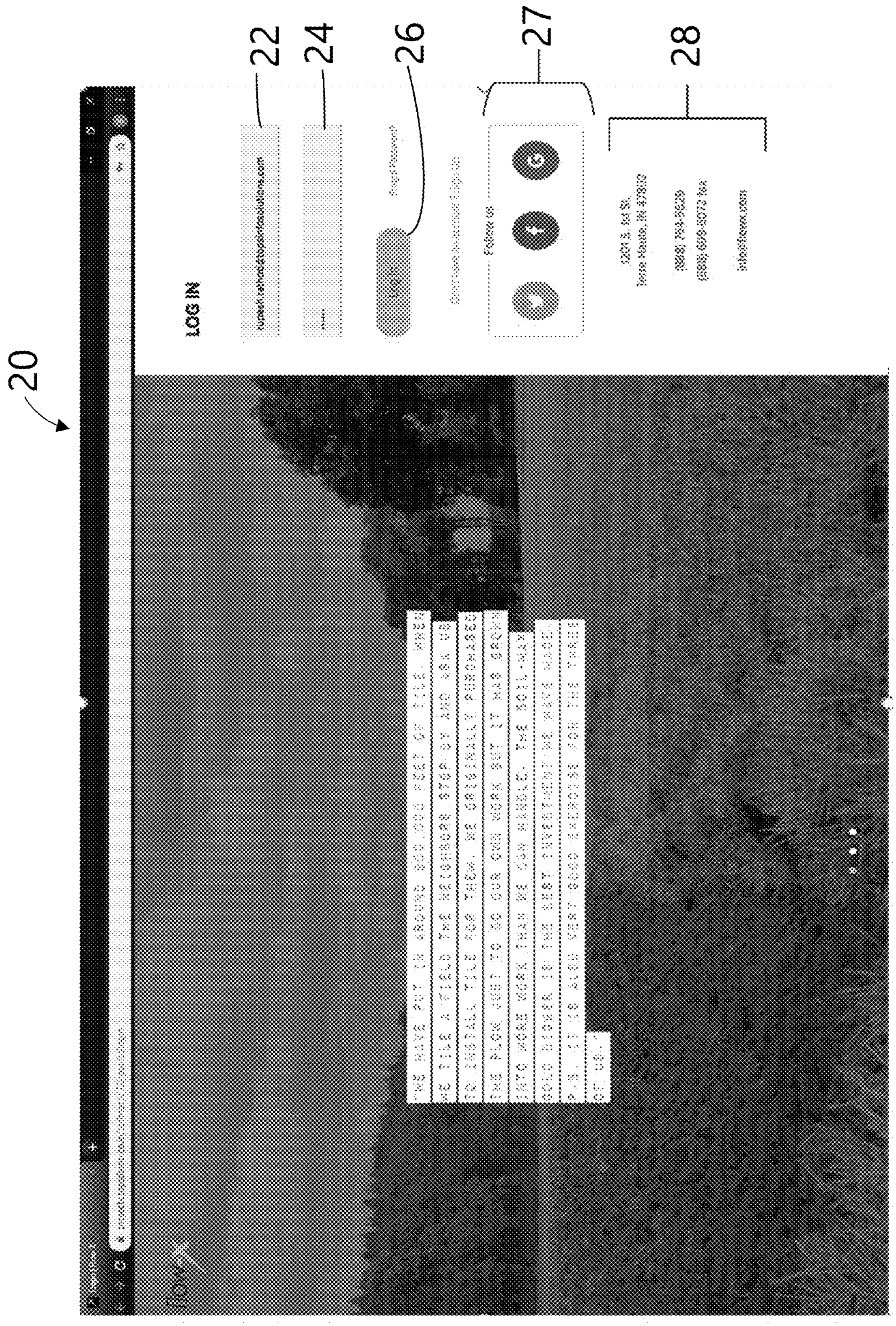
FIG. 2 is a screen display showing the LOG IN section on the right.

FIG. 2 is a screen display 20 showing the "LOG IN" panel on the right. The user enters a username in the username input box 22 and their password in the password input box 24. Then the user selects the "LOG IN" button 26 to login. Other options may be present. For example, the screen display may include a "Forgot Password" link, a "Sign Up" link, the "Follow us" container 27 for connecting with social media and the contact information and address display associated with the company providing the service in the field 28.

Figure 3:
FIG. 3 is a screen display showing a map 32 and "How to user the app" in region 39.

FIG. 3 is a screen display 30 showing a map 32. The map may be provided by connecting with an online map service such as available from Google, Microsoft, or others. The username and user profile picture 31 may be shown at the upper-right corner. A user can enter a location in the location input box 34 and select the map button 36 to display a map of the location entered. The user can check the weather by selecting the cloud and sun (weather) icon 35 on the right side of the "Enter a location" input box 34. The user is also presented with instructions on how to use the app in region 39 of the screen display 30. The user can select the "Start a Tile Plan" button 38 to start a tile plan associated with a field shown within the map 32.

Figure 4:
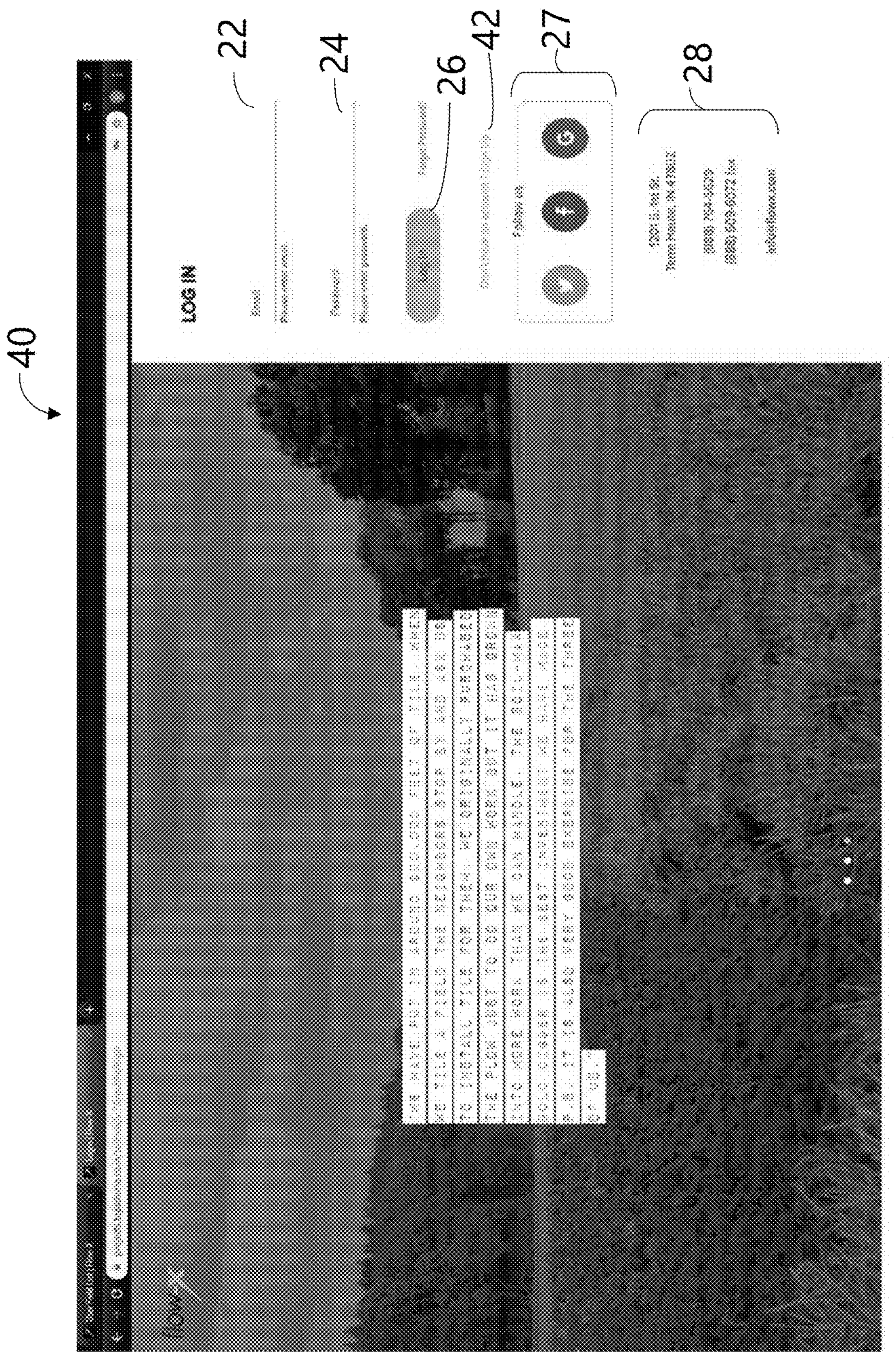
FIG. 4 is a screen display showing the Sign Up and different Log In choices on the right side of the web page.

FIG. 4 is a screen display 40 which includes a "Sign Up" link 42. In response to the user selecting the sign-up link 42, the screen display 50 of FIG. 5 is shown.

Figure 5:
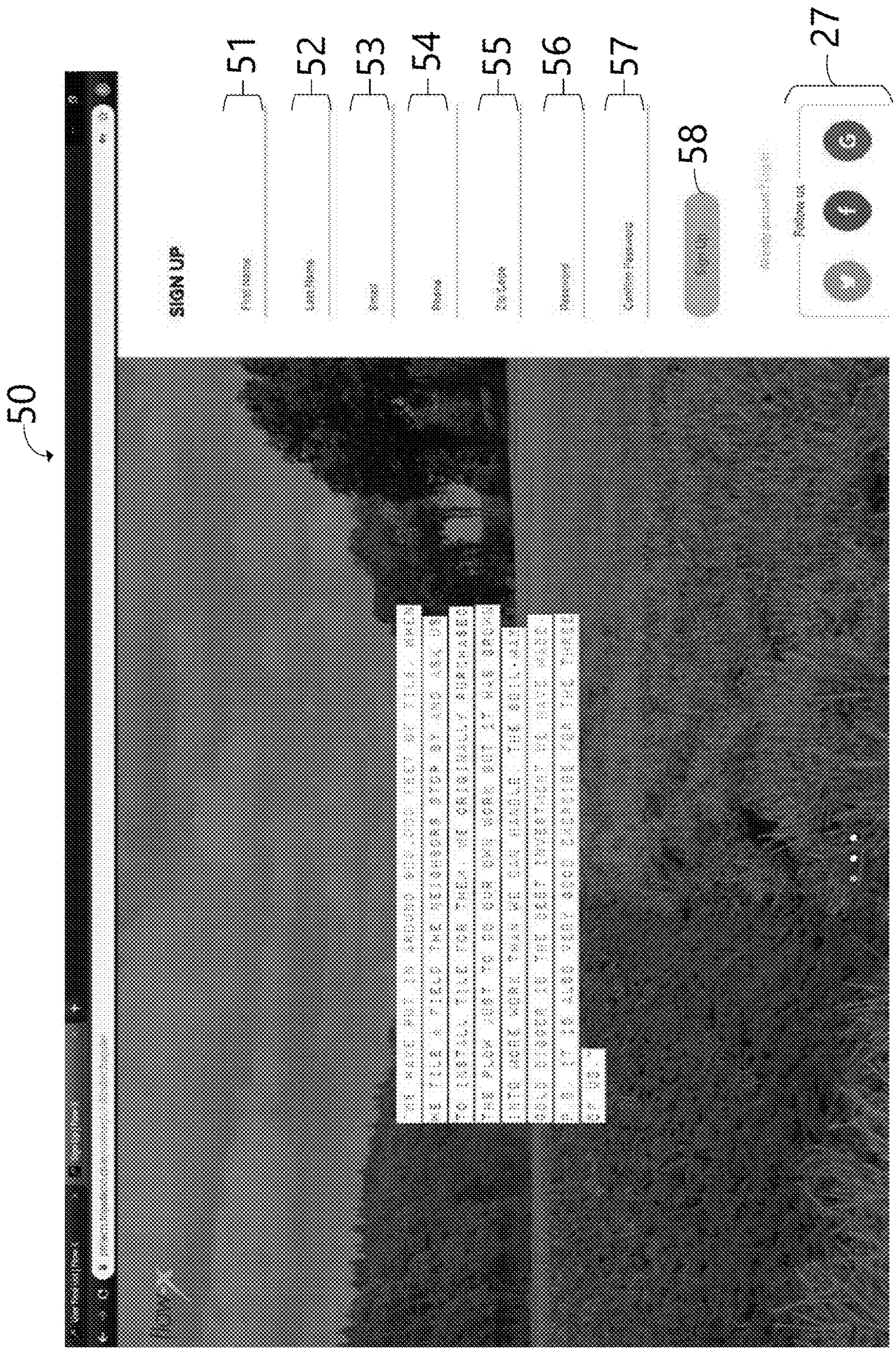
FIG. 5 is a screen display showing a user assigning up for an account with personal information.

FIG. 5 is a screen display 50 showing the "SIGN UP" panel on the right. The user enters a first name in the "First Name" field 51, a last name in the "Last Name" field 52, an email address in the "Email" field 53, a phone number in the "Phone" field 54, a zip code in the "Zip Code" field 55, a password in the "Password" field 56, and the user needs to re-enter the password in the "Confirm Password" field 57. Then the user selects the "Sign Up" button 58 to submit the information to the server. Other options include the ability to select a "Log In" link which may be selected if the user already has an account.

Figure 6:
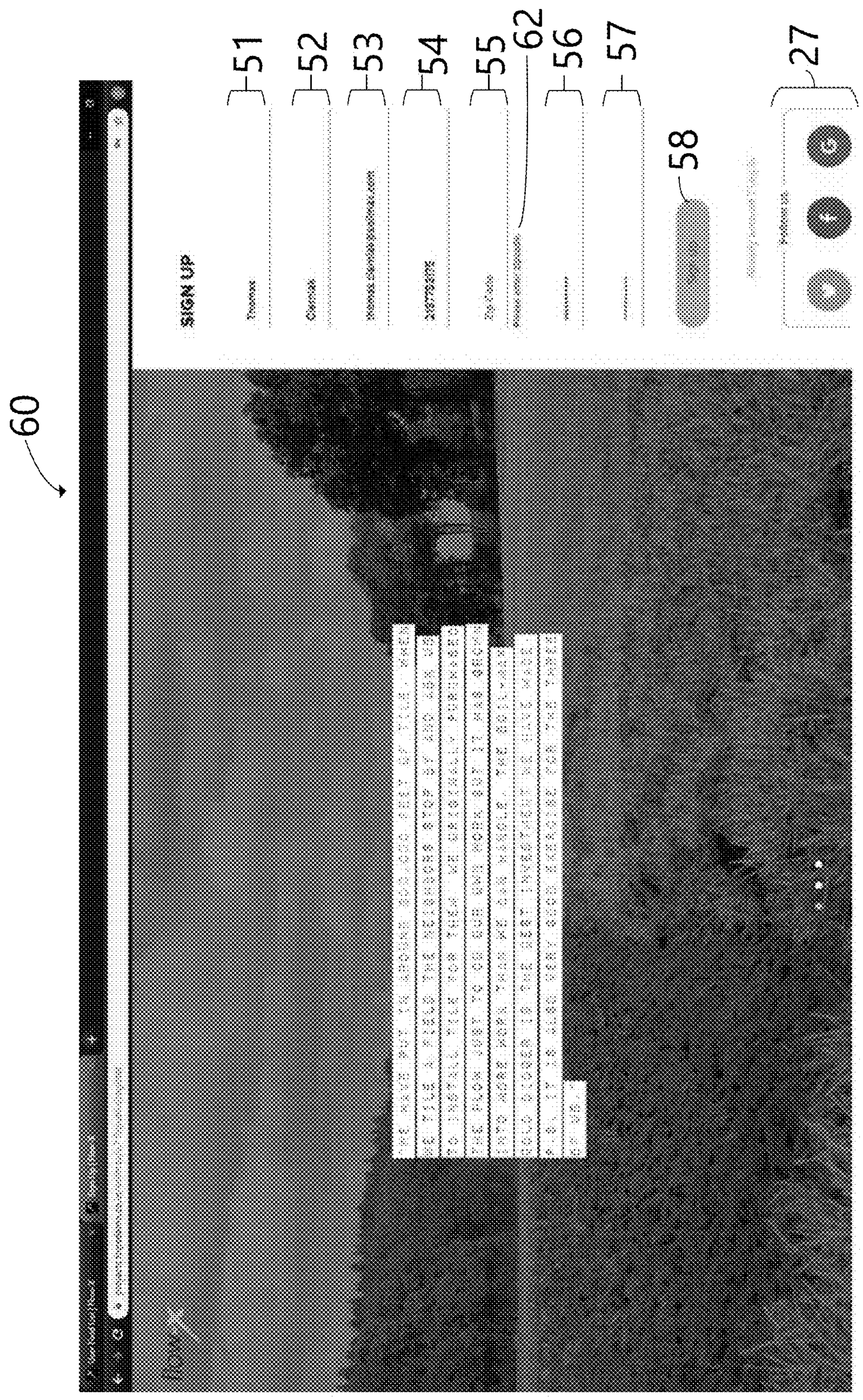
FIG. 6 is a screen display showing an error when the user did not complete all fields during the process of signing up.

FIG. 6 is a screen display 60 showing a user mostly populated the input fields but did not enter a zip code in the "Zip Code" field 55. Then the "Please enter zipcode" notification 62 shows under the "Zip Code" field 55. Thus, if a user does not complete all required fields, the user sign-up or registration process cannot continue until all required information is provided.

Figure 7:
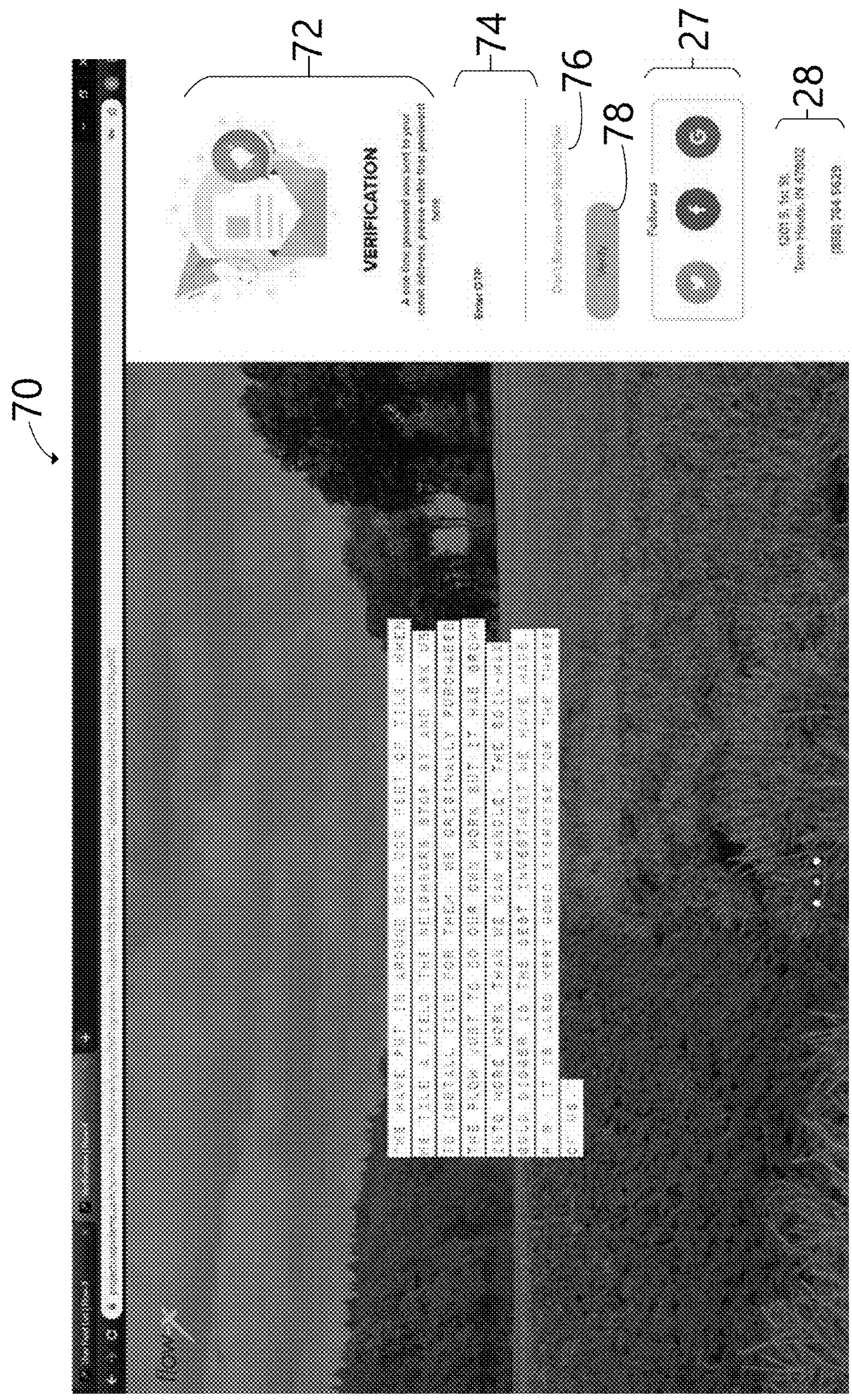
FIG. 7 is a screen display showing the Enter OTP verification code requirement after the user has fully completed entering the personal information.

FIG. 7 is a screen display 70 showing the user has submitted the information to the server. The verification notice and instruction message 72 may display on the right side indicating that a one-time password (OTP) has been emailed to the user. The user then needs to enter the OTP in the "Enter OTP" field 74 and select the "Verify" button 78 to verify the email address.

Figure 8:
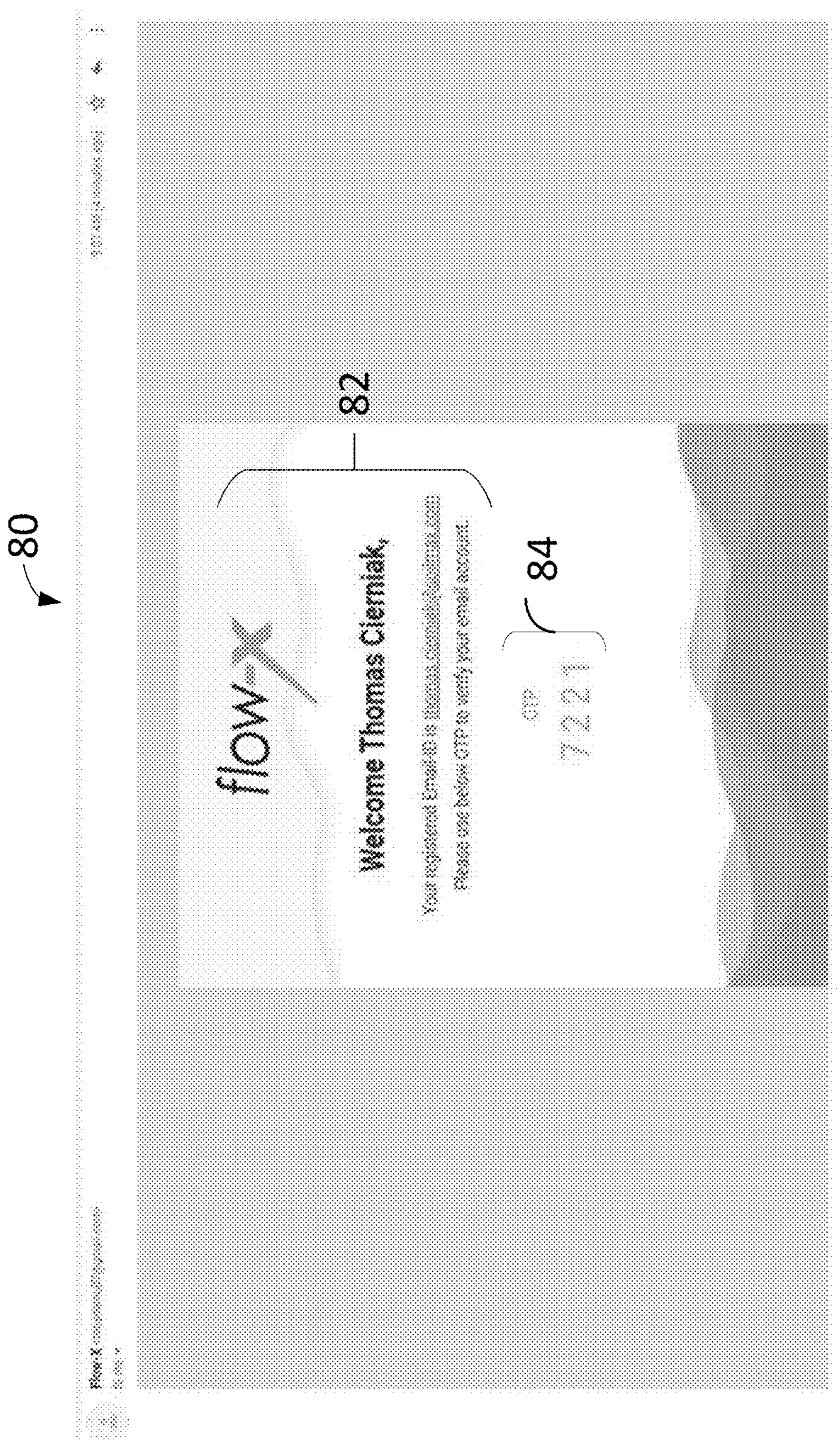
FIG. 8 is a screen display showing the OTP verification code which is sent to the user personal email.

FIG. 8 is a screen display 80 showing an email such as may be received by the user after the user has selected the "Sign Up" button 58 (FIG. 5). The email includes a welcome message 82 indicating the email address 82, and the OTP 84 which may be in the form of a four-digit code.

Figure 9:
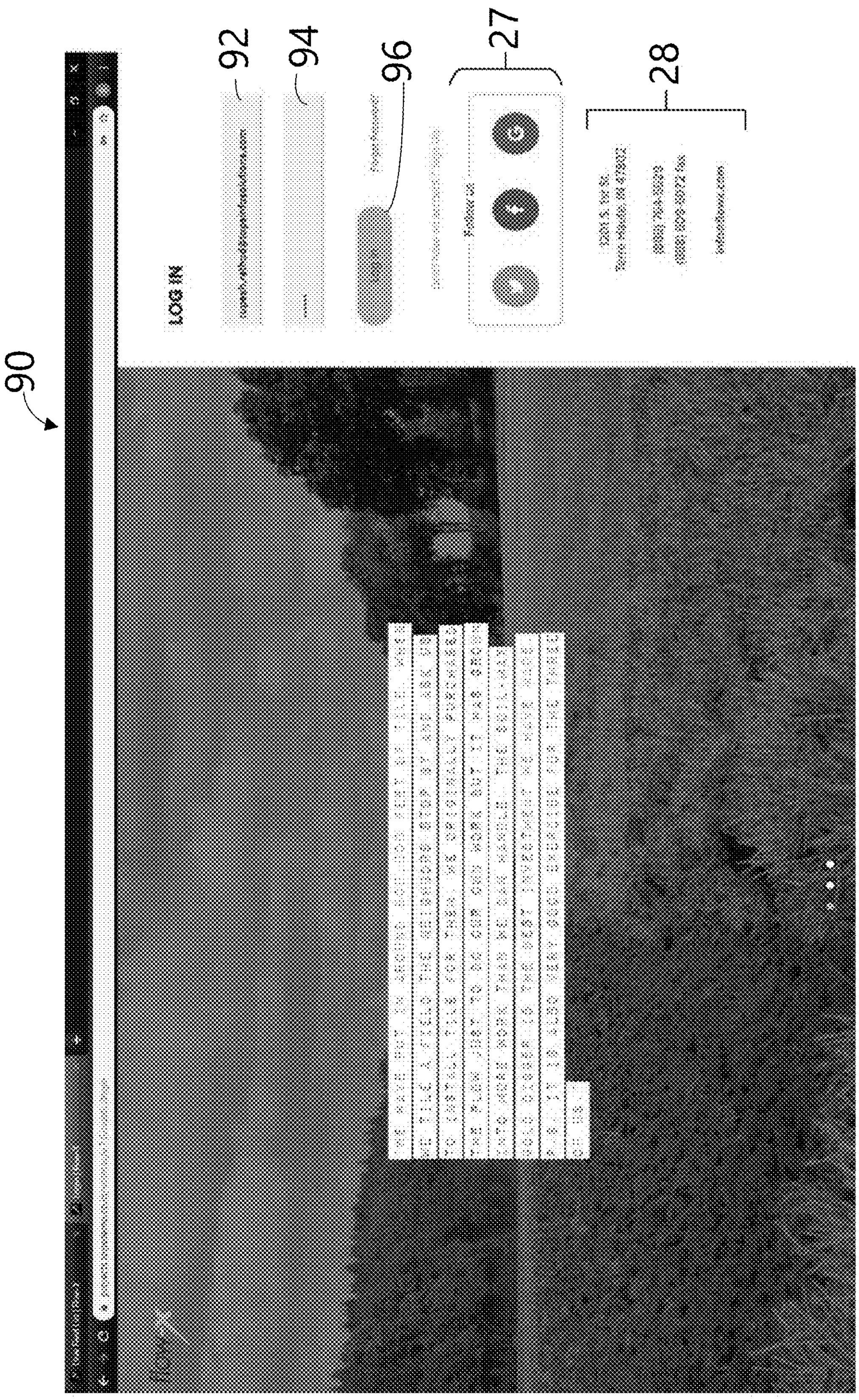
FIG. 9 is a screen display showing the user can Log In using their email and password after successfully signing up.

FIG. 9 is a screen display 90 showing the user can select the "Log In" button 96 after entering their user credentials such as in the form of a username or email address 92 and a Password 94 in the normal manner.

Figure 10:
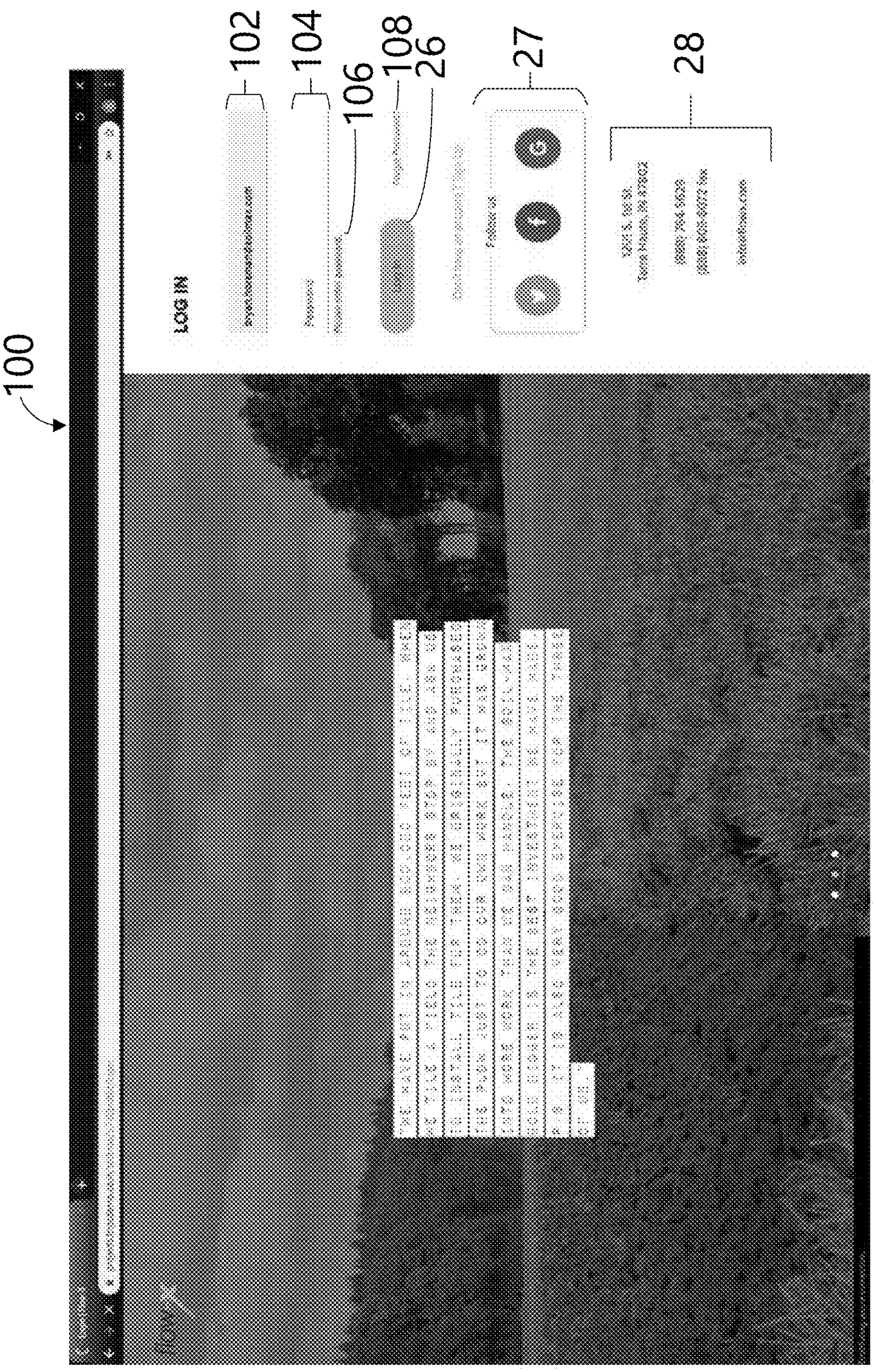
FIG. 10 is a screen display showing an error after the user enters a wrong password.

FIG. 10 is a screen display 100 showing a user enters a username in the "Username" field 102. If the user does not enter a correct password in the "Password" field 104, an error "Please enter password" 106 is shown. The user can select "Forgot Password" link 108 to reset the password.

Figure 11:
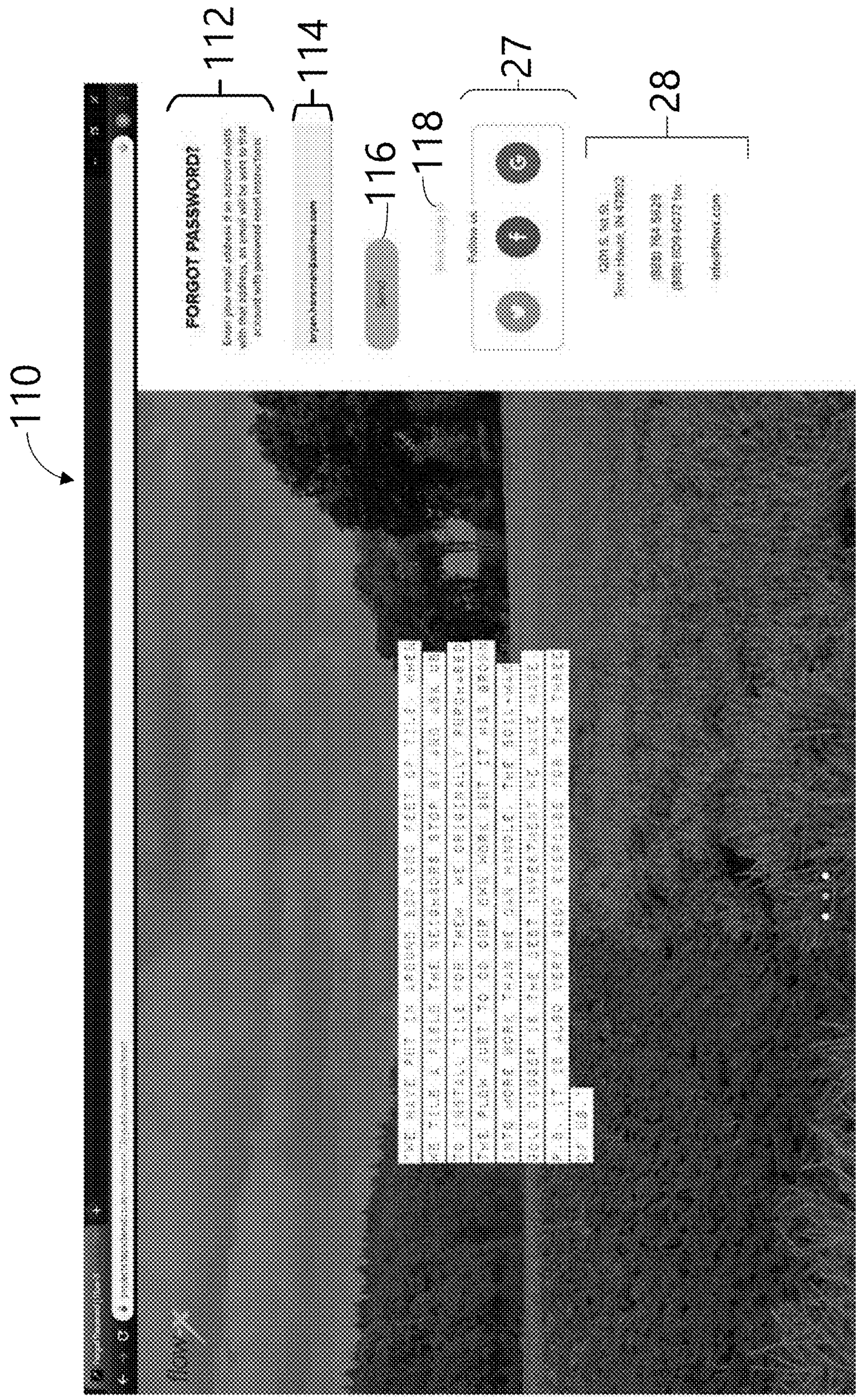
FIG. 11 is a screen display showing the user can request to send password reset instructions.

FIG. 11 is a screen display 110 showing a user can request to be sent password reset instructions. The page includes "FORGOT PASSWORD" instruction 112 and an "Email" field 114. After the user enters an email in the field 114, the user selects the "Send" button 116 to submit to the server. Other option includes the "Back to Log In" link 118.

Figure 12:
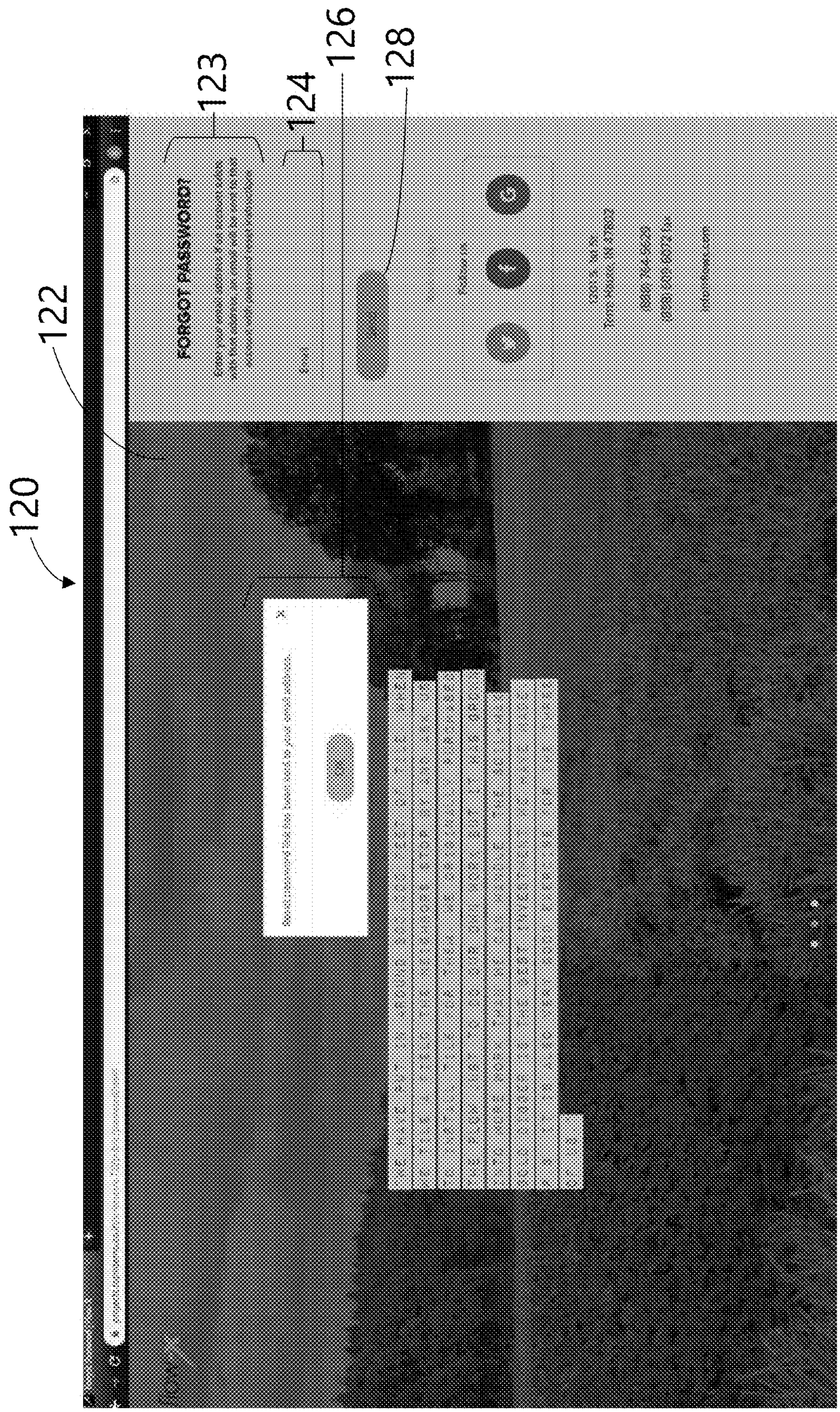
FIG. 12 is a screen display showing the password reset link has been sent to the user's email address.

FIG. 12 is a screen display 120 which may be shown after the user requests a password reset. After the user selected the "Send" button 128 to request the password reset, a reset password notification 126 may appear on the screen within region or panel 122. The user can read the "Forgot Password" instructions 123 in the panel 122 on the right side. The email address may be cleared off from the "Email" field 124.

Figure 13:
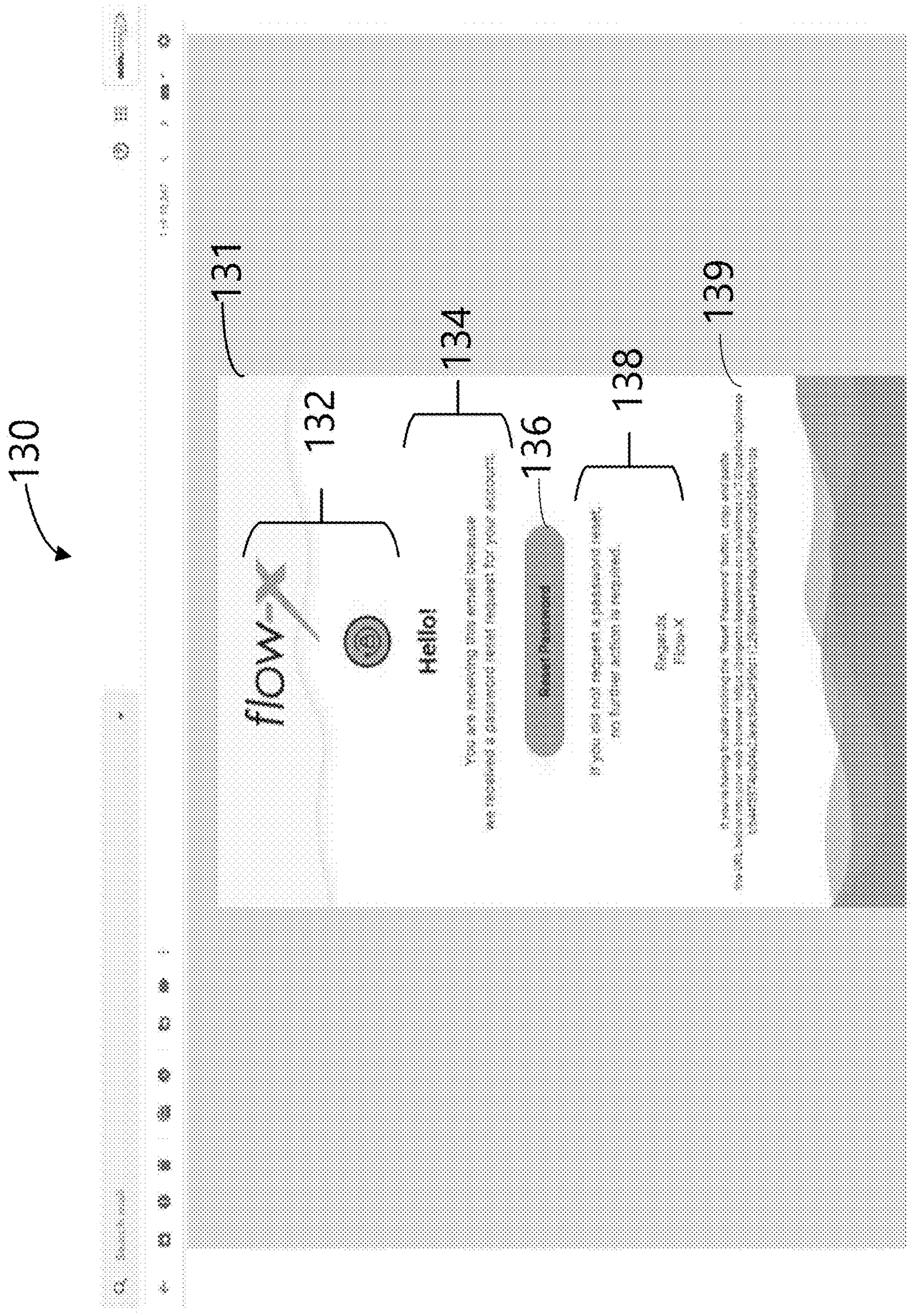
FIG. 13 is a screen display showing the password reset link has been received via email.

FIG. 13 is a screen display 130 showing an example of a password reset email 131. The email 131 may include a greeting to the user message 134, the "Reset Password" button 136 and a message 138.

Figure 14:
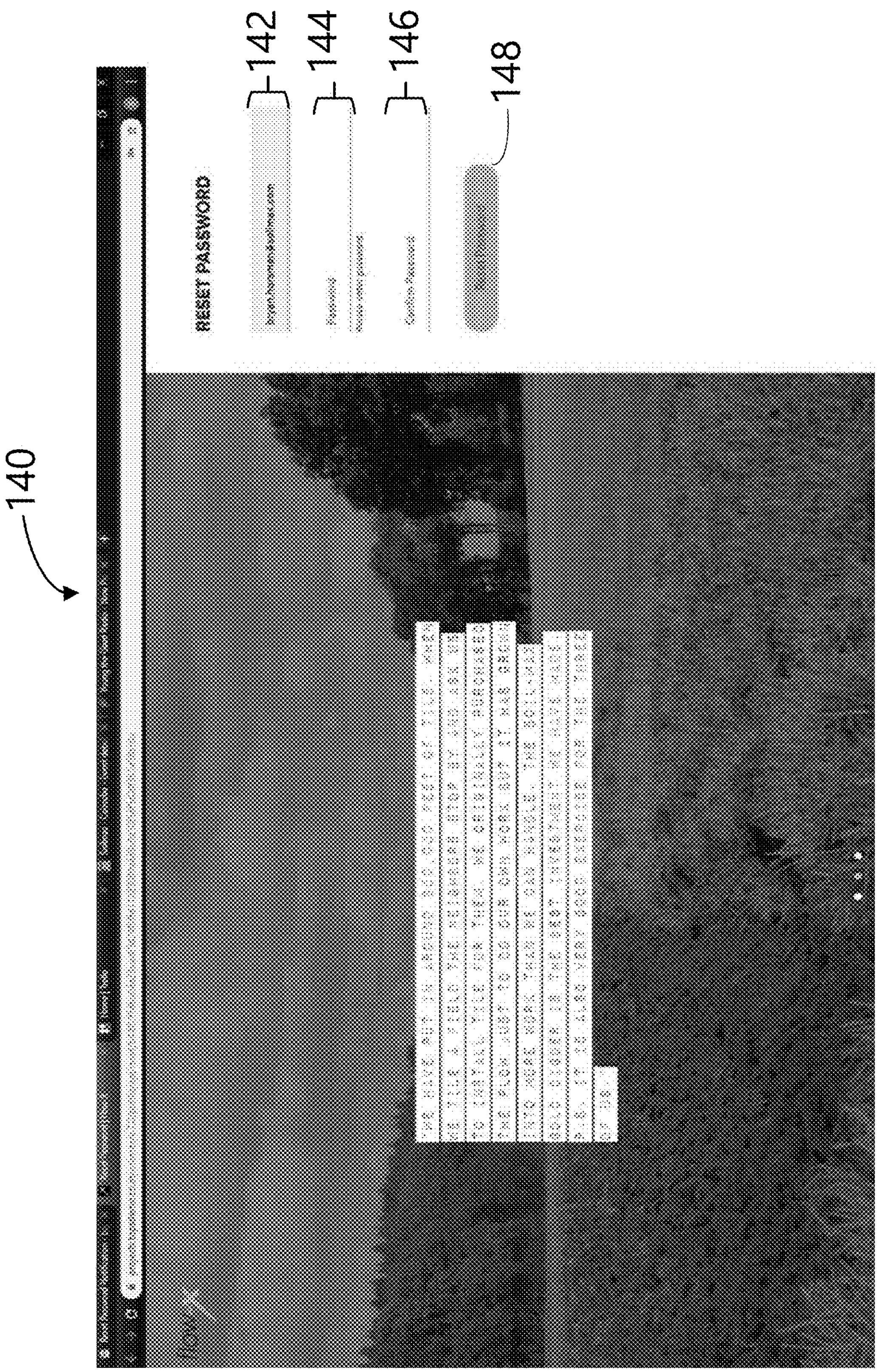
FIG. 14 is a screen display showing the password reset web page.

FIG. 14 is a screen display 140 showing a "Password Reset" panel on the right. The user enters an email address in the "Email" field 142 and a password in the "Password" field 144. The user may confirm the password 146 by repeating the password 144. Once the information is collected, the user can select the "Reset Password" button 148 to submit the information to the server.

Figure 15:
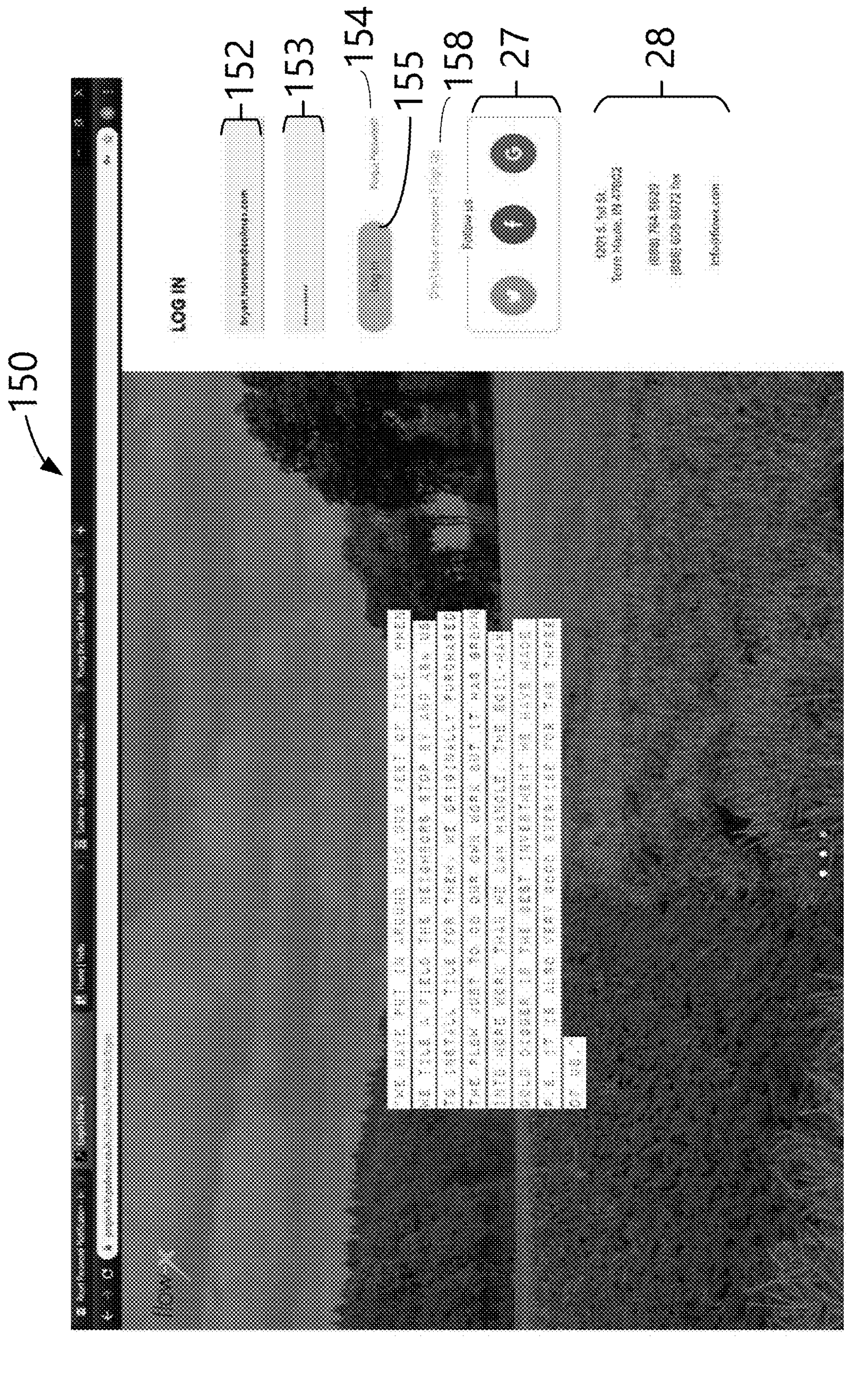
FIG. 15 is a screen display showing the Log In web page after a password reset.

FIG. 15 is a screen display 150 showing the "Log In" panel on the right side after a user has completed all required field in screen display 140 of FIG. 14. Logging in requires an email or username in the "Email/Username" field 152 and a password in the "Password" field 153. After the information collected, a user can select the "Log In" button 155 to log in with a new password. Other options may include the ability to select the "Forgot Password" link 154, and the "Sign Up" link 158.

Figure 16:
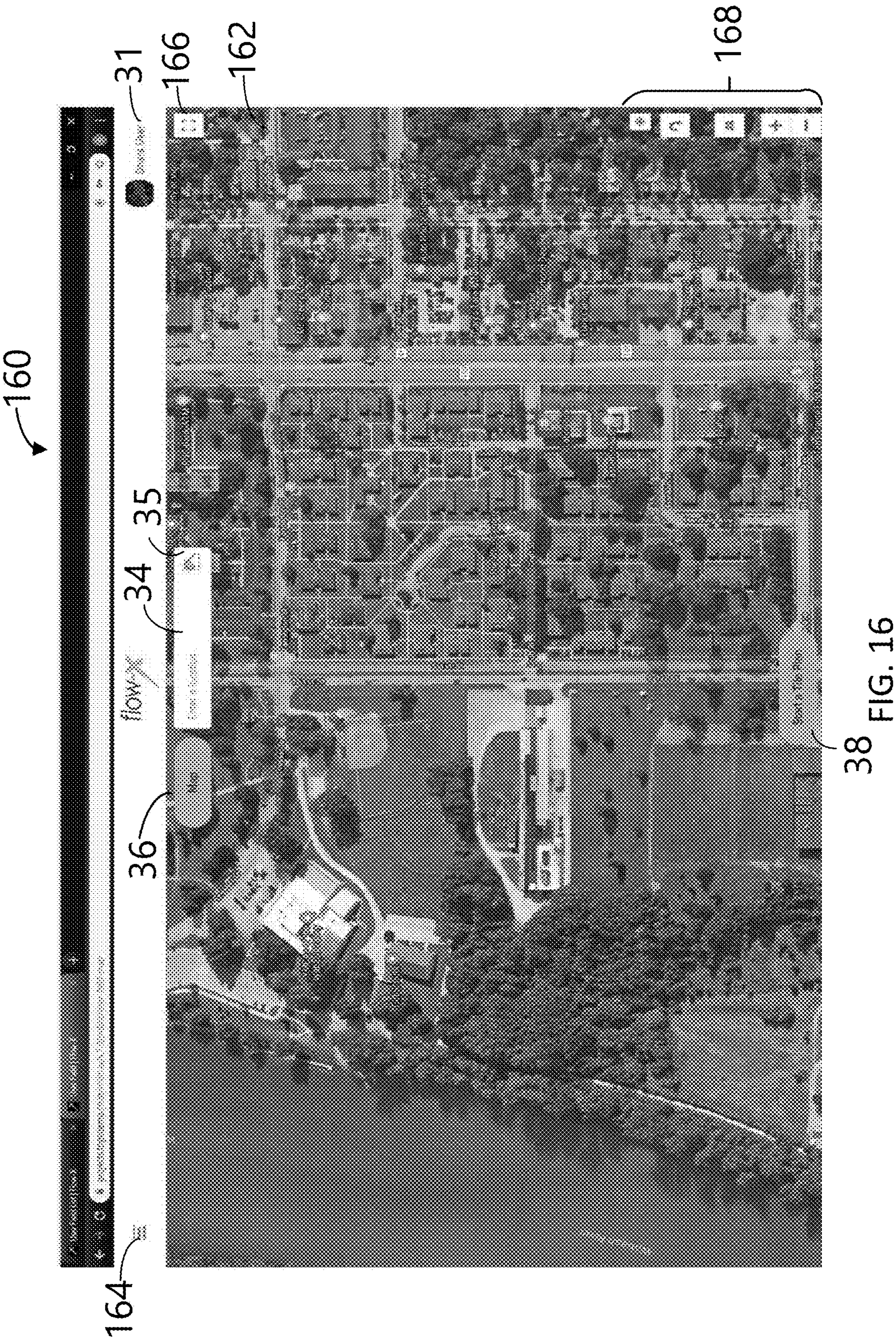

FIG. 16 is a screen display 160 showing a satellite map 162. The user can enter a location in the "Enter a location" field 34 and then select the "Map" button 36 to display a map of the entered location. The user may determine the weather by selecting the cloud and sun (weather) icon 35. Once a map is shown which includes the field to be tiled, the user can select the "Start a Tile Plan" button 38 to start a tile plan for the field. The user can choose different function from the menu bar 164. The user can display the map in full screen with the full-screen button 166. Other map options 168 related to the map are shown at the lower-right corner.

Figure 17:
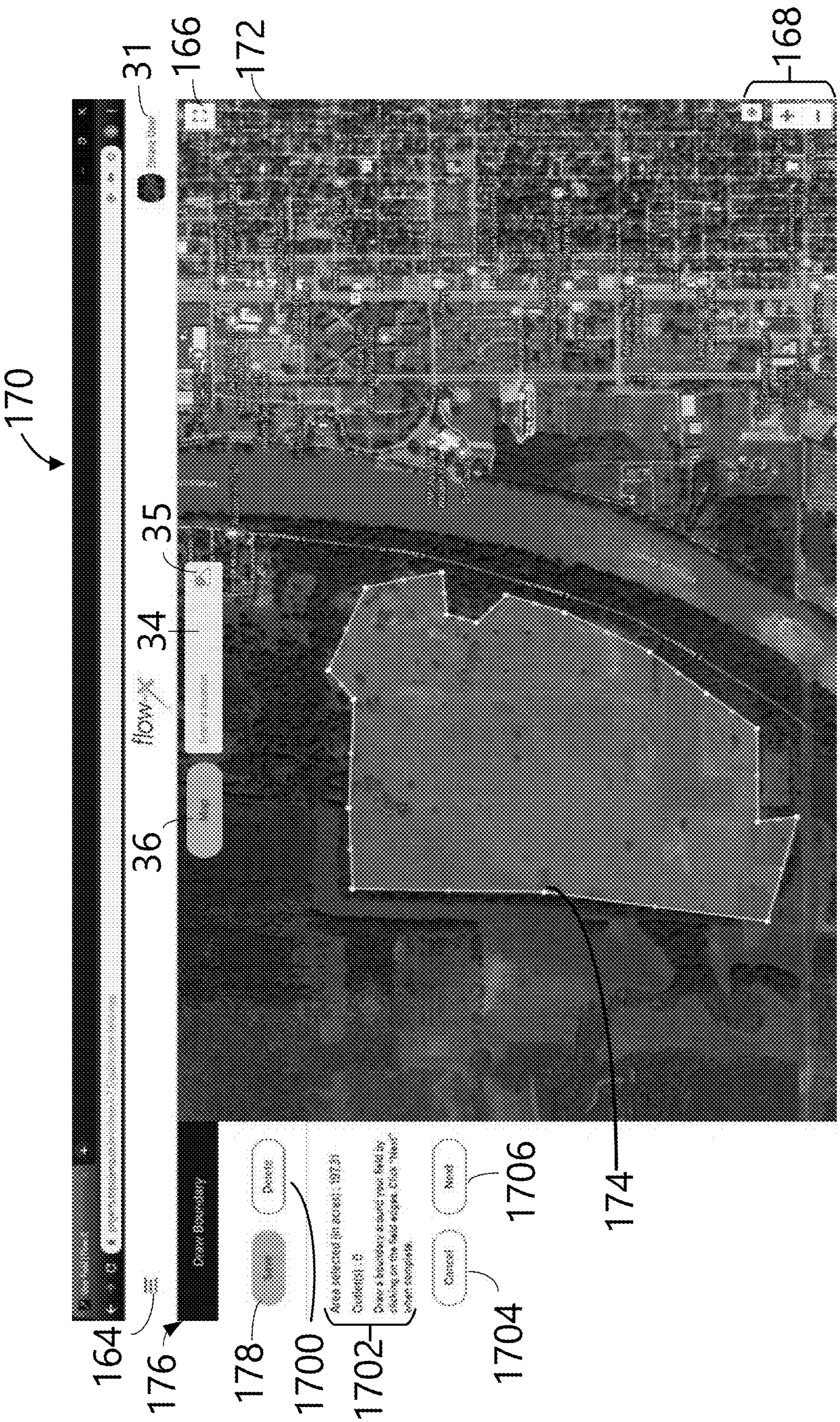
FIG. 17 is a screen display showing the user drawing a field on the website.

FIG. 17 is a screen display 170 allowing the user to draw a field boundaries 174 with points and lines on the map 172. The "Draw Boundary" panel 176 is shown on the left side. The panel 176 includes a "Save" button 178 to save the selected field boundary 174, a "Delete" button 1700 to delete the field boundary 174. The user is also presented with field details 1702. The field details may include an area (such as in acres) for the field and a number of drainage outlets for the field. In operation, a user can define the boundaries for the field by selecting points on the field edges. In some embodiments, image processing techniques may be applied to assist in determining field boundaries based on the map image and/or points already selected by the user. These image processing techniques may include such methods as image segmentation and edge detection.

Once the boundaries have been identified, the user can select the "Next" button 1706 for the next step, or the user can select the "Cancel" button 1704 to cancel. Thus, the system collects field information from a user including field boundaries and can determine an area for a field once the boundaries have been defined.

Figure 18:
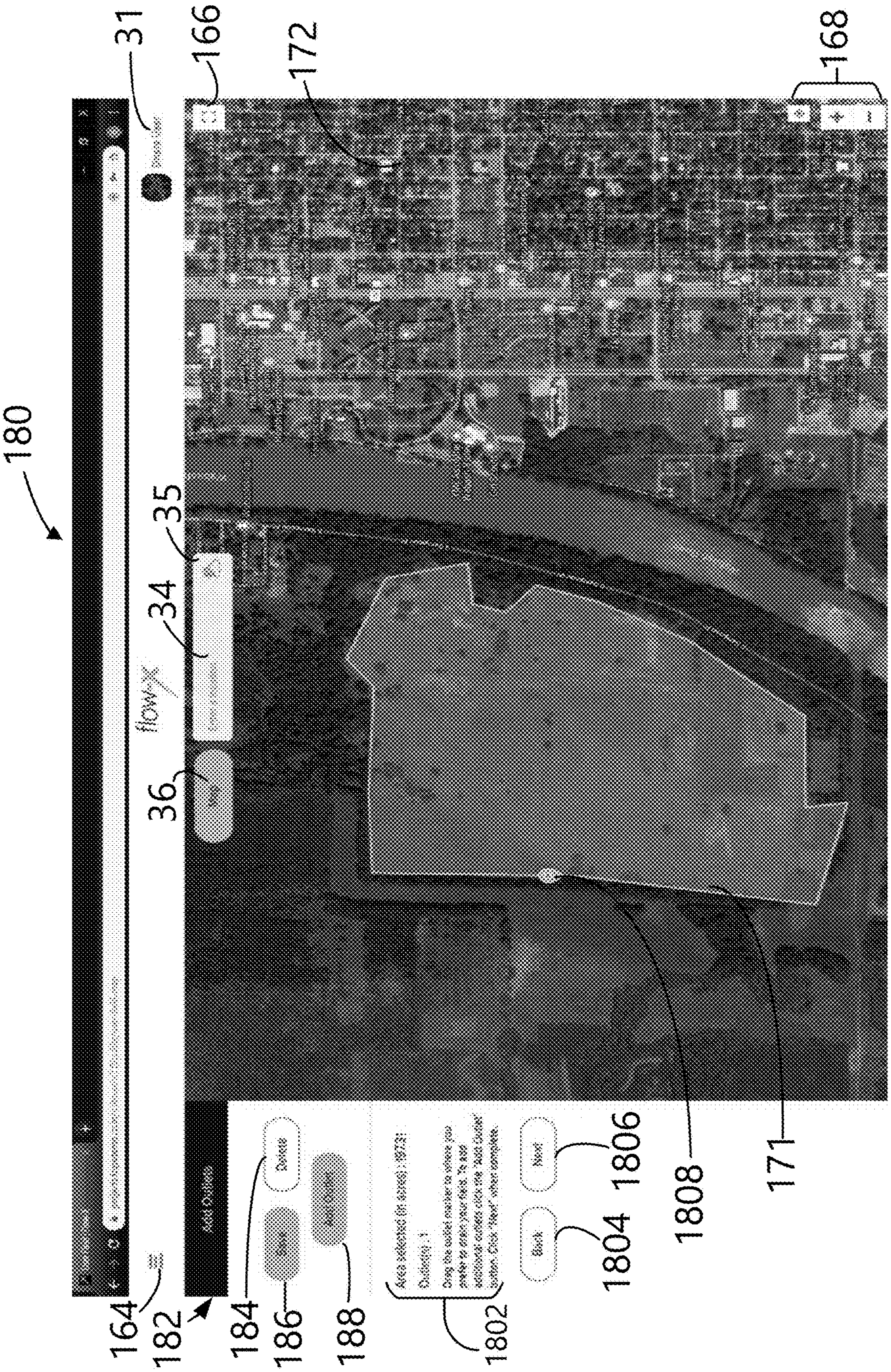
FIG. 18 is a screen display showing the user can add drainage outlets on the edge of the field.

FIG. 18 is a screen display 180 showing the user can add drainage outlets 1808 for the field 171. After the user selected the field 171, the user can select "Save" button 186 to save the outlet 1808. The user can delete the outlet with the "Delete" button 184. If the field needs more than one outlet, the user can select the "Add Outlet" button 188 to add another outlet. The details of the field and outlets 1802 will appear on the left side. The user can return to the previous step and re-define the field by selecting the "Back" button 1804. Once the selecting is done, the user can select the "Next" button 1806 for the next step. The ability to select the location of drainage outlets is an important step as it is important to the tile planning process and a tile planner working remotely from the field without ever having seen the field would not necessarily be able to determine where the drainage outlets should be. In some implementations, the present invention provides that the system may make suggestions as to where to place the drainage outlets. For example, where elevation data is obtained and correlated with the location information, the system may identify low lying points along the boundary to make selections. In some implementations, the system may use the elevation data or other information about the field to question a user's selection of a particular locations for the outlets.

Figure 19:
FIG. 19 is a screen display showing the estimated costs associated with adding tile to the selected field.

FIG. 19 is a screen display 190 showing the estimated costs of designing a tile plan for the selected field after the user selected the location of the outlets. The user will save the tile project by selecting the "Save Map" container 191 on the left. The user will need to add a field name in the "Field Name" field 192. The estimated cost of the plan will appear in the "Cost Estimate" field 196. The user may choose "Yes" or "No" for both "Elevation Data" 198 and whether the tile plan is a "Multi-Year Plan" 1902. The user may choose the rate of the water removed from the field in the "Drain Co-Efficient" field 1904. The user can choose the desired space between tiles in the "Desired Tile Spacing" field 1906. The user can leave a note, if necessary, in the "Notes" field 1908. A notification 1910 will remind users to answer all the questions completely. In response to the user editing the outlets, the "Back" button 1912 has ability to show the screen display 180 of FIG. 18. The "Save" button 1914 would help save their progress prior to submission. In response to the user selecting the "Submit" button 1916, the screen display 200 of FIG. 20 is shown.

Figure 20:
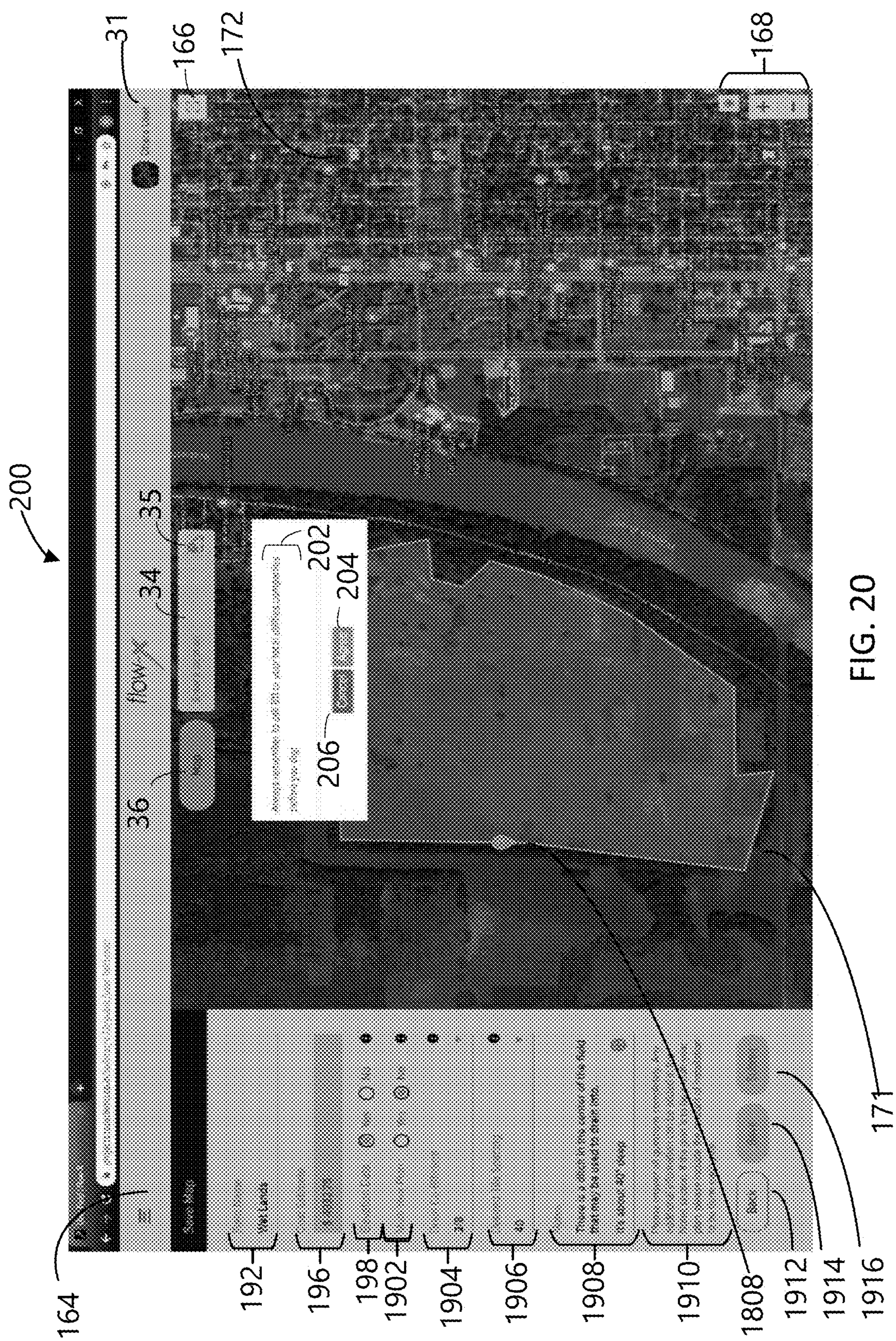
FIG. 20 is a screen display showing a notification to suggest the user call local utilities before the construction.

FIG. 20 is a screen display 200 showing a modal notification 202 in the middle. The user is presented with notification that the user should call 811 or local utilities companies before implementing the tile plan in the modal notification window 202 of the screen display. The user can select the "Cancel" button 206 to close the notification window 202 or select the "Agree" button 204 to acknowledge. In some embodiments, the user may identify location of utilities by walking or driving along flag lines for the utilities using a mobile device such as a smart phone which provides for location determination such as through use of a Global Positioning System (GPS) receiver or other means.

Figure 21:
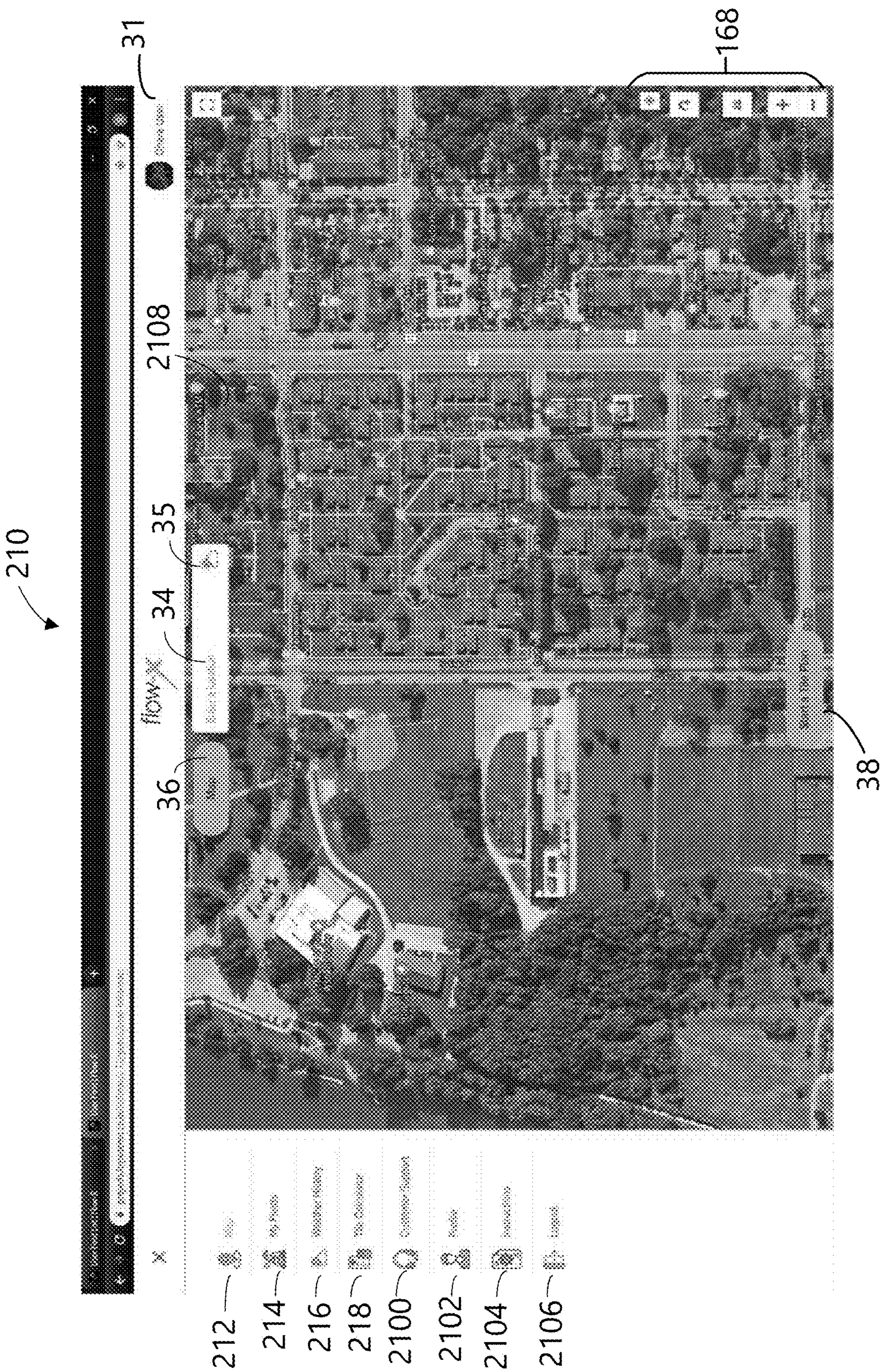
FIG. 21 is a screen display showing a menu bar on the website.
Figure 22:
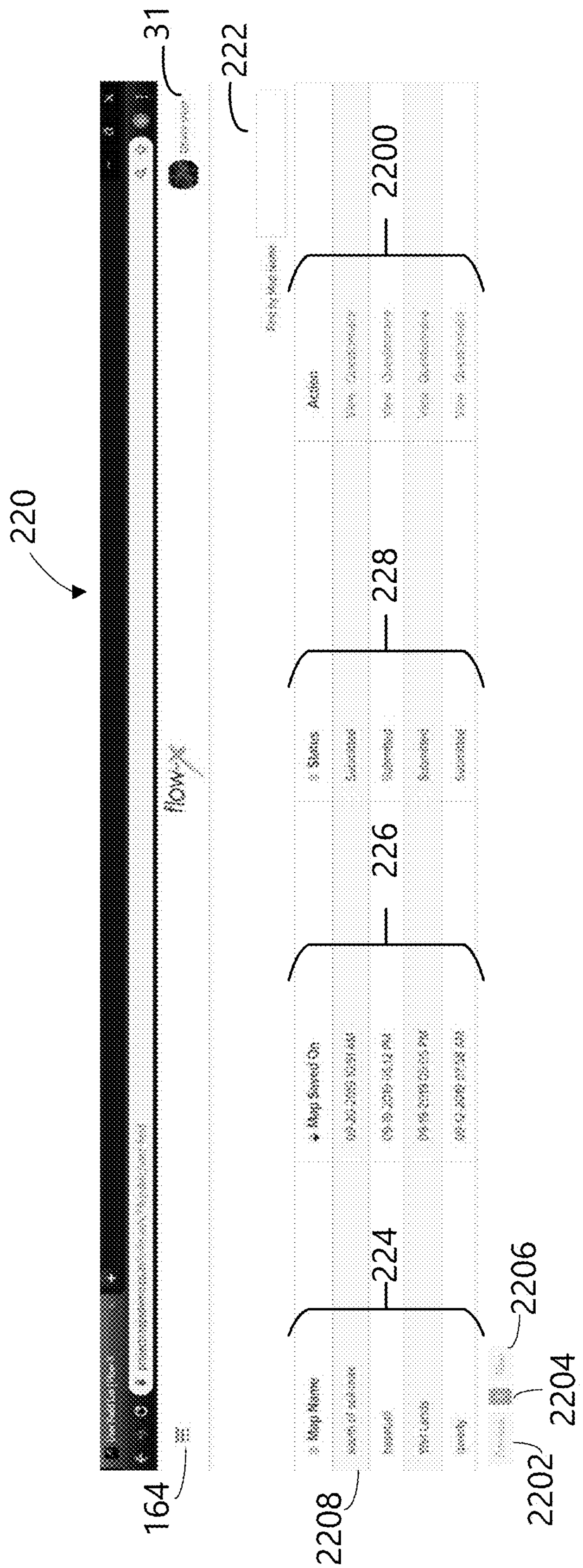
FIG. 22 is a screen display showing that the tile plan request was submitted by the user.
Figure 25:
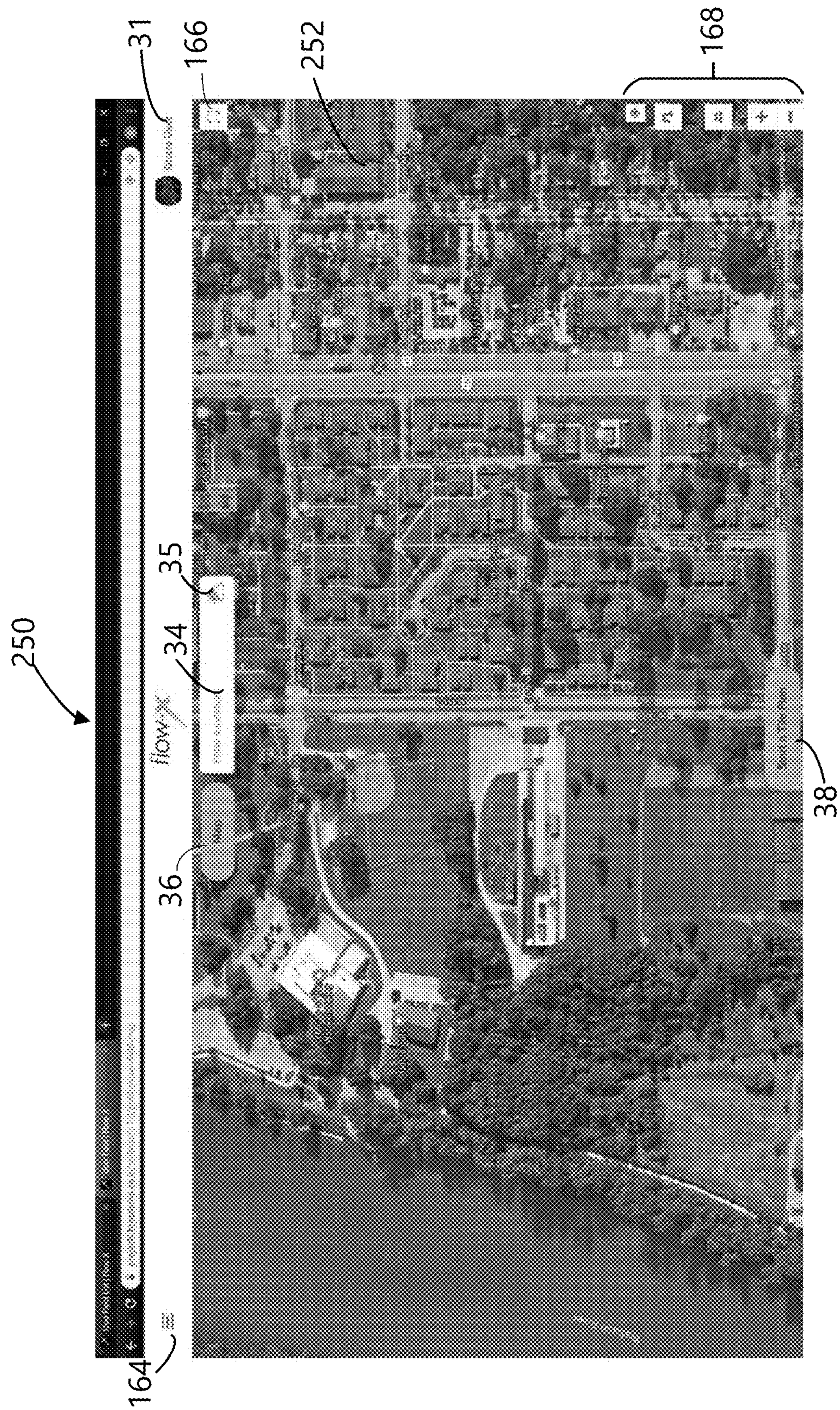
FIG. 25 is a screen display showing the user can access weather data through the bar next to the "Enter a location" link.
Figure 27:
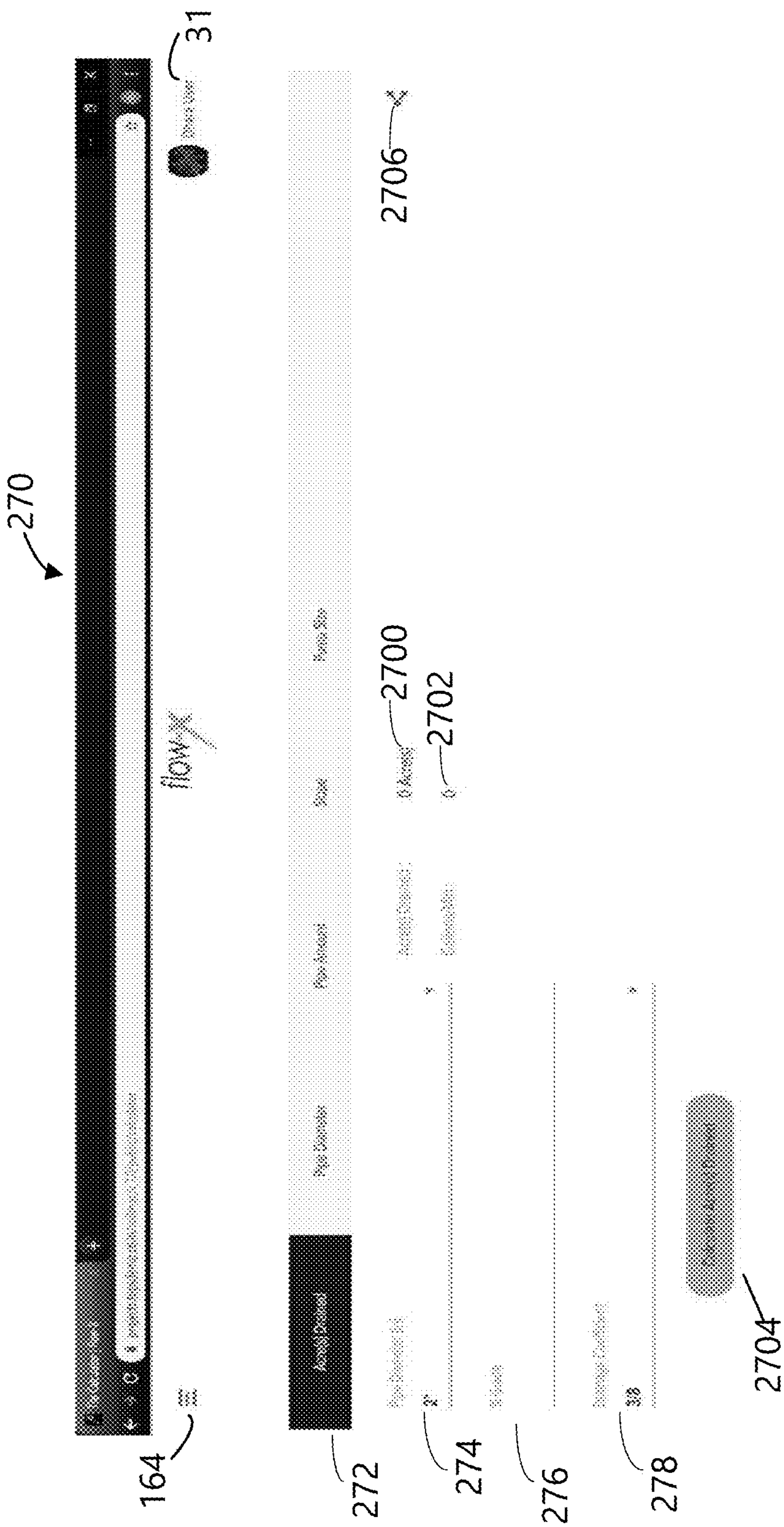
FIG. 27 is a screen display showing a calculator.
Figure 30:
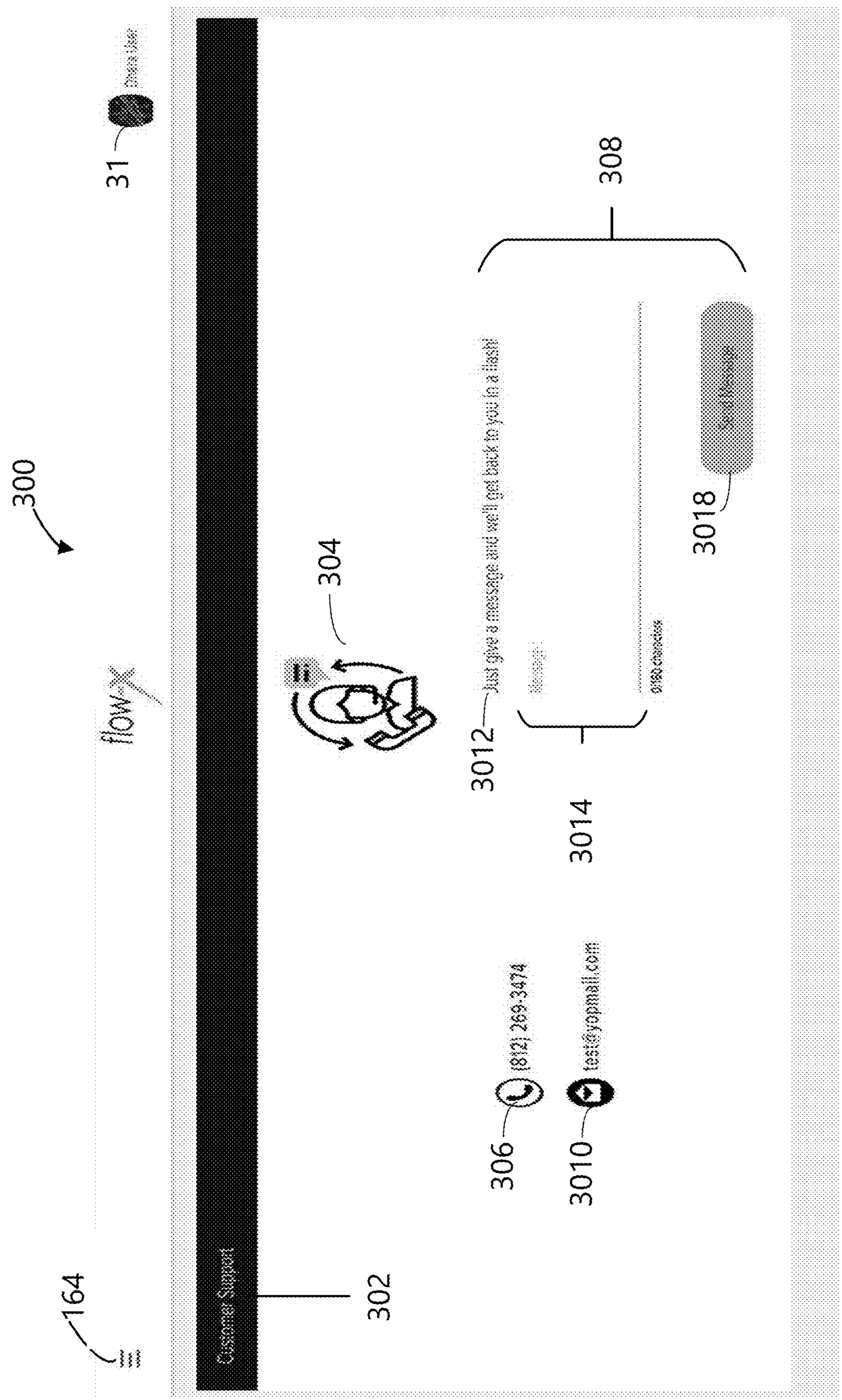
FIG. 30 is a screen display showing a customer support web page and function.
Figure 31:
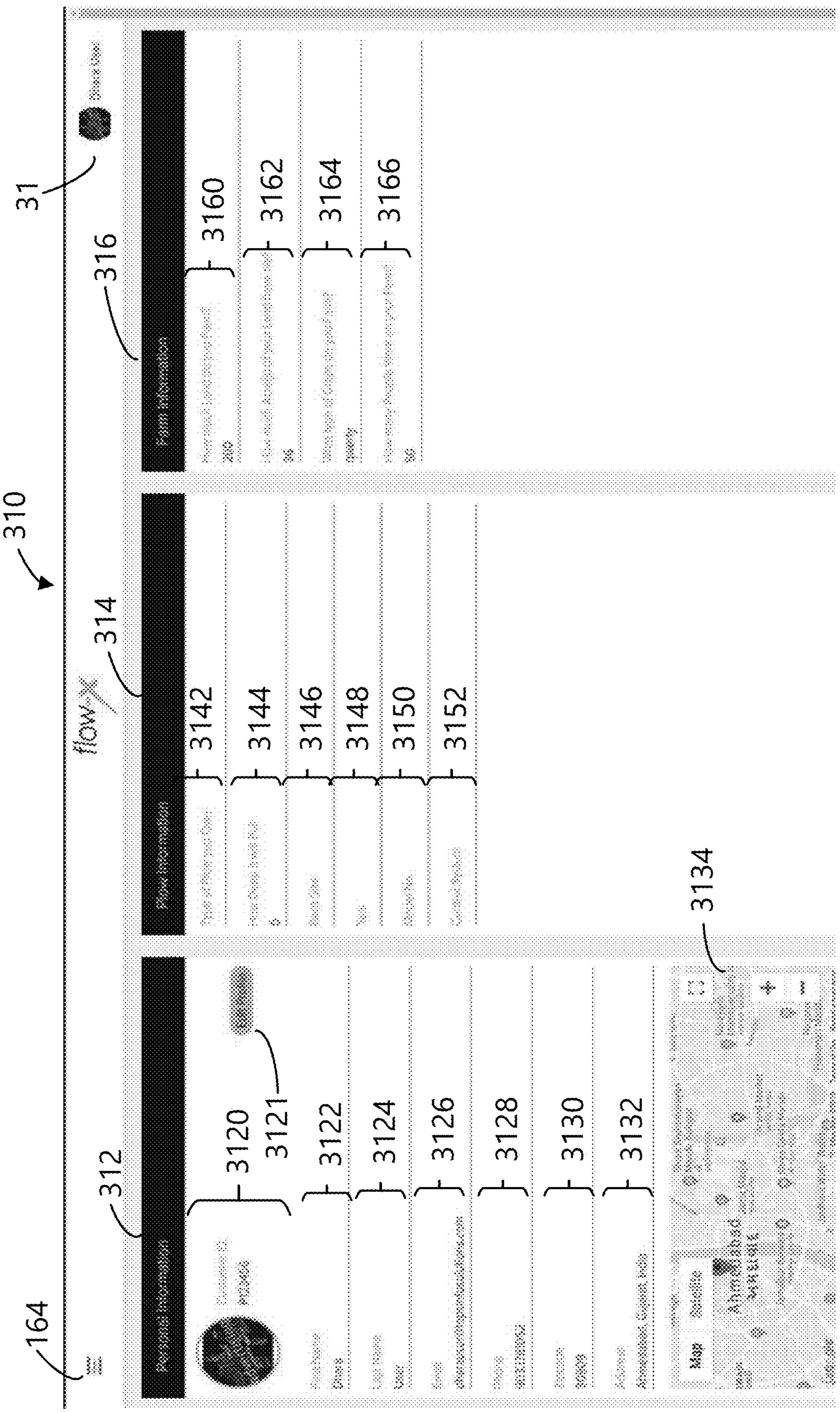
FIG. 31 is a screen display showing the user's profile.
Figure 32:
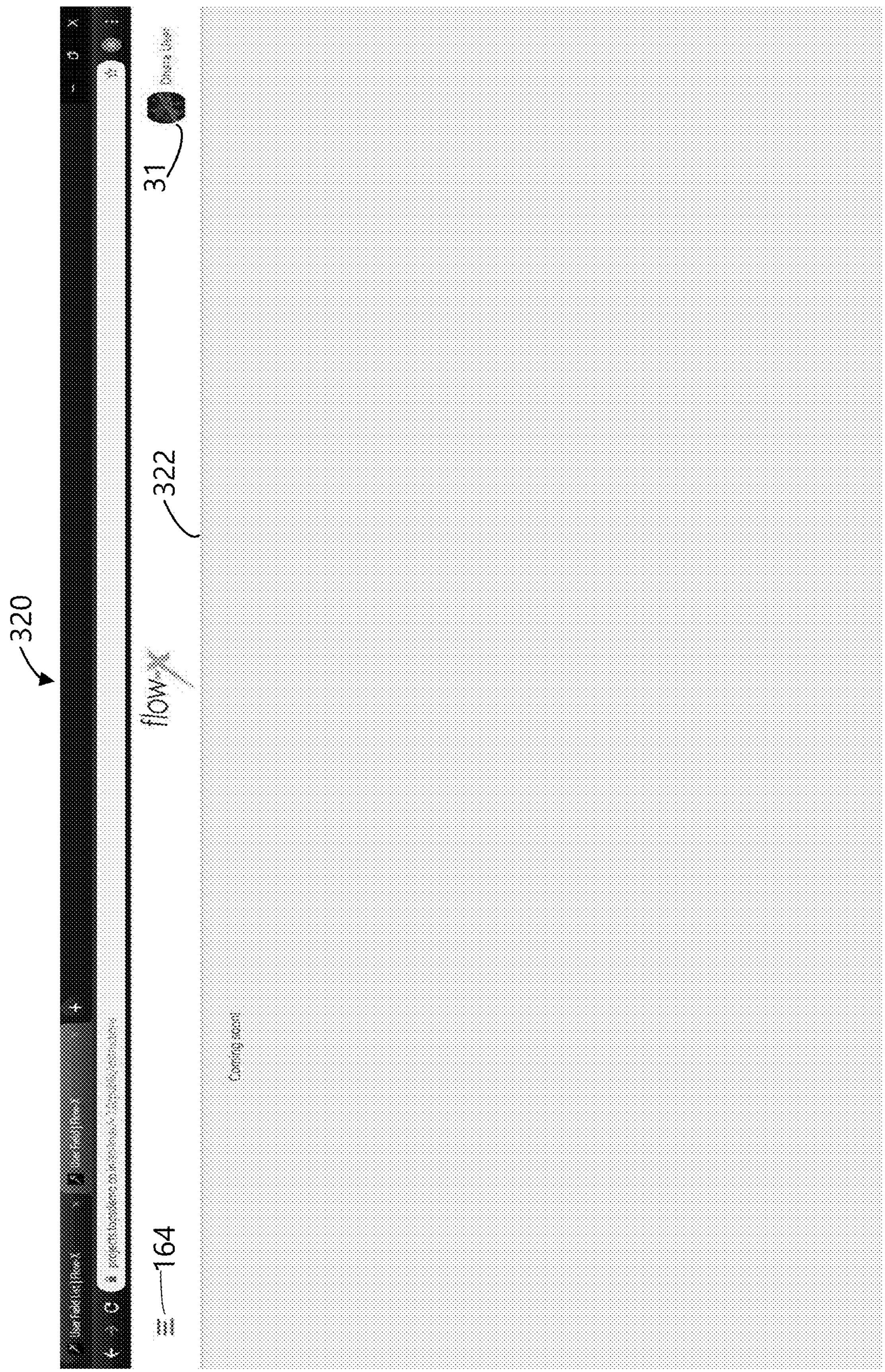
FIG. 32 is a screen display showing a page that may be used for providing instructions.
Figure 33:
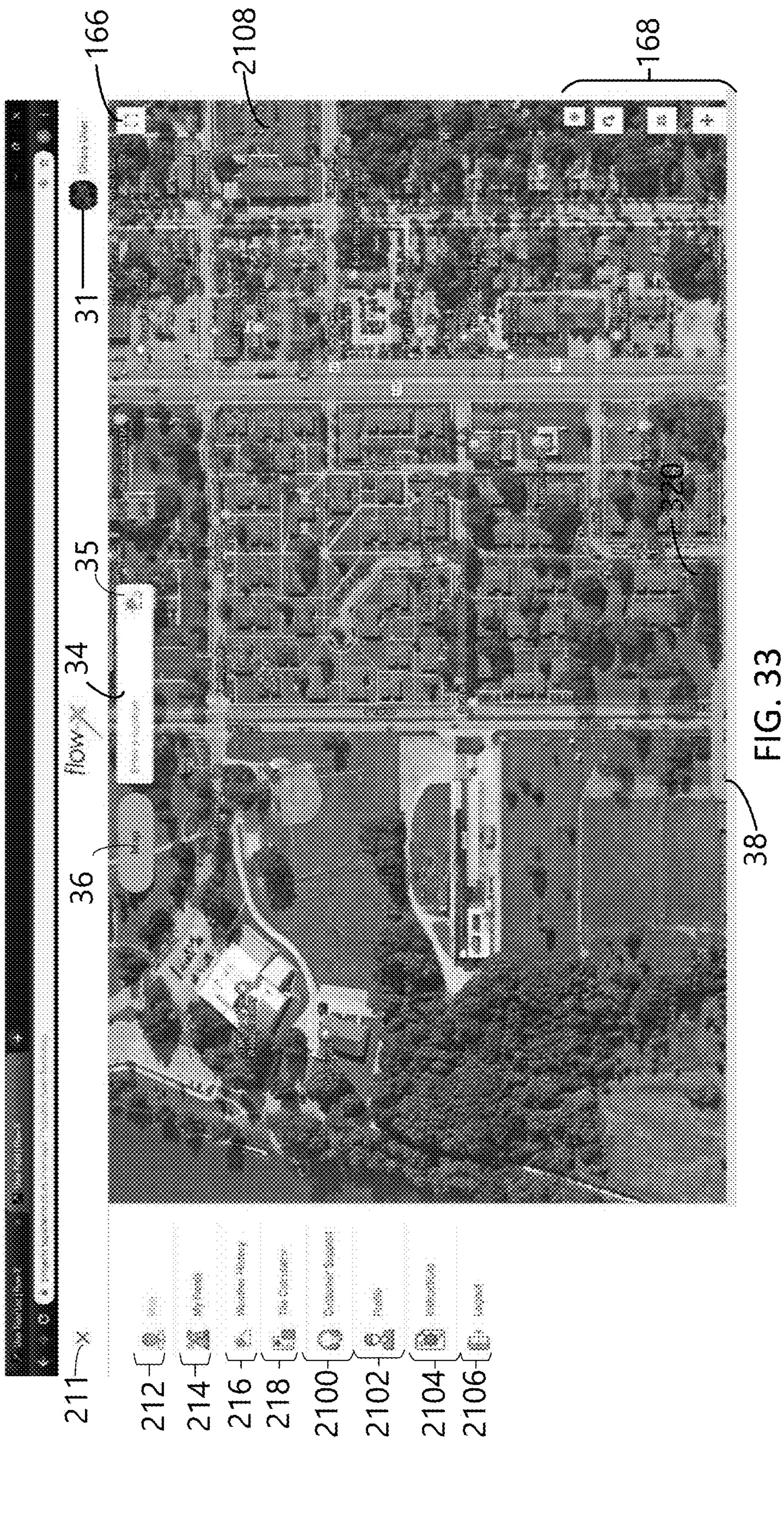
FIG. 33 is a screen display showing that a logout selection is provided in the menu bar.

FIG. 21 is a screen display 210 showing a map 2108 and a menu bar is on the left side. In response to the user selecting the "Map" button 212, the screen display 210 of FIG. 21 is shown. In response to the user selecting the "My Fields" item 214, the screen display 220 of FIG. 22 is shown. In response to the user selecting the "Weather History" item 216, the screen display 250 of FIG. 25 is shown. In response to the user selecting the "Tile Calculator" item 218, the screen display 270 of FIG. 27 is shown. In response to the user selecting the "Customer Support" item 2100, the screen display 300 of FIG. 30 is shown. In response to the user selecting the "Profile" item 2102, the screen display 310 of FIG. 31 is shown. In response to the user selecting the "Instruction" item 2104, the screen display 320 of FIG. 32 is shown. In response to the user selecting the "Logout" item 2106, the screen display 330 of FIG. 33 is shown.

Figure 23:
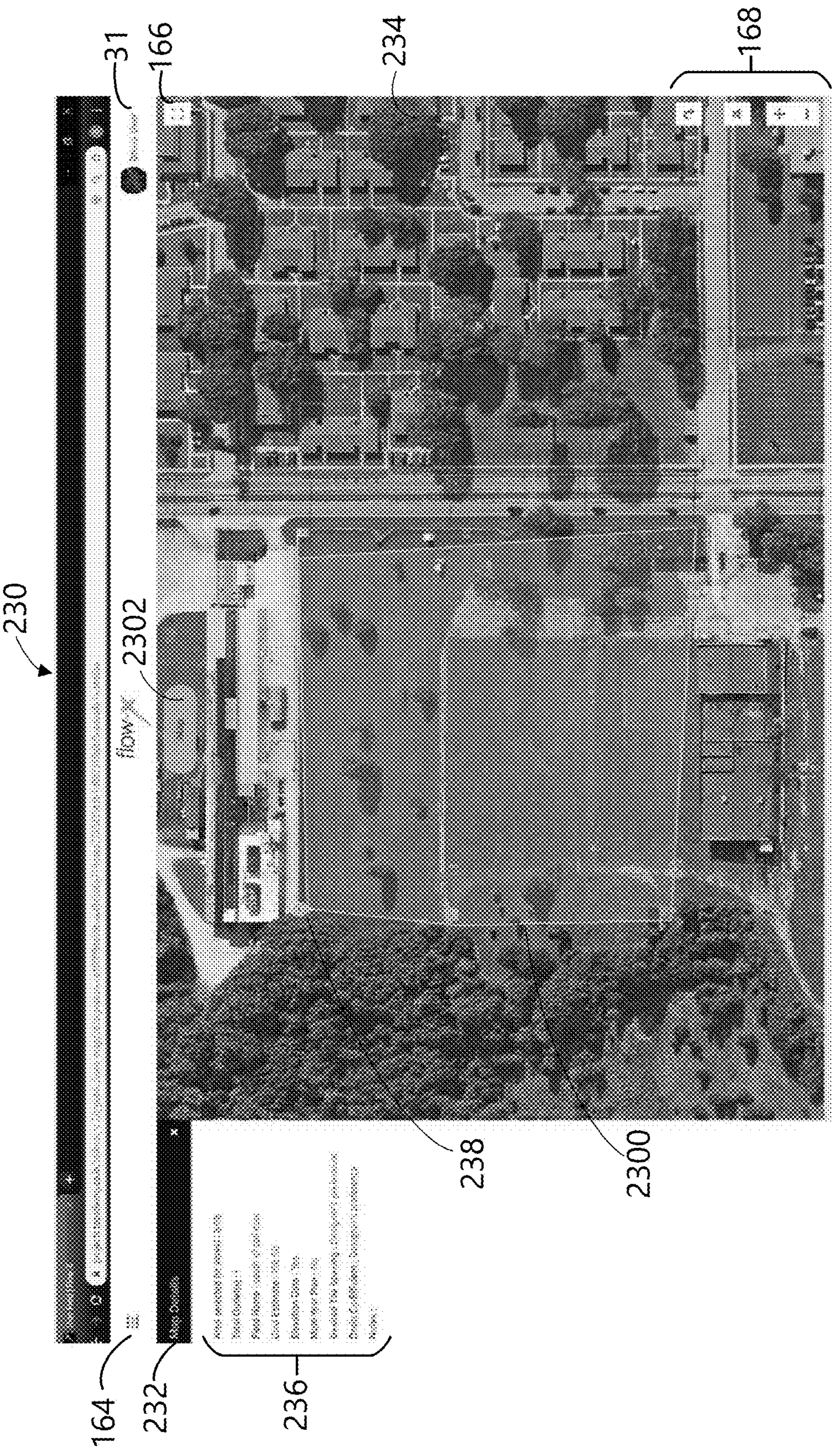
FIG. 23 is a screen display showing details of a selected area on satellite map.

FIG. 22 is a screen display 220. The name of the map is listed in the "Map Name" column 224, the time of the map is listed in the "Map Saved On" column 226, the status of the project is listed in the "Status" column 228, and then the last column shows the action taking of each project which listed in the "Action" column 2200. In response to the user selecting the map name "south of soil-max" 2208, the screen display 230 of FIG. 23 is shown. The user can enter the map name in "Find by Map Name" field 222 to find maps. The user can go to the last page by selecting the "Previous" link 2202, or the user can choose the page number by selecting the page number link 2204, or the user can choose to go to the next page by selecting the "Next" link 2206.

FIG. 23 is a screen display 230 showing details of a selected area on satellite map. The "Map Detail" 232 is on the left side to present the "south of soil-max" details on "Area selected (in acres)", "Total Outlet(s)", "Field Name", "Cost Estimate", "Elevation Data", "Multi-Year Plan", "Desired Tile Spacing", and "Drain Co-Efficient" in region 236 of screen display 230. A map 234 is shown with a selected region 2300 that has edges and light color inside. The outlet 238 marked with a location symbol on the upper left corner of the selected field. The user can generate another map by selecting "Map" button 2302.

Figure 24:
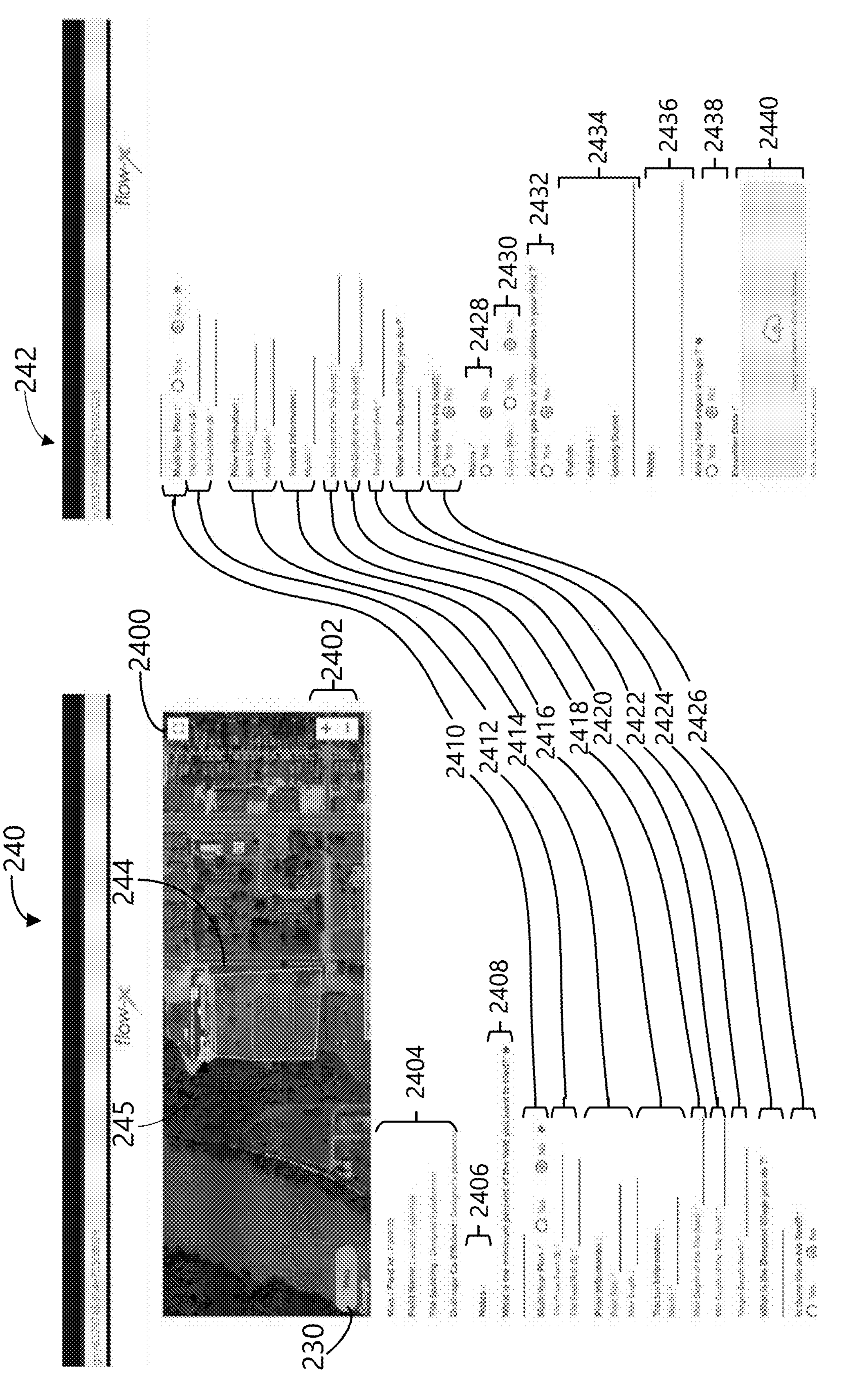
FIG. 24 is a screen display showing a questionnaire for the selected tile plan.

FIG. 24 includes two screen displays 240 and 242, which show the questionnaire for the selected tile plan, in response to the user selecting the "View Questionnaire" from the region 2200 in screen display of 220 of FIG. 22. The screen display 240 includes a map and some details 2404 for the project. The user can display the map in full screen by selecting the upper right button 2400, and other map adjustment links such as controlling zoom function are placed in the lower-right corner which appears as "+" and "−" buttons 2402. The selected field 244 is shown with outlet location 245. The user also may use map functions by selecting the "Map" button 230. The notes of the field may appear in the region 2406. The user may input a desired percentage in the "What is the minimum percent of the field you want to tile?" field 2408, a "Yes" or "No" answer in the "Multi-Year Plan" field 2410, a tile price and a tile feet in the field 2412, a boot size and the max depth in the "Plow Information" field 2414, a model of tractor in the "Tractor Information" field 2416, a maximum depth of the tile in the "Max Depth of the Tile (Feet)" field 2418, a minimum depth of the tile in the "Min Depth of the Tile (Feet)" field 2420, a target depth in "Target Depth (Feet)" field 2422, the deepest tillage the user have done in the "What is the Deepest Tillage you do?" field 2424, a "Yes" or "No" in the "Is there tile in his field?" field 2426, a "Yes" or "No" in the "Mains" field 2428, a "Yes" or "No" in the "County Main" field 2430, a "Yes" or "No" in the "Are there gas line or other utilities in your field?" field 2432, an identified outlet description in the "Identify Outlet" field 2434, a note to this questionnaire in the "Notes" field 2436, a "Yes" or "No" in the "Are any field edges a no go?" field 2438, and upload a file in the "Elevation Data" field 2440. Note all fields are necessarily required, however some fields may be required in order to ensure that sufficient information it provided to generate an appropriate tile plan.

FIG. 25 is a screen display 250 showing the user can access the weather data through the sun and cloud icon 35 that is next to the "Enter a location" field 34. In response to the user selecting the sun and cloud icon 35, the screen display 260 in FIG. 26 is shown.

Figure 26:
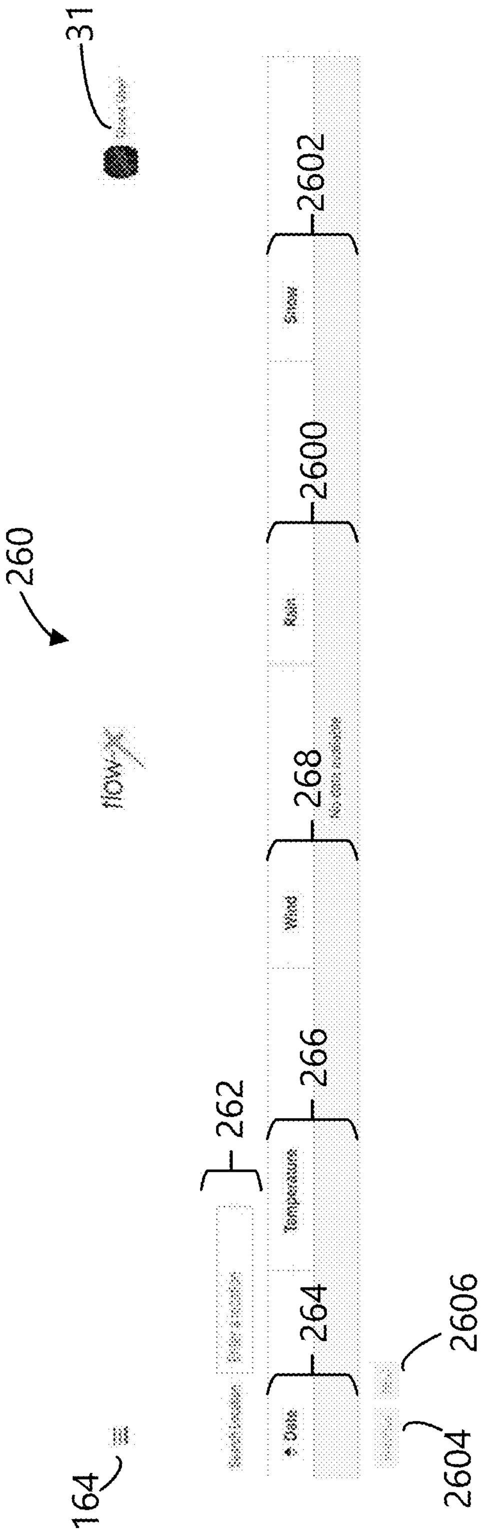
FIG. 26 is a screen display showing the weather data of the field to be tiled.

FIG. 26 is a screen display 260 showing the weather data of the field. The weather information includes the date in the "Date" column 264, the temperature in the "Temperature" column 266, the wind level in the "Wind" column 268, the rain level in the "Rain" column 2600, and the snow level in the "Snow" column 2602. The user can check the weather history by selecting the "Next" button 2606 for the next page and the "Previous" button 2604 for the previous page. The weather history is useful as it is indicative of the amount of water which should be drained from the field.

FIG. 27 is a screen display 270 showing the tile calculator. The calculator can calculate at least five different items, which includes the "Acre(s) Drained", the "Pipe Diameter", the "Pipe Amount", the "Slope" and the "Pump Size", which are shown in the dashboard 272. The screen display 270 presents the user with what is needed to calculate the acres of drained area. The user needs to enter a pipe diameter in inch in the "Pipe Diameter (in)" field 274, a percentage in the "% Grade" field 276 and a number in the "Drainage Coefficient field" 278. The number of the acres is shown in the "Acre(s) Drained" 2700, and the flow rate is shown in the "Gallons/Min" 2702. Once the information is collected, a user can select the "Calculate Acre(s) Drained" button 2704 to calculate the drained area. Another option is to share the calculation result 2706 with others.

Figure 28:
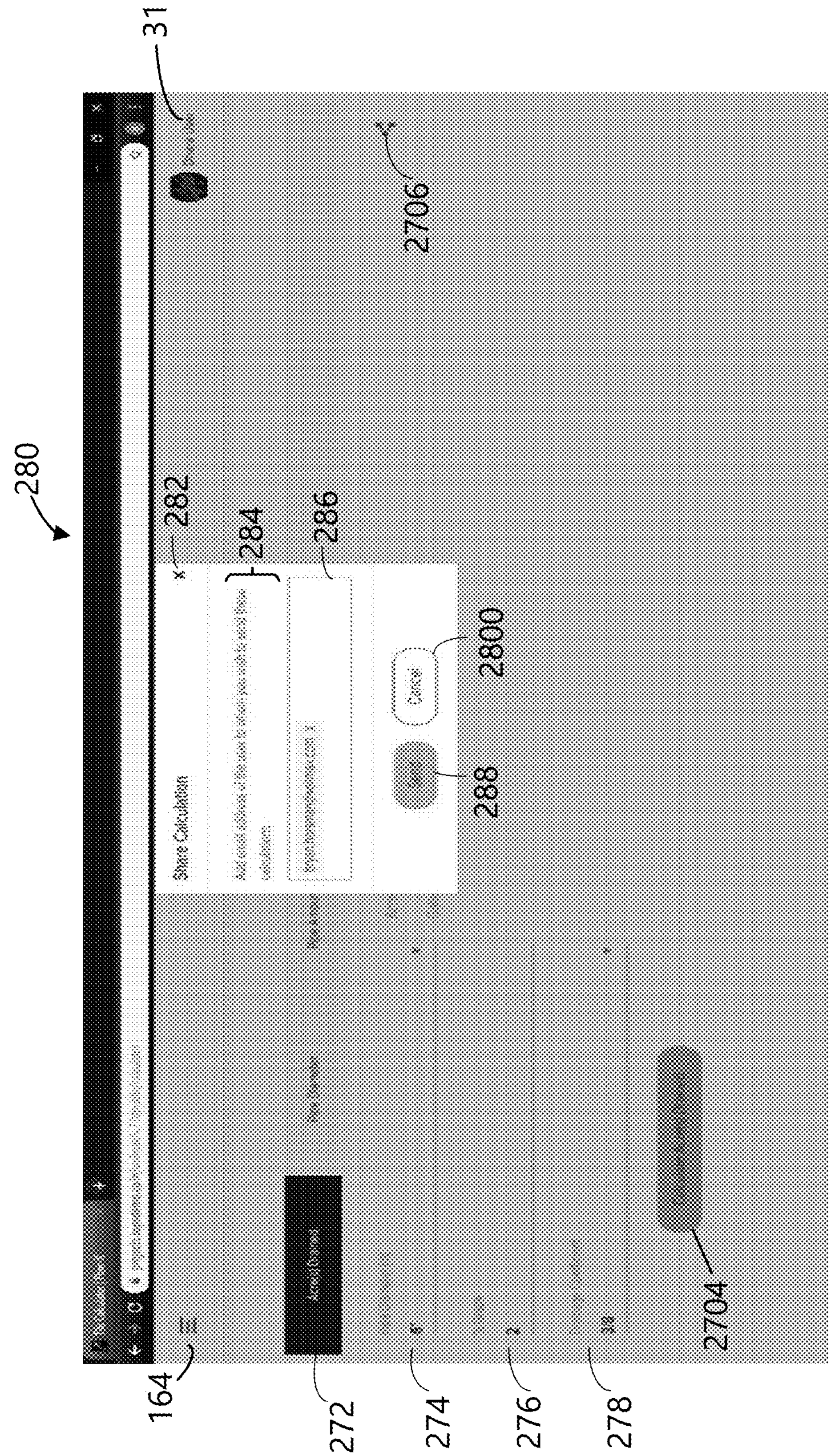
FIG. 28 is a screen display showing a tile calculation result which can be shared within email to other users.

FIG. 28 is a screen display 280 showing the tile calculation result can be shared by emailing to other users. Once the user selects the option to share with others, a "Share Calculation" modal window 282 appears. The "Share Calculation" window 282 gives a notification 284 to the user who can add an email address in the input area 286. Once the email address is added, the user can select the "Send" button 288 to share the calculation result, or the user can select the "Cancel" button 2800 to cancel. In response to the user selecting the "Send" button 288.

Figure 29:
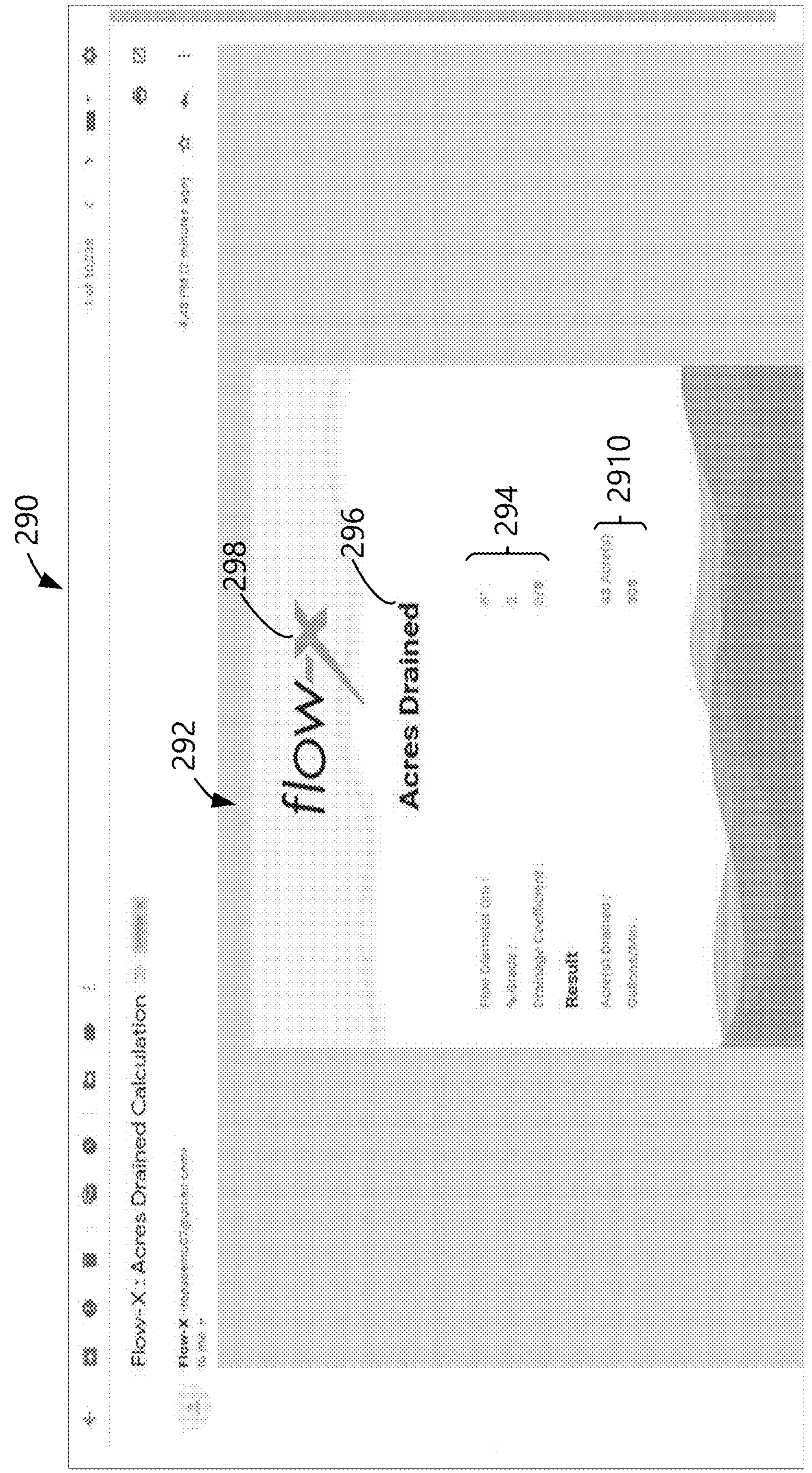
FIG. 29 is a screen display showing an email communicating results of tile calculations has been received by the user.

FIG. 29 is a screen display 290 showing an email of the tile calculation result has been received by the user. The calculation result may be accompanied by a picture 292 with the logo 298. In the calculation results, the "Acres Drained" 296 is shown in region 294. The calculation result 2910 may include that the "Acres(s) Drained" (i.e. 43 acres) and the drainage rate "Gallons/Min" (i.e. 308 gallon/min).

FIG. 30 is a screen display 300 showing the Customer Support Web Page and function in response to the user selecting the "Customer Support" 2100 in screen display 210 of FIG. 21. The screen display 300 includes a "Customer Support" title 302 and a symbol for "Customer Support" 304, a phone number 306, an email address 3010, and a message field 308 where customer can write messages to be communicated to the administrator. The message field 308 includes a message to the user 3012. This may include a message in the field 3014. The system may limit the length of the message. The user can select the "Send Message" button 3018 to send the message to the server.

FIG. 31 is a screen display 310 showing the user's profile in response to the user selecting the "Profile" link 2102 in the screen display 210 of FIG. 21. The screen display includes the "Personal Information" section 312, the "Plow Information" section 314, and the "Farm Information" section 316. The "Personal Information" 312 includes a profile picture with customer ID 3120, a first name in the "First Name" field 3122, a last name in the "Last Name" field 3124, an email in the "Email" field 3126, a phone number in the "Phone Number" field 3128, a zip code in the "Zipcode" field 3130, an address in the "Address" field 3132, and a map 3134. The map 3134 has other options that include the ability to select the "Satellite" link, a full screen function, and a controlling zoom function. The "Plow Information" 314 includes a type of plow the user owned in the "Type of the Plow you Own" field 3142, a number in the "How Deep it will Pull" field 3144, a boot size in the "Boot Size" field 3146, a year in the "Year" field 3148, a model number in the "Model No." field 3150, a control system detail in the "Control System" field 3152. The "Farm Information" 316 includes a land size in the "How much Land do you Farm?" field 3160, a tile size in the "How many Acre(s) of your Land have tile?" field 3162, a type of crops in the "What type of Crops do you Farm?" field 3164 and a number of people in the "How many People Work on your Farm?" field 3166. The user information is very useful as a future reference in new tile plan or other service.

FIG. 32 is a screen display 320 showing that an instruction guide 322 may be provided.

FIG. 33 is a screen display 330 showing the "Logout" link 2106 is in the menu bar.

Figure 34:
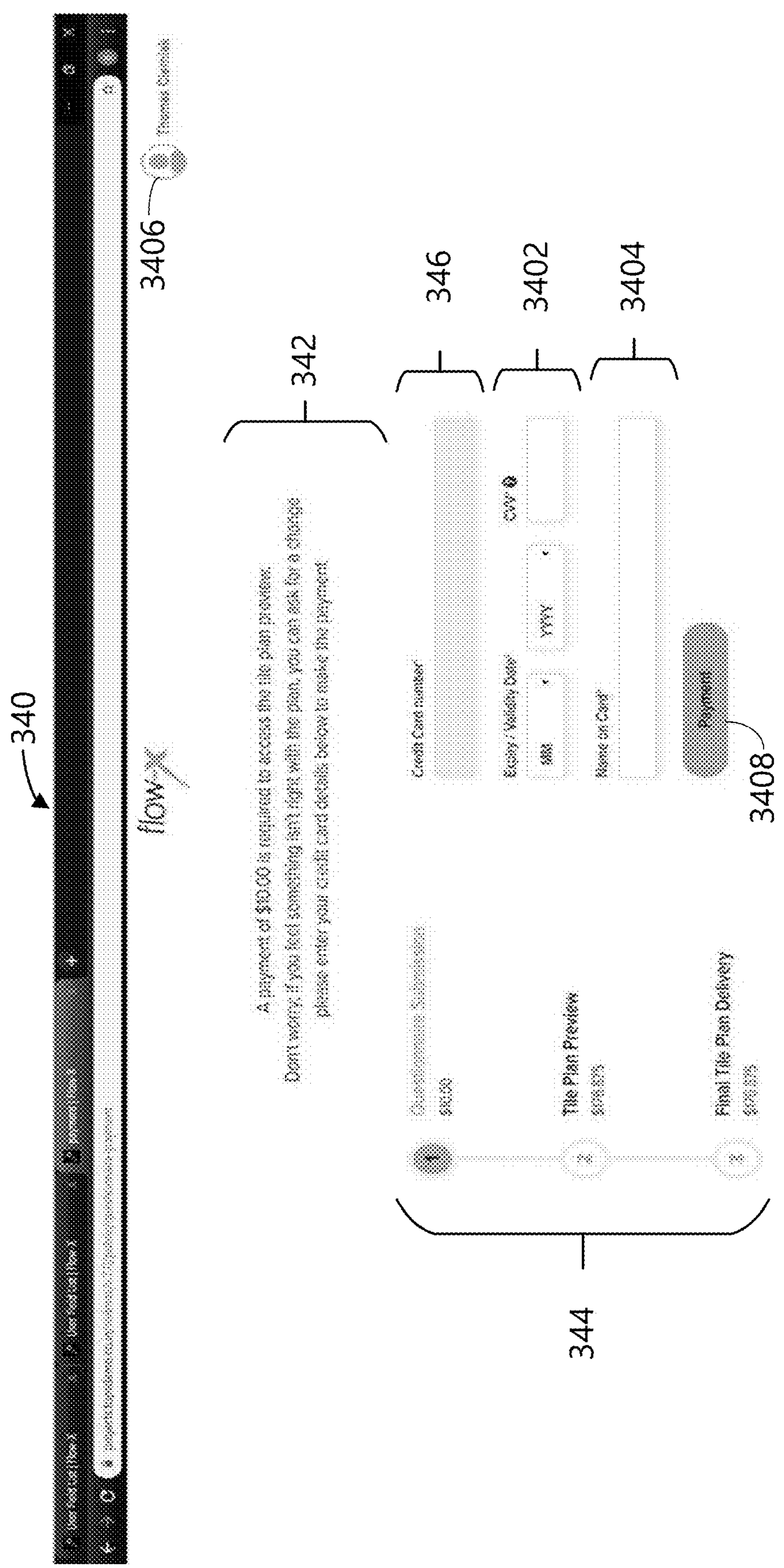
FIG. 34 is a screen display showing a payment function.

FIG. 34 is a screen display 340 showing the Payment function. The screen display 340 includes a username and profile picture 3406 on the upper right corner, and a payment page. The payment page includes payment instructions 342 at the top of the page, a process 344 on the left side, and a payment region on the right. The user needs to enter a card number in the "Credit Card number" field 346, a expire or validity date in the "Expiry/Validity Date" field 348, a CVV number in the "CVV" field 3402, and a name in the "Name on Card" field 3404. Once the information is collected, the user can select the "Payment" link 3408 to pay for the tile plan or other service.

Figure 35:
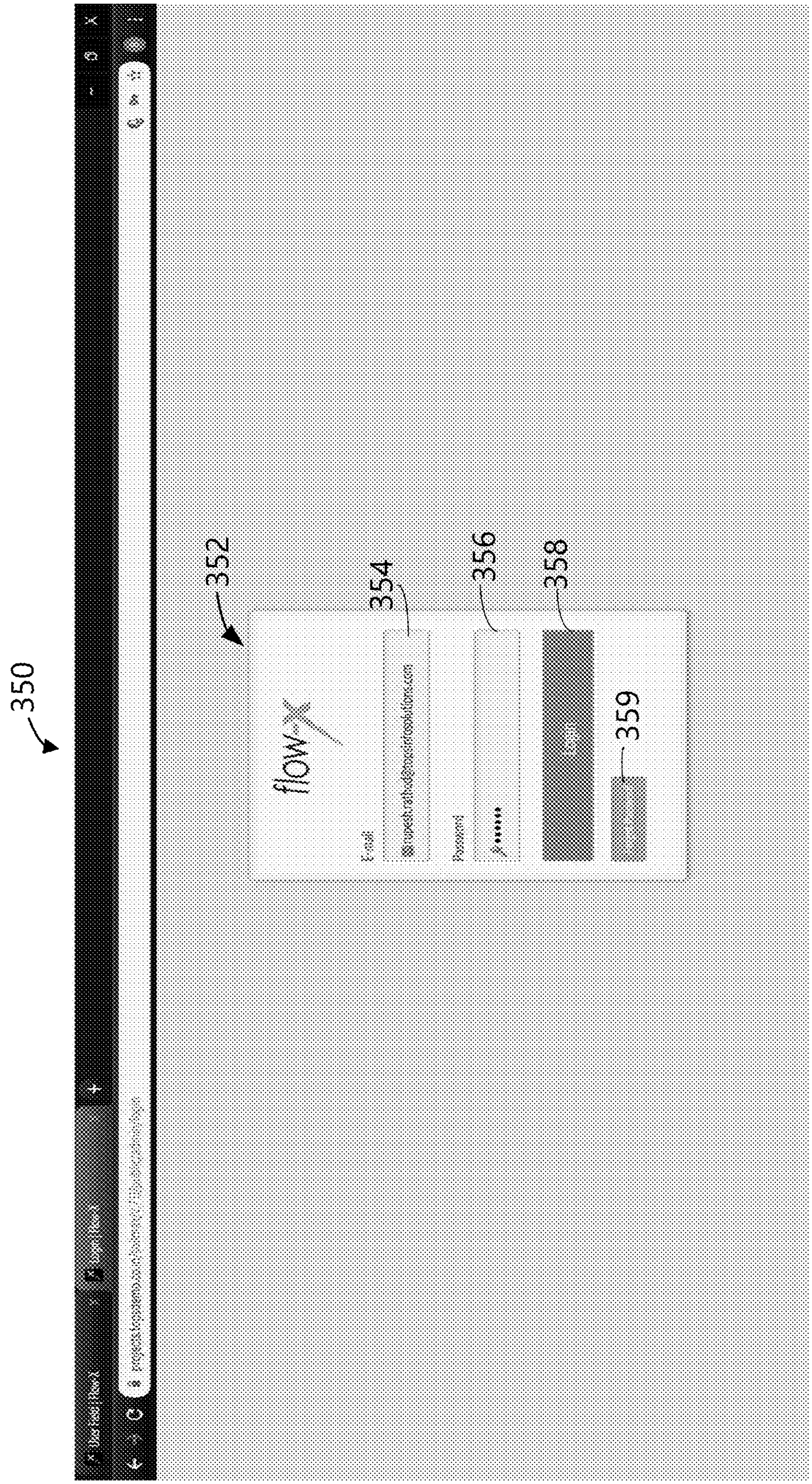
FIG. 35 is a screen display showing the super admin log-in web page.
Figure 36:
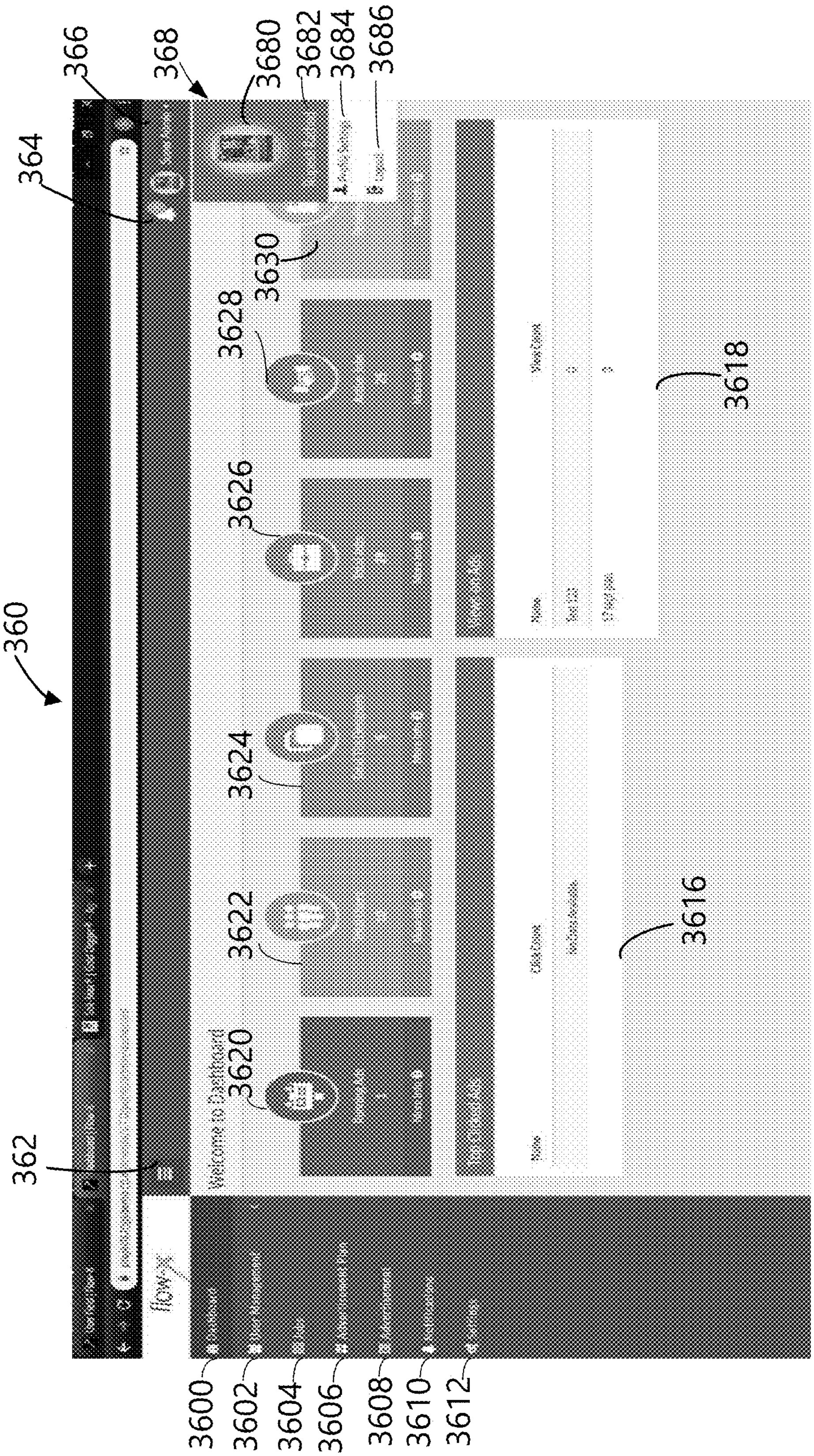
FIG. 36 is a screen display showing the super admin has a dashboard page which may be displayed after the super admin has logged in to the website.

FIG. 35 is a screen display 350 showing the log-in page for a super admin. The log-in page includes a "Log In" panel 352. The super admin enters an email address in the "E-mail" field 354, and a password in the "Password" field 356. Once the information is collected, the user may select the "Login" button 358 to login to the dashboard for super admin. In response to the user selecting the "Login" button 358, the screen display 360 of FIG. 36 is shown. The "Forgot Password" button 359 has the ability to reset password for the user.

Figure 37:
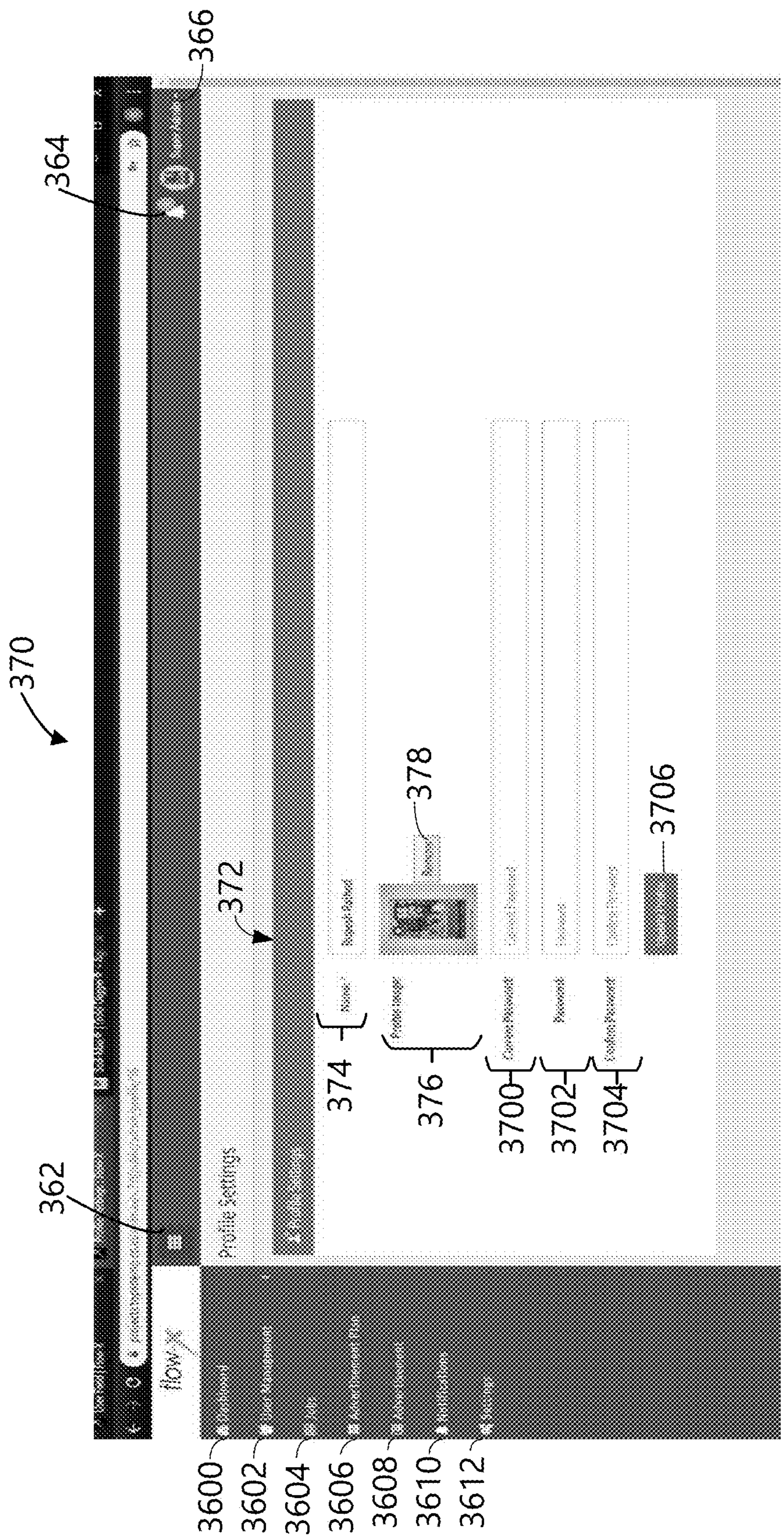
FIG. 37 is a screen display showing the super admin has a profile setting web page.

FIG. 36 is a screen display 360 showing the dashboard for the super admin. The super admin can select the "Super Admin" link 366 to change profile information. In response to the super admin selecting the "Super Admin" link 366, the region 368 of screen display 360 is shown. The region 368 includes a username 3680, a profile picture 3682, a "Profile Settings" link 3684, and a "Logout" link 3686. In response to the super admin selecting the "Profile Settings" link 3684, the screen display 370 of FIG. 37 is shown. The super admin has other options including the menu bar link 362. In response to the super admin selecting the menu bar on the left side, which includes a "Dashboard" link 3600, an "User Management" link 3602, a "Jobs" link 3604, an "Advertisement Plan" link 3606, an "Advertisement" link 3608, a "Notification" link 3610, and a "Settings" link 3612. The user is also presented with information on the number of running ads in the "Running Ads" region 3620, the number of total users in the "Total Users" region 3622, the number of the total tile designers in the "Total Tile Designers" region 3624, the number of total jobs in the "Total Jobs" region 3626, the number of active jobs in the "Active Jobs" region 3628, the number of the pending jobs in the "Pending Jobs" region 3630, a list of top clicked ads with the number of clicks on top ads in the "Top Clicked Ads" region 3616, and a list of ads with the number of views on ads in the "Views on Ads" region 3618. Another option includes the ability to select the "Bell" link 364 to check notifications.

FIG. 37 is a screen display 370 showing the "Profile Setting" region 372 in response to the super admin selecting the "Profile Setting" link 3684 of screen display 360. In region 372, the information about the user is collected. The super admin can update profile by entering a name in the "Name" field 374, a current password in the "Current Password" field 3700, and a password in the "Password" field 3702. The super admin can remove a profile image by selecting the "Remove" link 378 in the "Profile Image" field. The super admin also confirms the password 3704 in the "Confirm Password" field 3704 by repeating the password 3702. Once all the information is collected, the super admin can select the "Update Profile" button 3706 to update the profile.

Figure 38:
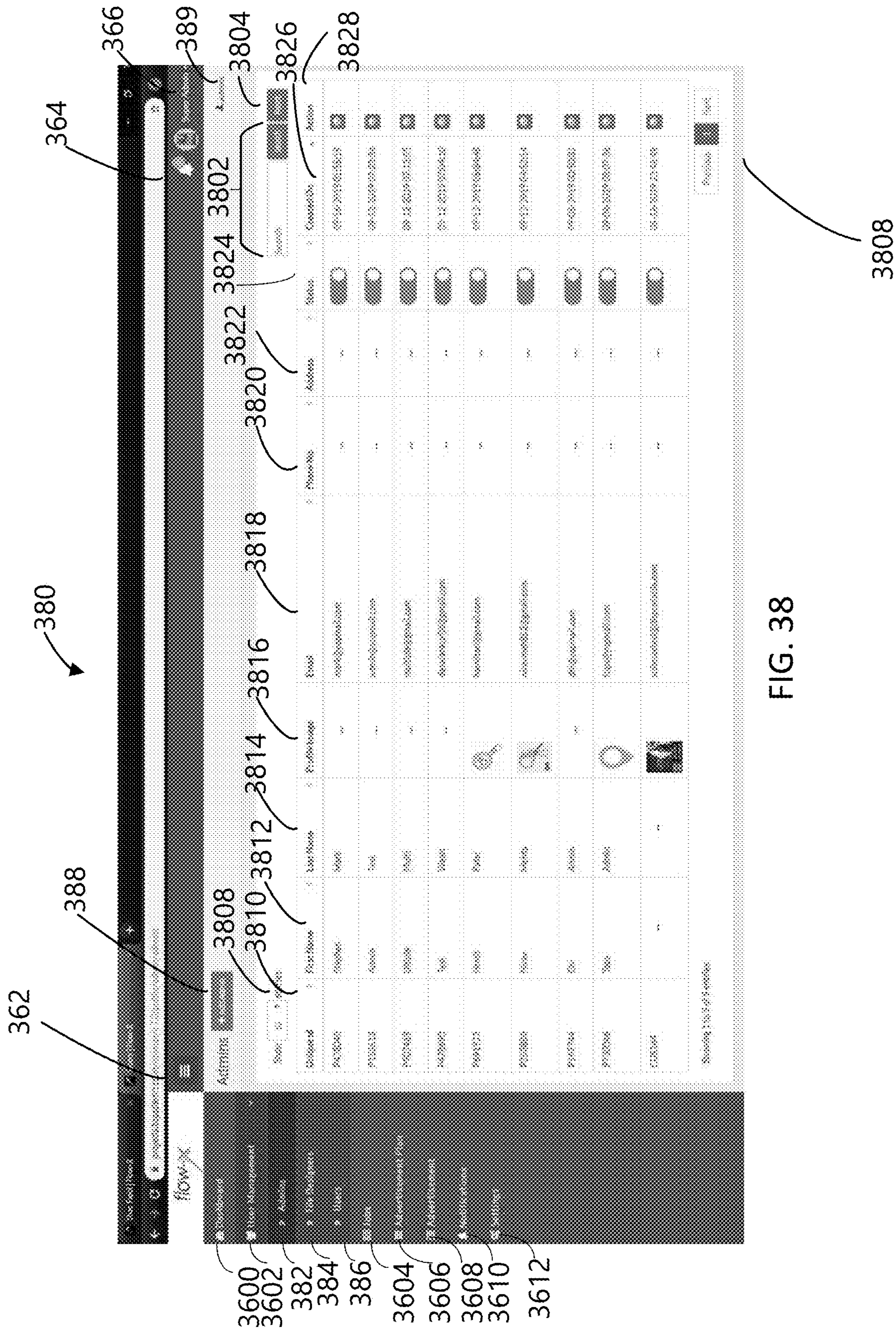
FIG. 38 is a screen display showing the super admin can manage users.

FIG. 38 is a screen display 380 showing the super admin can manage admins. The current location of the super admin is presented within the region 389 at the upper right corner. In response to the super admin selecting the "User Management" link 3602, the "Admins" link 382 and the "Tile Designers" link 384 and the "Users" link 386 are shown under the "User Management" link 3602. In response to the super admin selecting the "Admins" 382, the region 3800 is shown. There is an "+ Add Admin" link 388, a list of admins, a number of entries on the list 3806, a searching field 3802, a "Reset" 3804, and a page number 3808 with "Previous" and "Next" links. The list of admins includes a list of "Unique Id" column 3810, a list of "First Name" 3812, a list of "Last Name" 3814, a list of "Profile Image" 3816, a list of "Email" 3818, a list of "Phone No." 3820, a list of "Address" 3822, a list of "Status" 3824, a list of "Created On" dates 3826, and a list of "Action" 3828.

Figure 39:
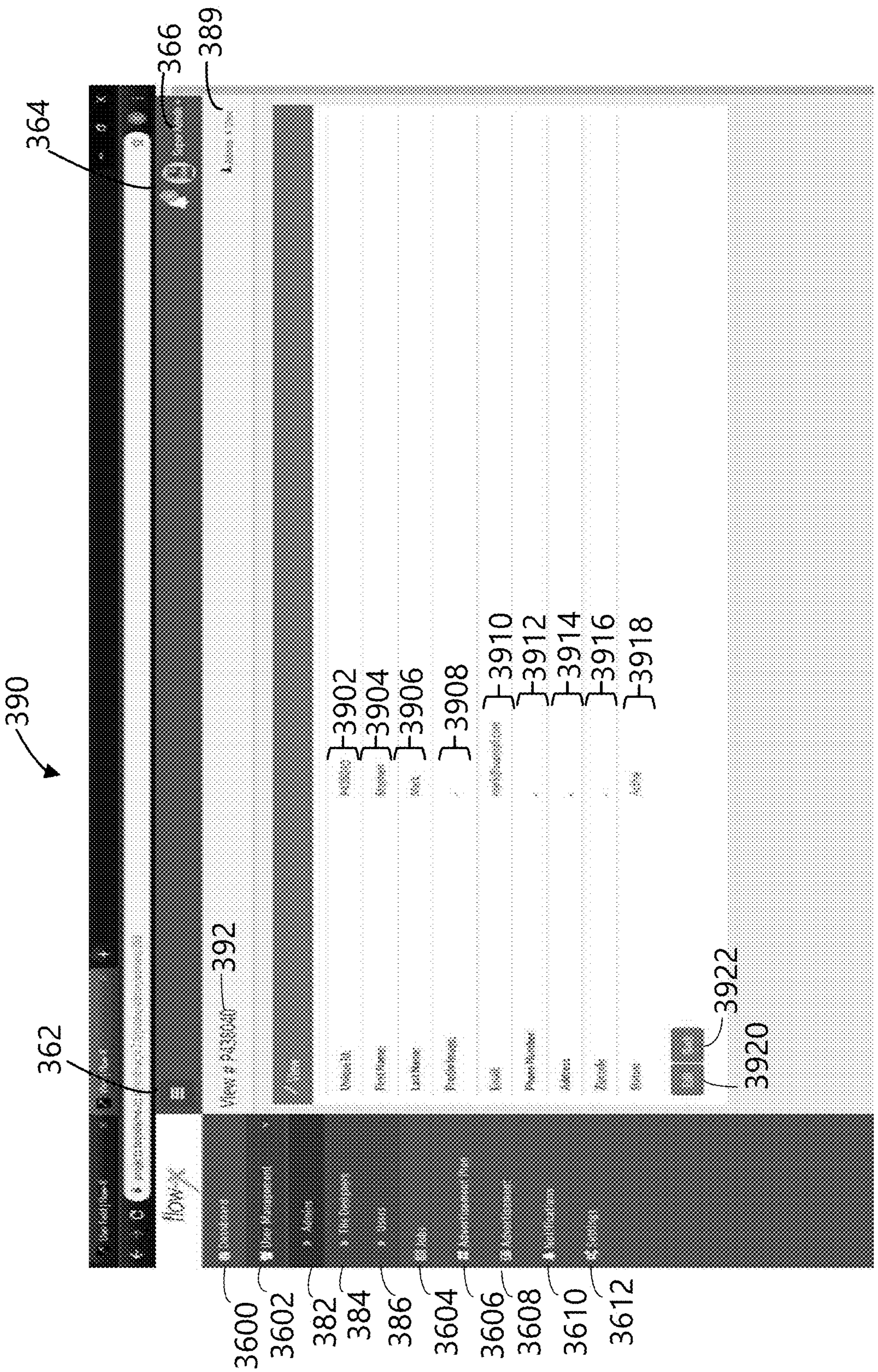
FIG. 39 is a screen display showing the super admin has access to the user personal information.

FIG. 39 is a screen display 390 showing the super admin can access the user information. The current location of the super admin is presented. The user information page includes an Id as page title 392 and a "View" region. In the "View" region, the information about the admins includes an "Unique Id" 3902, a "First Name" 3904, a "Last Name" 3906, a "Profile Name" 3908, an "Email" 3910, a "Phone Number" 3912, an "Address" 3914, a "Zipcode" 3916, and the admin's status 3918. In response to the "Back" button 3922, the screen display 380 (see FIG. 38) is shown. The super admin selects the "Edit" button 3920 to edit the admin's information.

Figure 40:
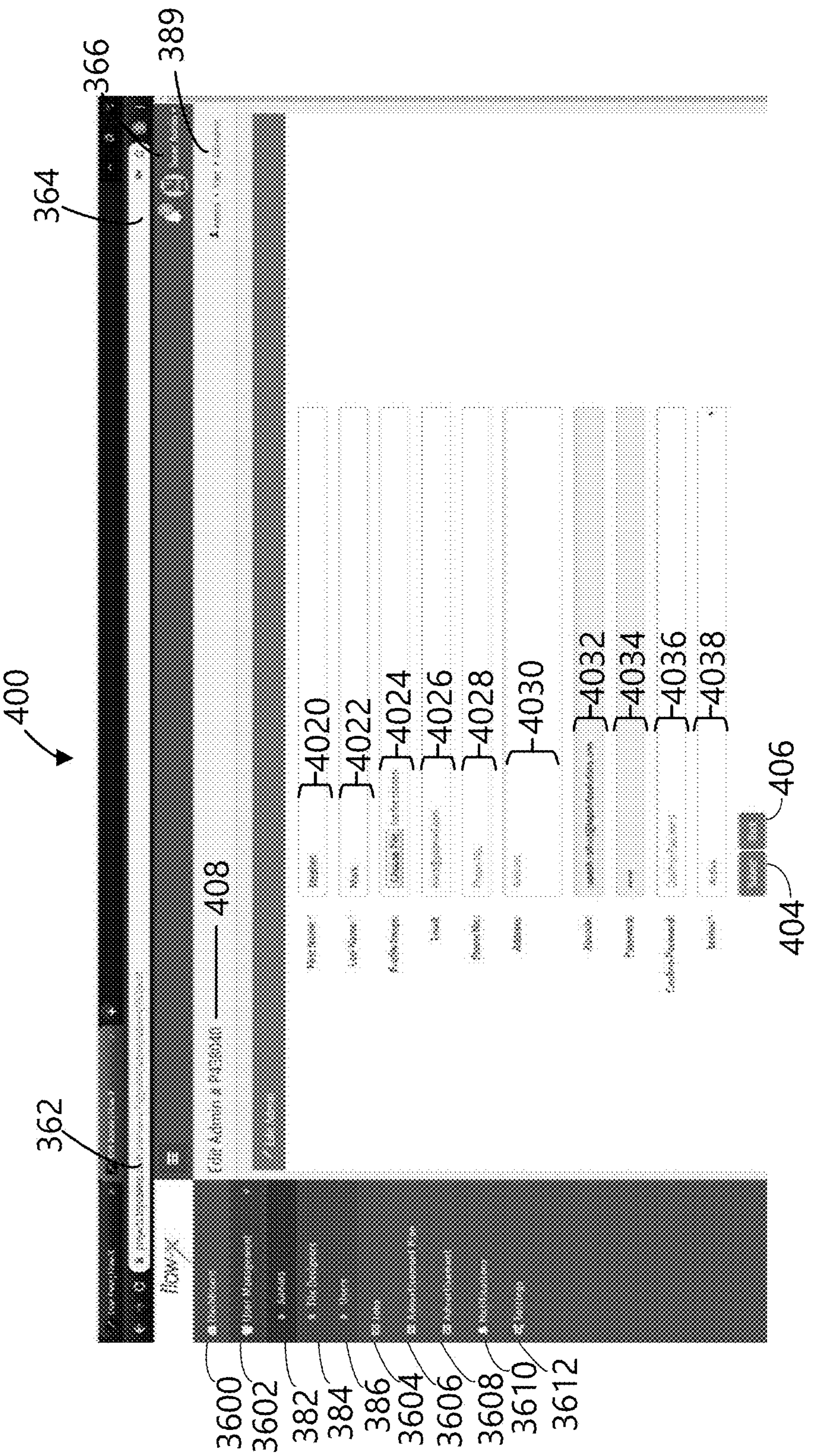
FIG. 40 is a screen display showing the super admin can edit the admin's information.

FIG. 40 is a screen display 400 showing the response to the super admin selecting the "Edit" button 3920 in FIG. 39. The current location of the super admin is presented. The super admin is presented with the page name and the Id of admins 408. The "Edit Admin" region allows the super admin to edit the first name in the "First Name" field 4020, a last name in the "Last Name" field 4022, a profile image which may be submitted by selecting the "Choose File button 4024, an email in the "Email" field 4026, a phone number in the "Phone No." field 4028, an address in the "Address" field 4030, a zip code in the "Zipcode" field 4032, a password in the "Password" field 4034, a confirmation of the password 4034 in the "Confirm Password" field 4036, and the status in the "Status" field 4038. The super admin has ability to select the "Submit" button 404 to submit the collected information to the server, or the super admin may select the "Back" button 406 to go back to the "View" page of screen display 390 of FIG. 39.

Figure 41:
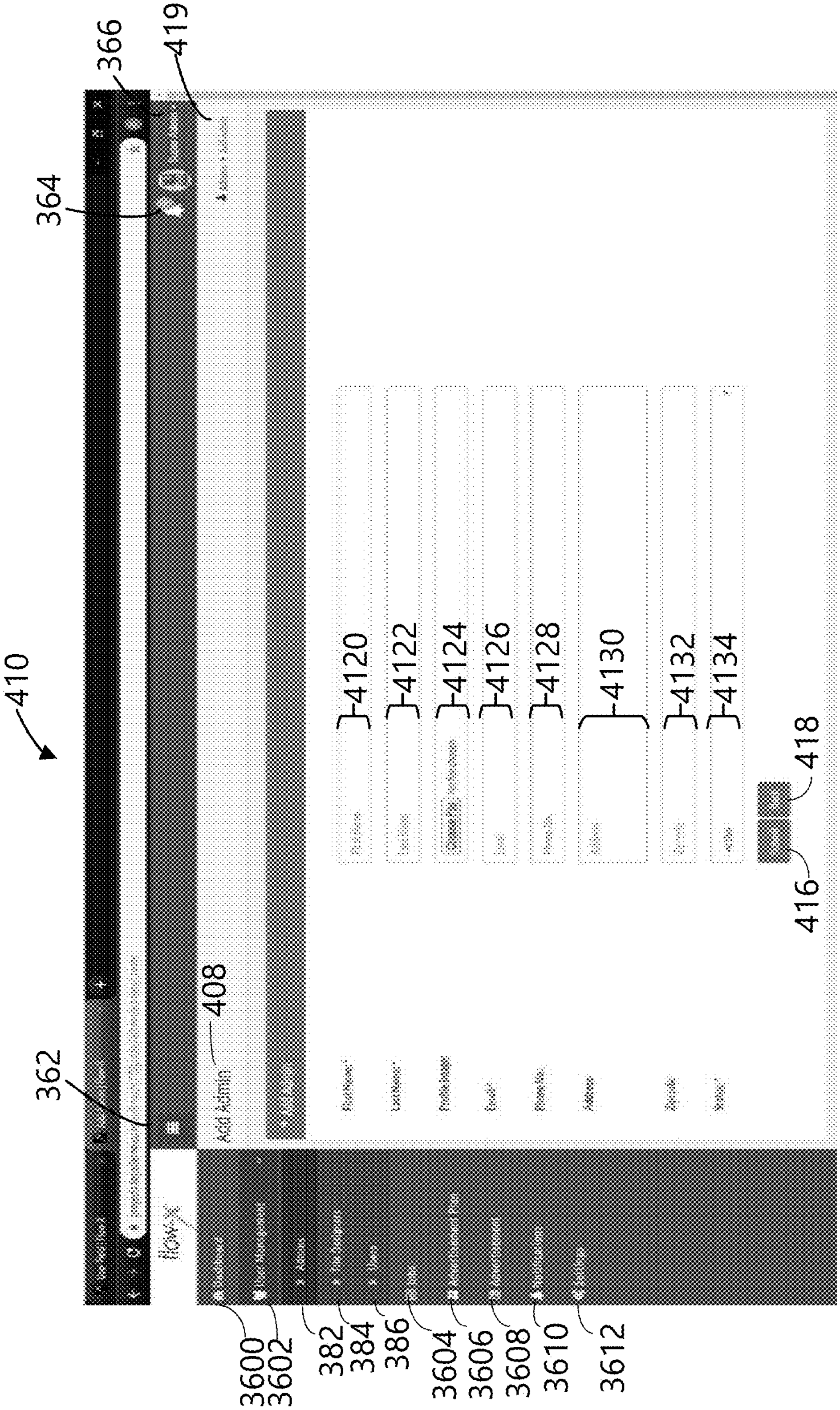
FIG. 41 is a screen display showing the super admin can add a new administrator (admin).

FIG. 41 is a screen display 410 showing the super admin can add a new Admin. The current location of the super admin is presented. The title of the page name shows as "Add Admin" 419. The super admin enters a first name in the "First Name" field 4120, a last name in the "Last Name" field 4122, a profile image updating by selecting the "Choose File" button 4124, an email address in the "Email" field 4126, a phone number in the "Phone No." field 4128, an address in the "Address" field 4130, a zip code in the "Zipcode" field 4132, and an account status in the "Status" field 4134. Once all the information is collected, the super admin may select the "Submit" button 416 to submit, or the super admin may select the "Back" button 418 to go back to last page which may be screen display 400 of FIG. 40.

Figure 42:
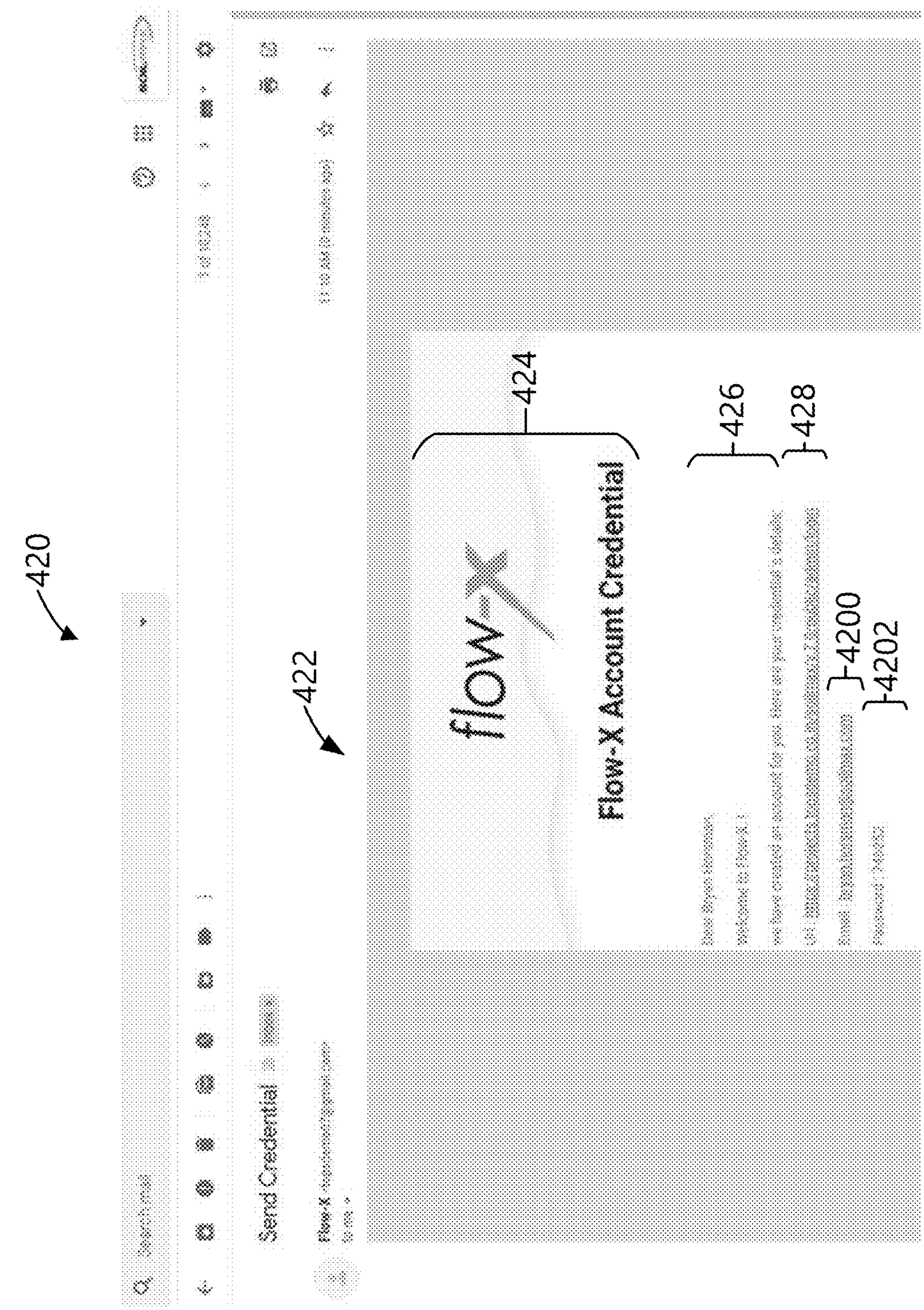
FIG. 42 is a screen display showing a credential email received by the new admin.

FIG. 42 is a screen display 420 showing a credential email received by the new Admin. The email page 422 includes a logo with an email subject as a title 424, a greeting to the new admin 426, a URL link 428, an email address 4200, and a password 4202.

Figure 43:
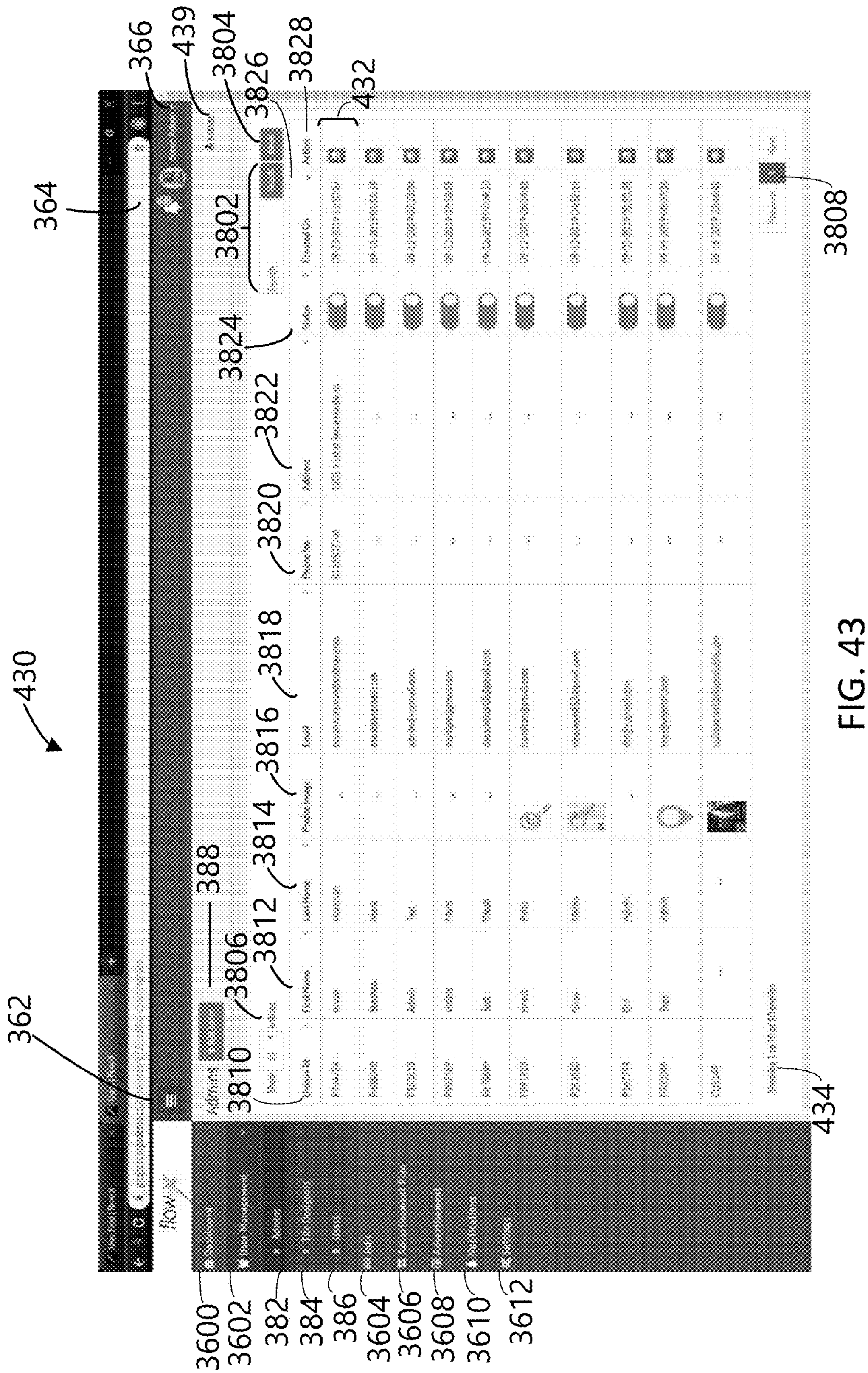
FIG. 43 is a screen display shows the new admin has joined the admin group.

FIG. 43 is a screen display 430 showing the new admin 432 added on the admin list. The current location of the super admin is presented. The list of admins 4300 shows 10 entries as the "Showing 1 to 10 of 10 entries" 434 on the lower-left corner.

Figure 44:
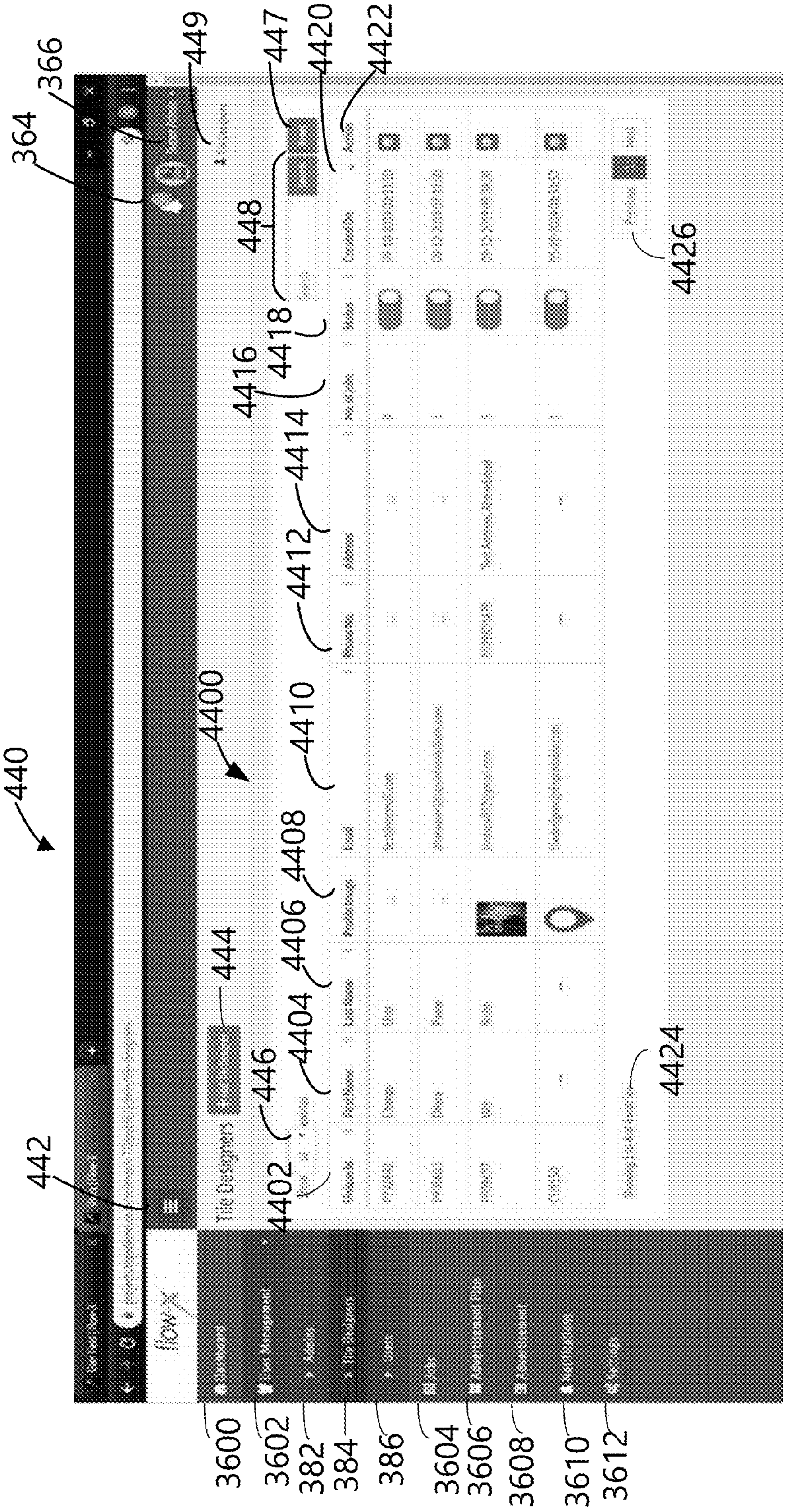
FIG. 44 is a screen display showing all the tile designers in the list

FIG. 44 is a screen display 440 showing all the tile designers in the list 4400. The current location of the super admin is presented in the region 449. The region 449 includes a "+ Tile Designers" button 444, a list of tile designers 4400, a number of entries on the list 4424, a searching field 448, a "Reset" button, and a page number 4426 with "Previous" link and "Next" link. The list of tile designers 4400 includes a list of "Unique Id" column 4402, a list of "First Name" 4404, a list of "Last Name" 4406, a list of "Profile Image" 4408, a list of "Email" 4410, a list of "Phone No." 4412, a list of "Address" 4414, a list of "No. of jobs" 4416, a list of "Status" 4418, a list of "Created On" 4420, and a list of "Action" 4422.

Figure 45:
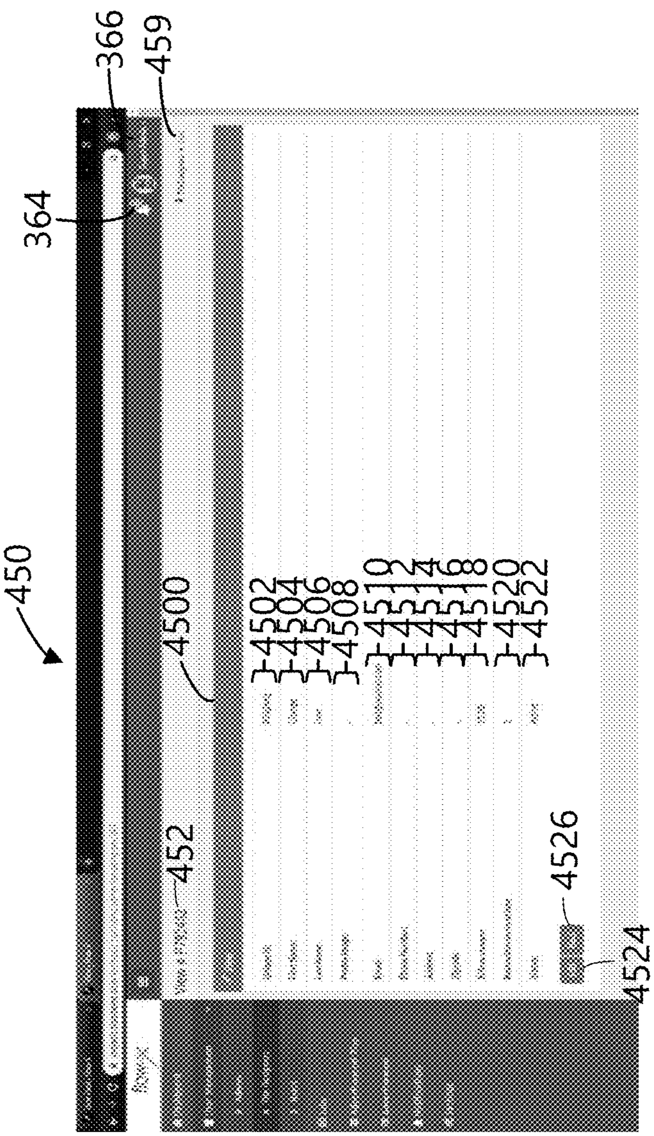
FIG. 45 is a screen display showing the super admin can view the tile designer's contact information.

FIG. 45 is a screen display 450 showing the information of the tile designer to the super admin. The current location of the super admin is presented in the region 459. The "View" 4500 is shown in response with the super admin selecting the "Tile Designers" link 384 of screen display 380 of FIG. 38. The head 452 of the tile designer page appears with "View" and the ID number. The screen display 450 includes an "View" page 4500. The page 4500 includes a "Unique Id" 4502, a "First Name" 4504, a "Last Name" 4506, a "Profile Image" 4508, an "Email" 4510, a "Phone Number" 4512, an "Address" 4514, a "Zipcode" 4516, a "$/Acre charges" 4518, a "Restriction on no of jobs" 4520, and a "Status" 4522. The super admin may select the "Edit" button 4524 to edit, and a "Back" button 4526 to go back to the last page.

Figure 46:
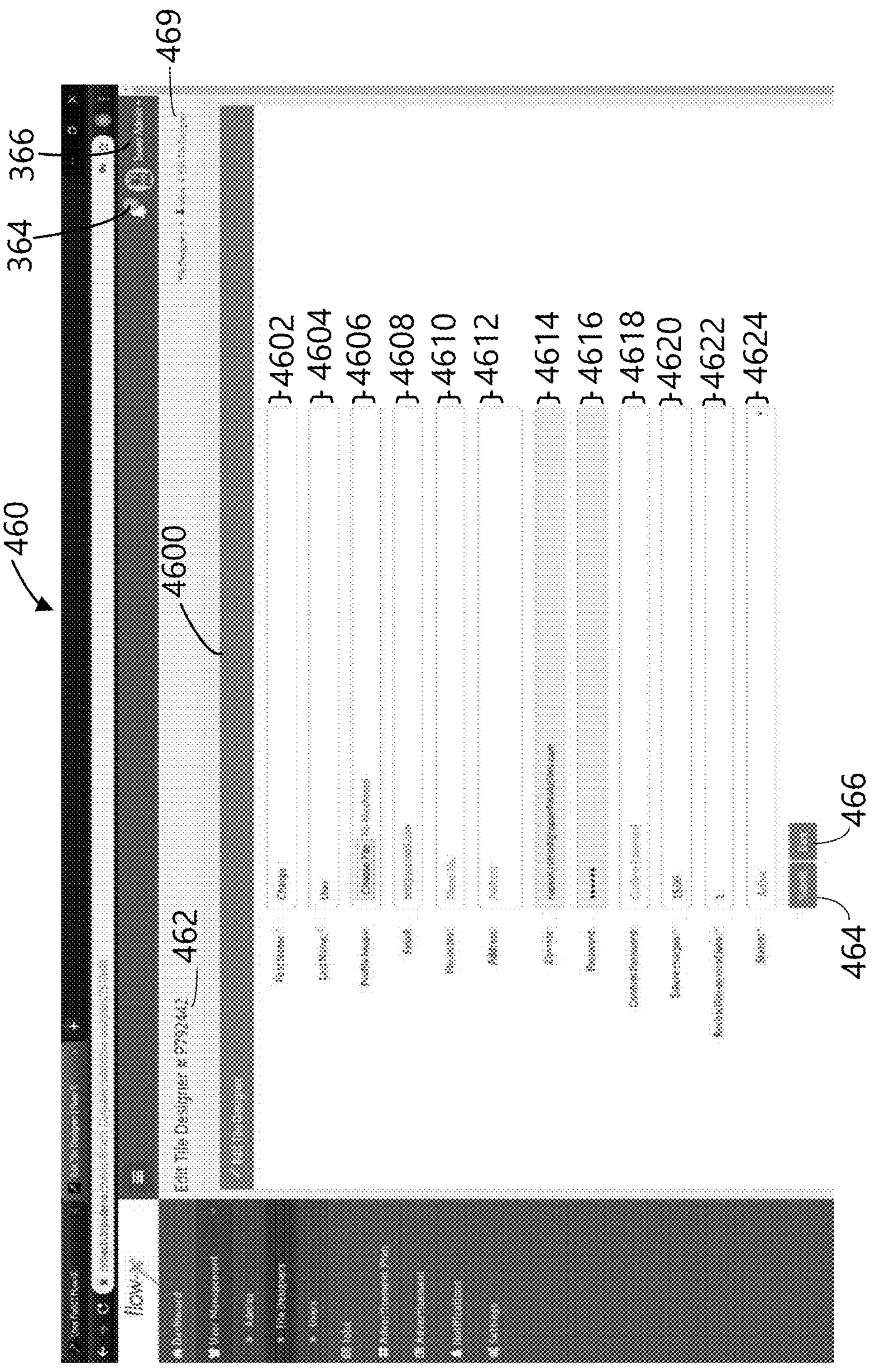
FIG. 46 is a screen display showing the super admin can edit the tile designer's information and change the pay rate.

FIG. 46 is a screen display 460 shown in response with the super admin selecting the "Edit" link 4524 in screen display 450 of FIG. 45 to edit the information of the tile designer. The head 462 of the tile designer page appears with "Edit Tile designer" and the ID number. The current location of the super admin is presented in the region 469. The screen display 460 includes an "Edit Tile Designer" page 4600. The super admin may input information in the "First Name" field 4602, a "Last Name" field 4604, a "Profile Image" field 4606, an "Email" field 4608, a "Phone No." field 4610, an "Address" field 4612, a "Zipcode" field 4614, a "Password" field 4616, a "Confirm Password" field 4618, a "$/Acre charges" field 4620, a "Restriction on no of jobs" field 4622, and the "Status" field 4624. Once the information is edited, the super admin selects the "Submit" button 464 to submit the change, or the super admin selects the "Back" button 466 to cancel the change.

Figure 47:
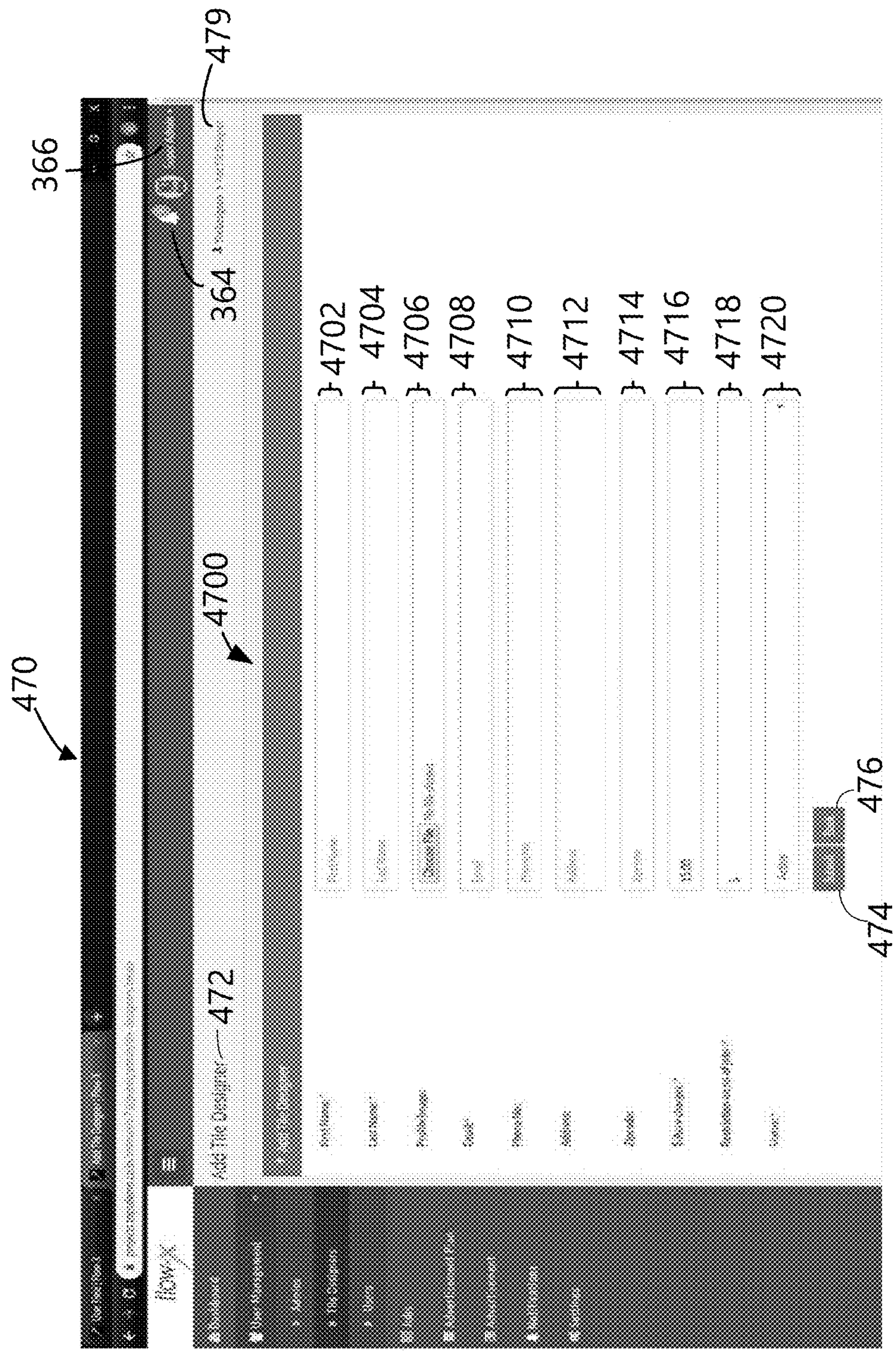
FIG. 47 is a screen display showing the super admin can add a new tile designer.

FIG. 47 is a screen display 470 showing in response to a request to add a tile designer. The current location of the super admin is presented in the region 479. The head 472 of the tile designer page appears with "Add Tile designer" and the ID number. The screen display 470 includes an "+ Add Tile Designer" panel 4700. The panel 4700 includes a "First Name" 4702, a "Last Name" 4704, a "Profile Image" 4706, an "Email" 4708, a "Phone No." 4710, an "Address" 4712, a "Zipcode" 4714, a "$/Acre charges" 4716, a "Restriction on no of jobs" 4718, and a "Status" 4720. Once the information is edited, the super admin selects the "Submit" button 474 to submit the change, or the super admin selects the "Back" button 476 to cancel the change. Not all fields are necessarily required, however some fields may be required in order to ensure that sufficient information is provided.

Figure 48:
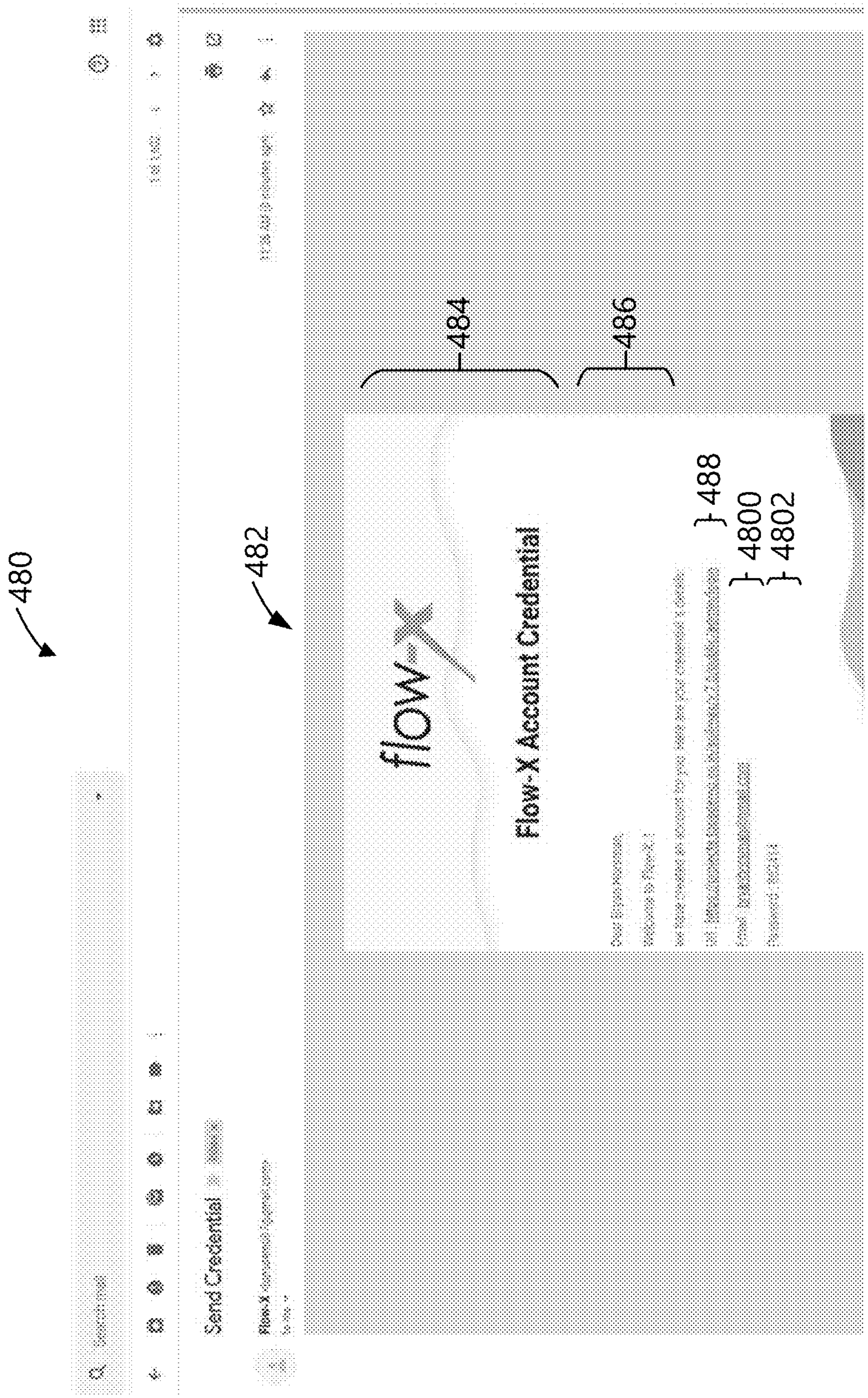
FIG. 48 is a screen display showing the newly added tile designer has received a credential email.

FIG. 48 is a screen display 480 showing the new tile designer has received a credential email. The email page 482 includes a logo with an email subject as a title 484, a greeting to the new admin 486, an URL link 488, an email address 4800, and a password 4802. The credential email may help the new tile designer to confirms the information.

Figure 49:
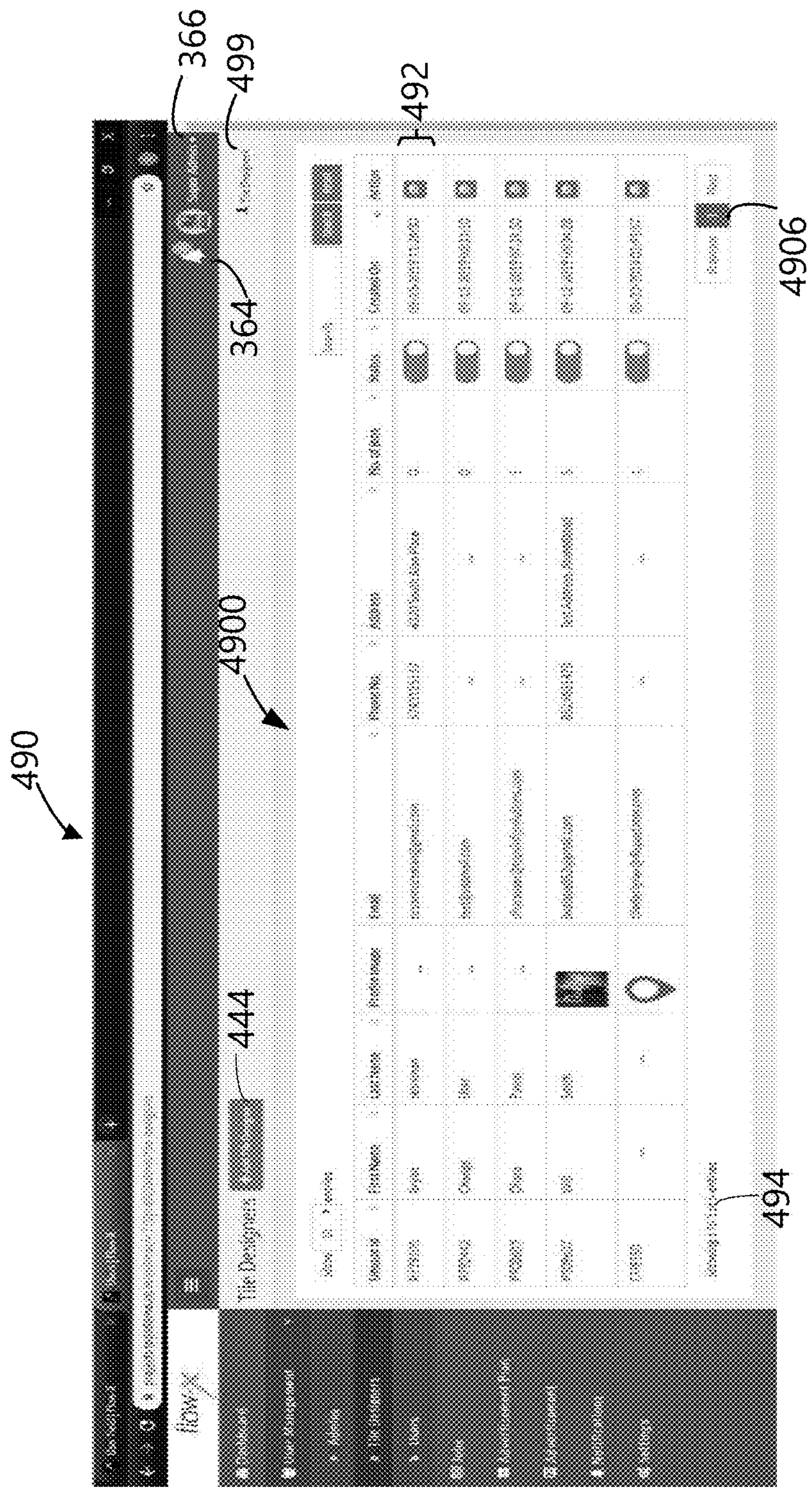
FIG. 49 is a screen display showing a new tile designer has been added to the tile designer list.

FIG. 49 is a screen display 490 showing a new tile designer 492 has been added to the tile designer list 4900. The current location of the super admin is presented in the region 499. The list of admins 4900 shows five entries as the "Showing 1 to 5 of 5 entries" 494 on the lower-left corner.

Figure 50:
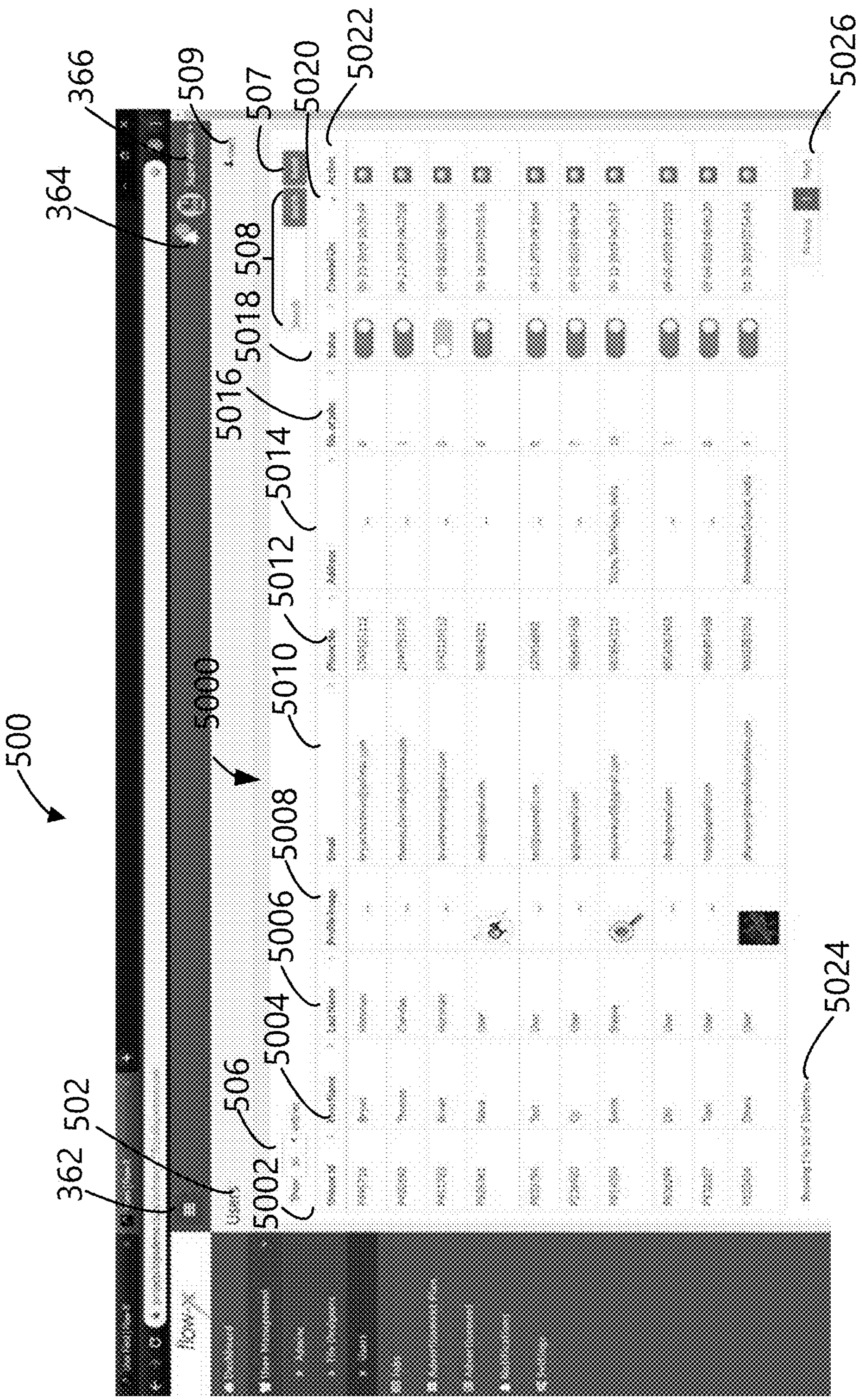
FIG. 50 is a screen display showing the super admin can manage all the users.

FIG. 50 is a screen display 500 showing all the tile designers in the list 5000. The current location of the super admin is presented in the region 509. The region 509 includes a list of tile designer 5000, the number of entries on the list 506, a searching field 508, a "Reset" button 507, and a page number 5026 with "Previous" link and "Next" link. The list of tile designers 5000 includes a list of "Unique Id" column 5002, a list of "First Name" 5004, a list of "Last Name" 5006, a list of "Profile Image" 5008, a list of "Email" 5010, a list of "Phone No." 5012, a list of "Address" 5014, a list of "No. of jobs" 5016, a list of "Status" 5018, a list of "Created On" 5020, and a list of "Action" 5022.

Figure 51:
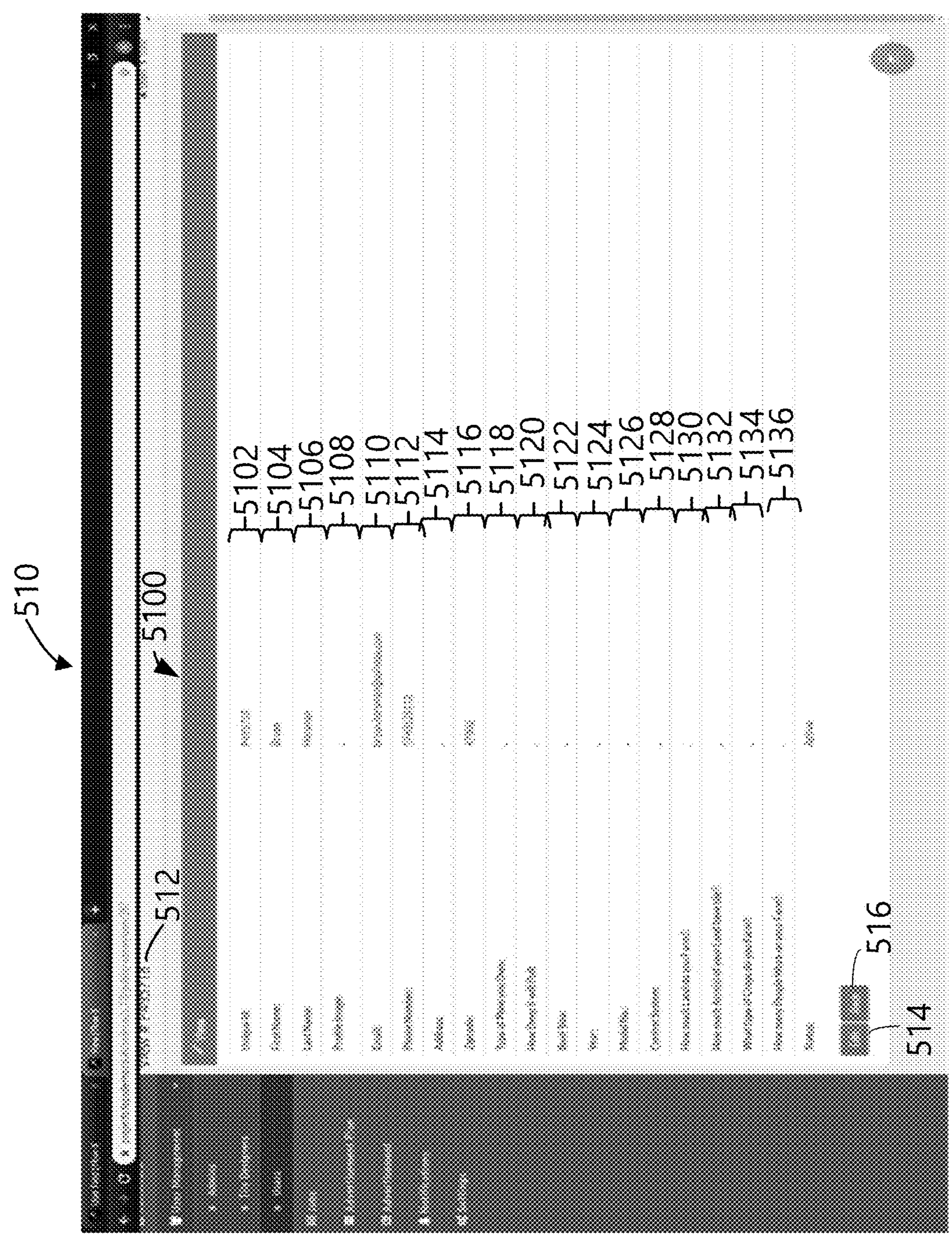
FIG. 51 is a screen display showing user information to a super admin.

FIG. 51 is a screen display 510 showing the information of the user to the super admin. The current location of the super admin is presented. The "View" 5100 is shown in response with the super admin selecting the "Users" link 386 of screen display 380. The head 512 of the tile designer page appears with "View" and the ID number. The screen display 510 includes an "View" page 5100. The page 5100 includes a "Unique Id" 5102, a "First Name" 5104, a "Last Name" 5106, a "Profile Image" 5108, an "Email" 5110, a "Phone Number" 5112, an "Address" 5114, a "Zipcode" 5116, a "Type of Plow you Own" 5118, a "How deep it will Pull" 5120, a "Boot Size" 5122, a "Year" 5124, a "Model No." 5126, a "Control System" 5128, a "How much land do you Farm?" 5130, a "How much Acre(s) of your Land have tile?" 5132, a "What type of Crops do you Farm?" 5134, and a "How many People Work on your Farm?" 5136. The super admin can select the "Edit" button 514 to edit, and a "Back" button 516 to go back to the last page.

Figure 52:
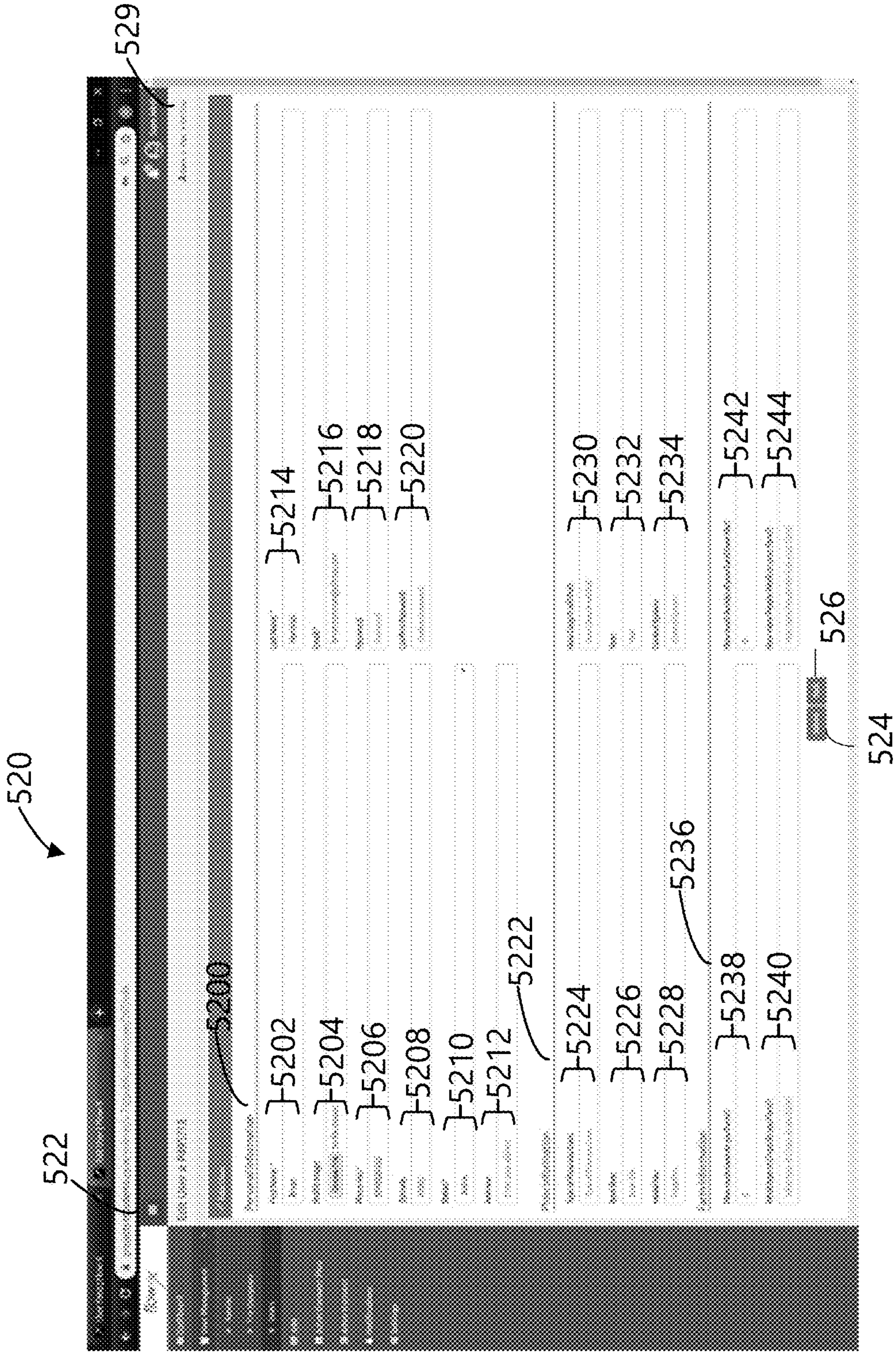
FIG. 52 is a screen display showing the super admin can make change to user's information.

FIG. 52 is a screen display 520 shown in response with the super admin selecting an "Edit" button 514 in screen display 510 of FIG. 51 to edit the information of the user. The head 522 of the user page appears with the "Edit User" and the ID number. The current location of the super admin is presented in the region 529. The screen display 520 may include a "Personal Information" section 5200, a "Plow Information" section 5222, and a "Farm Information" 5236. The super admin can edit the user's personal information in the "Personal Information" section 5200 which may include a "First Name" field 5202, a "Last Name" field 5214, a "Profile Image" field 5204, an "Email" field 5216, a "Phone No." field 5206, an "Address" field 5212, a "Zipcode" field 5208, a "Password" field 5218, a "Confirm Password" field 5220, and the "Status" field 5210. The super admin may edit the user's plow information in the "Plow Information" section 5222, which includes a "Type of Plow you own" field 5224, "Boot Size" field 5226, a "Model No" field 5228, a "How Deep Does it Pull?" field 5230, a "Year" field 5232, and a "Control system" field 5234. The super admin may edit the user's farm information in the "Farm Information" section 5236, which includes a "How much Land do you Farm?" field 5238, a "What type of Crops do you Farm?" field 5240, a "How many Acre(s) of your Land has tile?" field 5242, and a "How many People Work on your Farm?" field 5244. Once the information is edited, the super admin selects the "Submit" button 524 to submit the change, or the super admin selects the "Back" button 526 to cancel the change.

Figure 53:
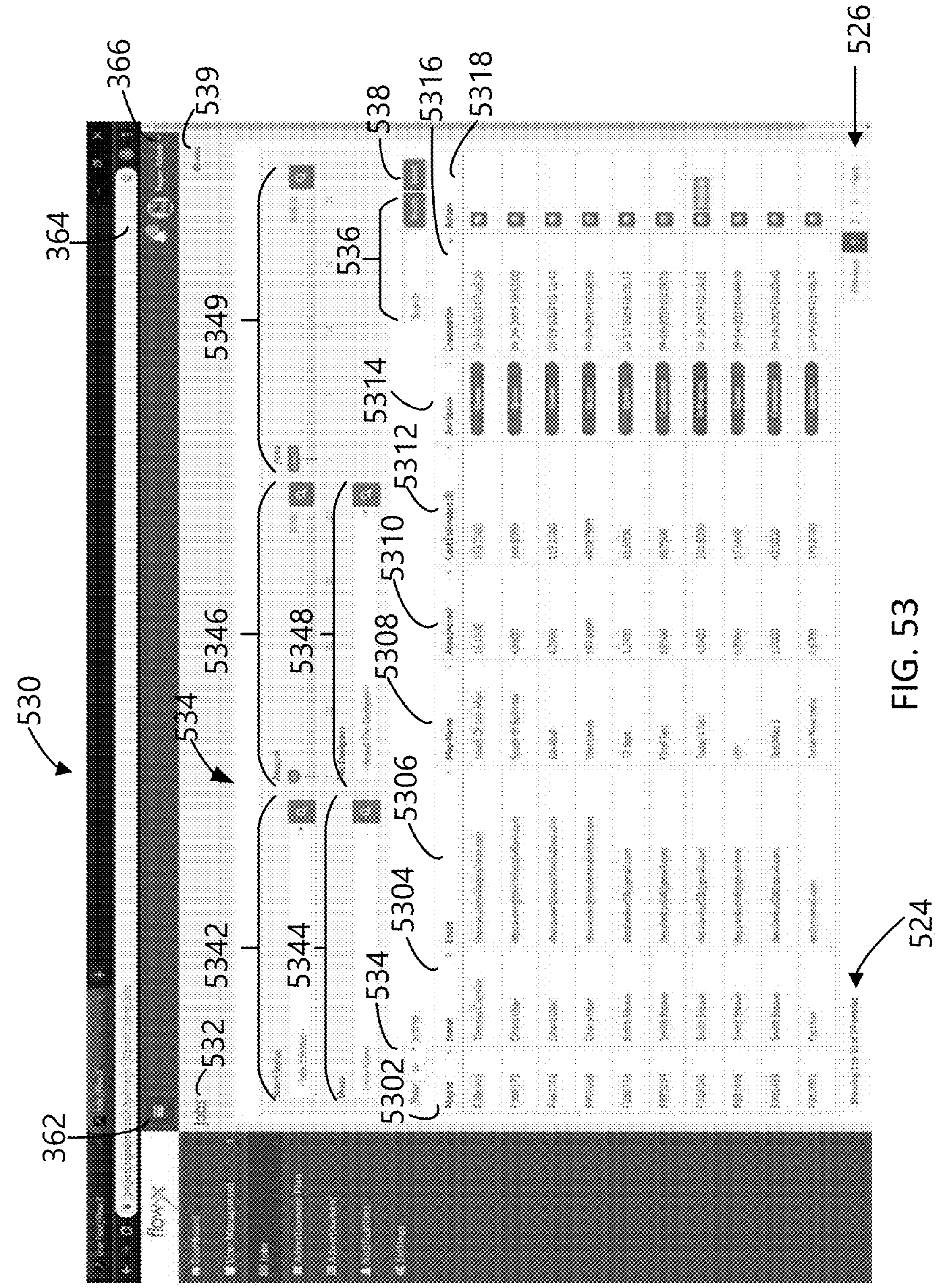
FIG. 53 is a screen display showing the details of current tasks/jobs.

FIG. 53 is a screen display 530 showing the detail of current tasks/jobs. The "Jobs" 532 are shown in response with the super admin selecting the "Jobs" link 3604 of screen display 360 of FIG. 36. The head of the tile designer page appears with "View" and the ID number. The screen display 530 includes a searching section 534, and a list of jobs, a showing entries number 5320, the searching entries on the list, a searching field 536, a "Reset" button 538, and a page number with "Previous" link and "Next" link. The searching section 534 includes a "Select Status" field 5342, an "Users" field 5344, an "Amount" field 5346, a "Tile-Designers" field 5348, and an "Area" field 5349. The list of jobs 5300 includes a "Map Id" column 5302, a "Name" column 5304, an "Email" column 5306, a "Map Name" column 5308, an "Area (Acres)" column 5310, a "Cost Estimated ($)" column 5312, a "Job Status" column 5314, a "Created On" column 5316, and an "Action" 5318. The super admin may select the "Remove" link to remove the job.

Figure 54:
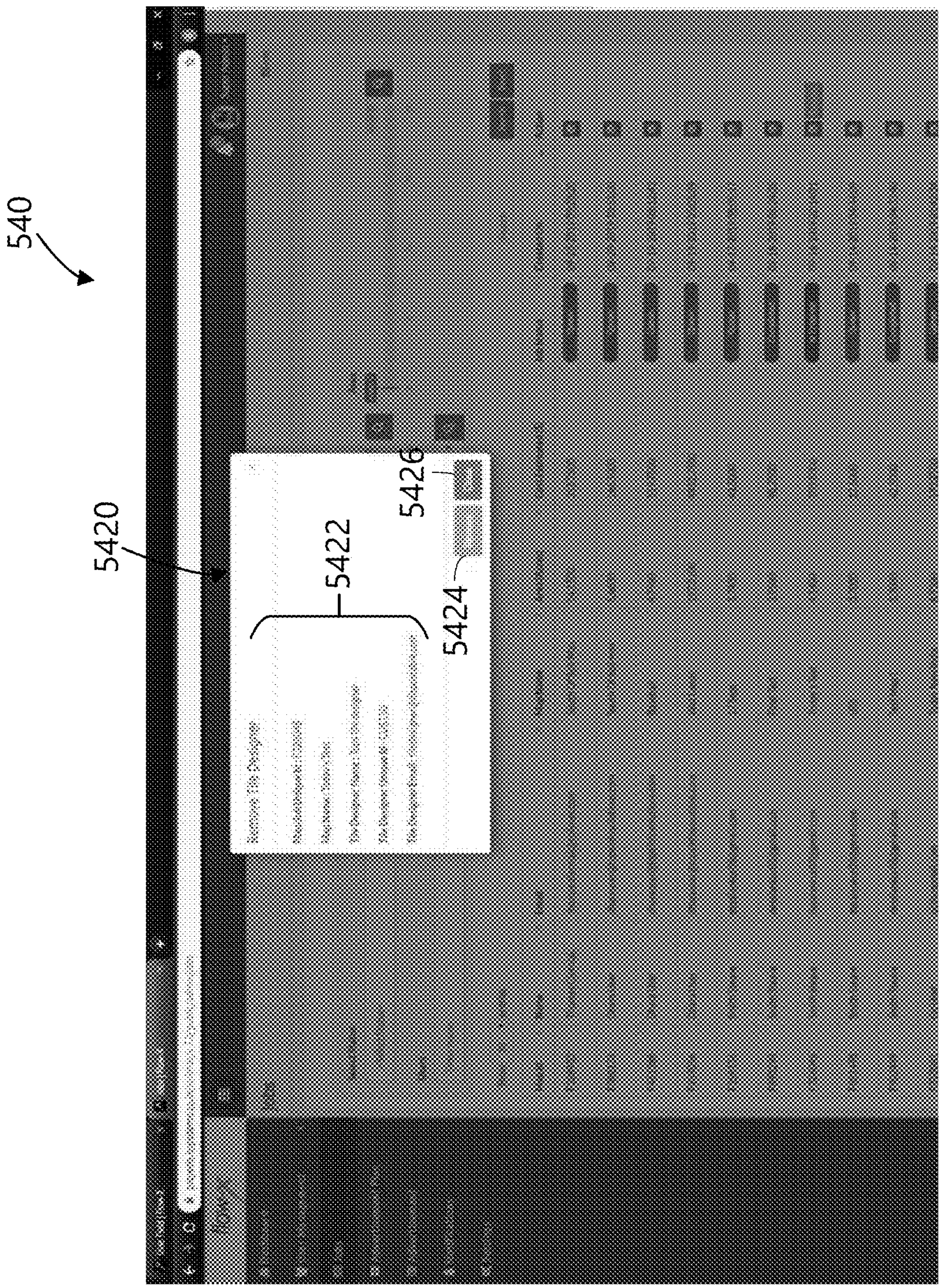
FIG. 54 is a screen display showing the super admin can remove tile designer.

FIG. 54 is a screen display 540 shown in response to the super admin selecting the "Remove" button 5326 in FIG. 53. The remove notification 5420 appears on the top of the screen display 540. The super admin removes the tile designer needs to select the "Remove" button 5424 to remove, or to select the "Close" button 5426 to cancel. The removed notification 5420 includes a "Remove Tile Designer" title 5420, and the job details 5422.

Figure 55:
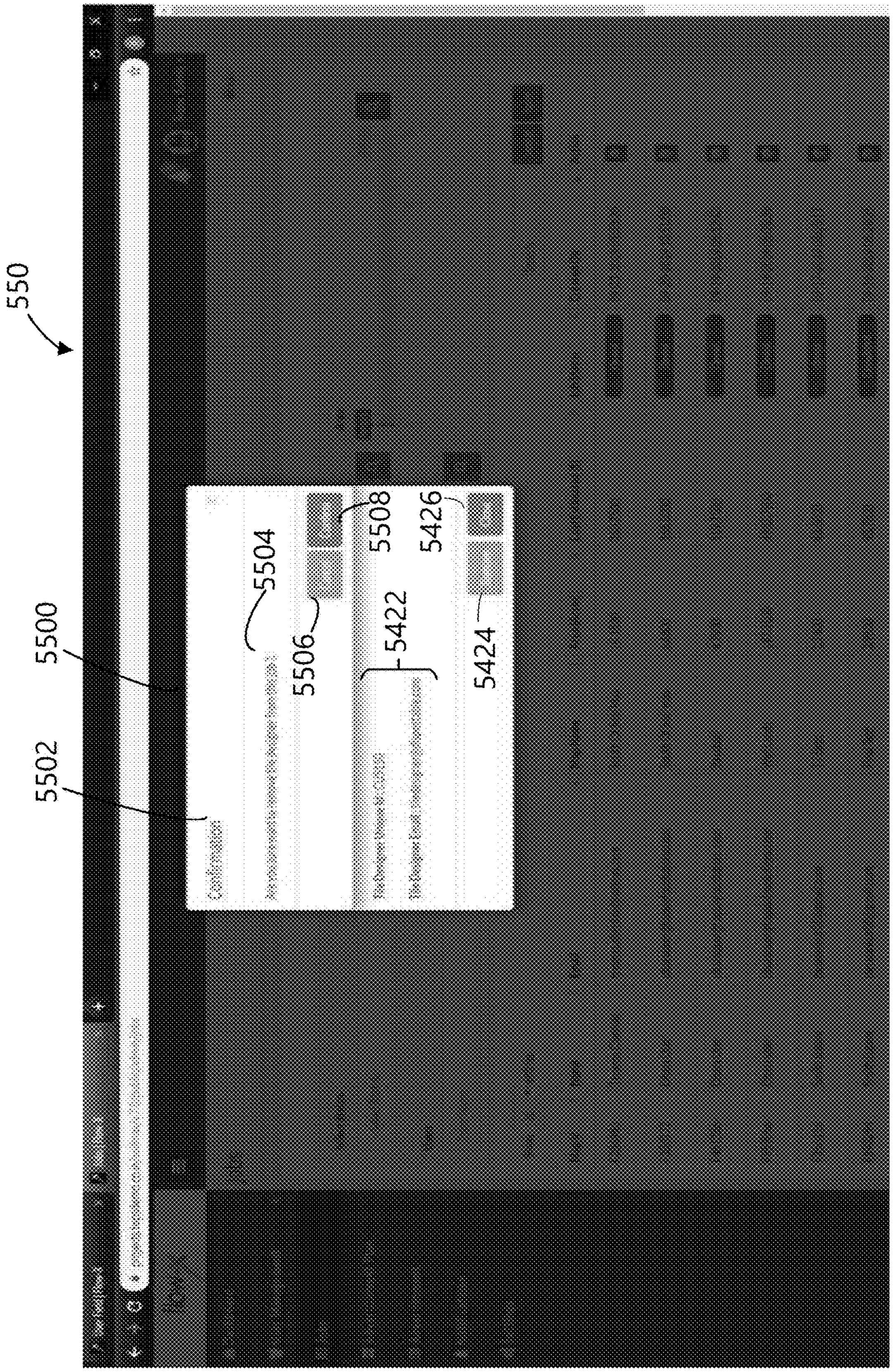
FIG. 55 is a screen display showing the confirmation of removing tile designer will show up on the web page.

FIG. 55 is a screen display 550 shown in response to the super admin selecting the "Remove" button 5424 in screen display 540 of FIG. 54. The "Confirmation" appears on the top of the remove notification. The "Confirmation" includes a "Confirmation" title 5502, a question 5504, and a "Cancel" button 5506 to cancel and a "Confirm" button 5508 to confirm.

Figure 56:
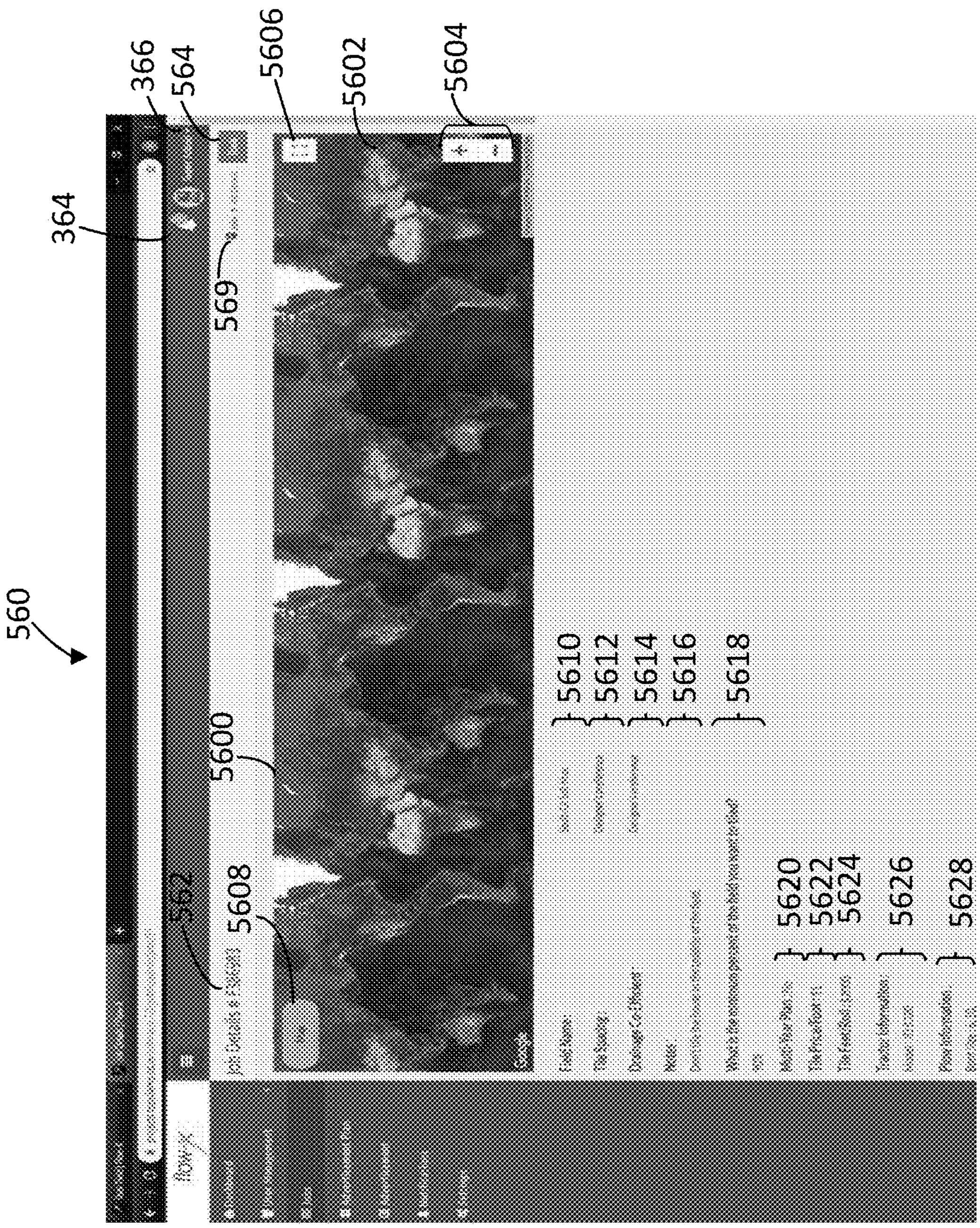
FIG. 56 is a screen display showing the job details.

FIG. 56 is a screen display 560 showing the super admin can access to the job details. The current location of the super admin is presented with in the region 569 at the upper right corner. The super admin selects the "Back" button 564 to go back to the list of the jobs. The job detail section 5600 includes a "Job Details" and a job number as the title 562. A map 5602 shows the location of the jobs. The super admin may select the full screen link 5606 to check in the full screen, or the link 5604 can control zooming of the map. The super admin may select the "Map" 5608 to check the map. The job details includes a "Field Name" 5610, a "Tile Spacing" 5612, a "Drainage Co-Efficient" 5614, a "Notes" 5616, an answer to the "What is the minimum percent of the field you want to tiled?" 5618, a "Multi-Year Plan" 5620, a "Tile Price/Foot" 5622, a "Tile Fee/Roll" 5624, a "Tractor Information" 5626, and a "Plow Information" 5628.

Figure 57:
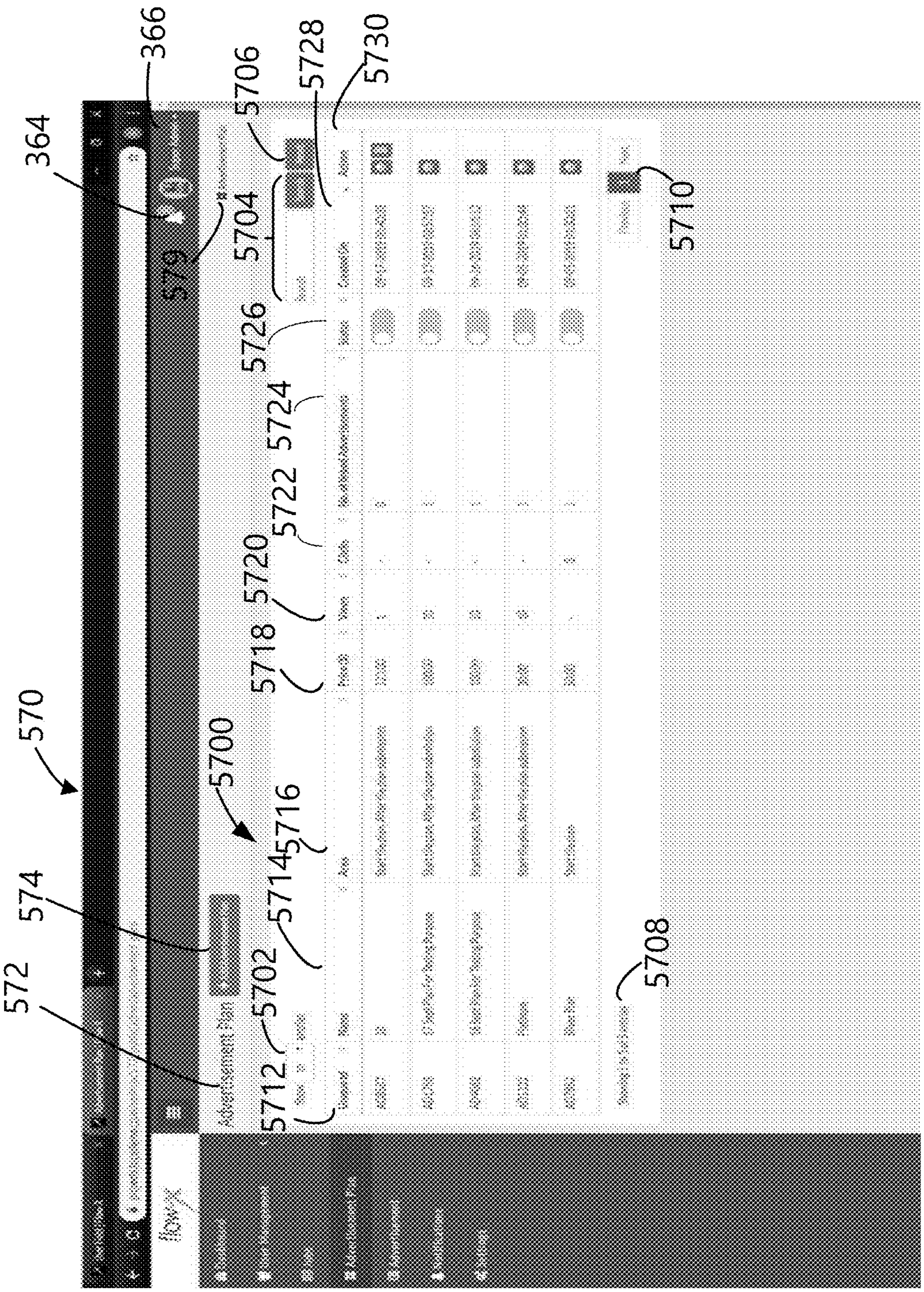
FIG. 57 is a screen display showing the super admin can control an advertisement plan.

FIG. 57 is a screen display 570 shown in response the Super Admin selecting the "Advertisement Plan" link 3606 of screen display 360 of the FIG. 36. The current location of the super admin is presented within the region 579 at the upper right corner. The Advertisement Plan page includes an "Advertisement Plan" title 572, a "+ Add Advertisement Plan" 574, and a list of advertisement plans 5700. The list of the advertisement plans includes an "Unique Id" column 5712, a "Name" column 5714, an "Area" column 5716, a "Price" column 5718, a "Views" column 5720, a "Clicks" column 5722, a "No. of linked Advertisement" column 5724, a "Status" column 5726, a "Created On" column 5728, an "Action" column 5730, a link to set up number of entries 5702, and the number of entries 5708. The super admin selects the page number 5710 to change page.

Figure 58:
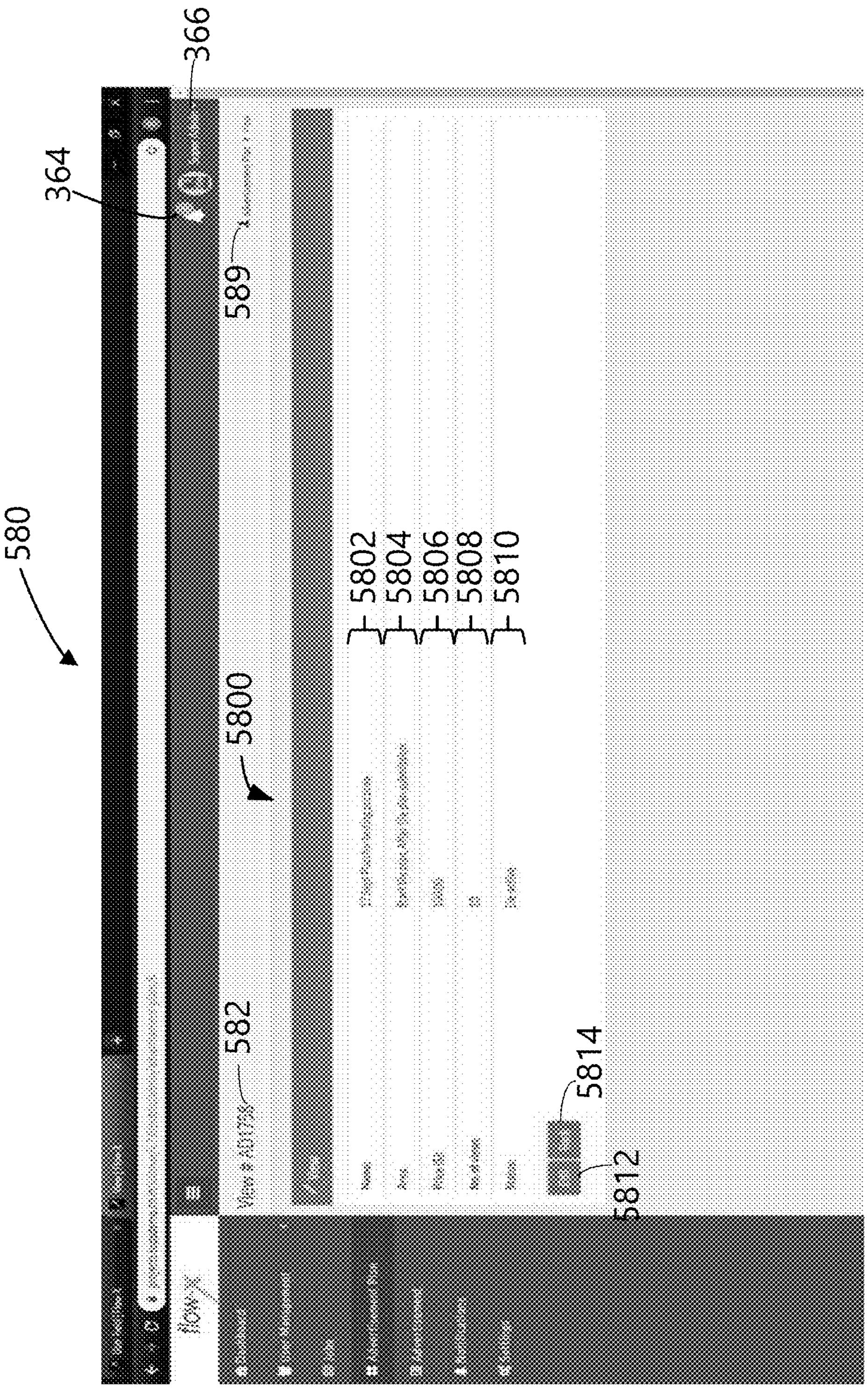
FIG. 58 is a screen display showing the details of an advertisement plan.

FIG. 58 is a screen display 580 showing the super admin viewing the detail of the advertisement plan. The screen display 580 includes a title 582 and a detail region 5800. The title 582 includes the "View" and the advertisement plan number. The current location of the super admin is presented within the region 589 at the upper right corner. The detail region 5800 includes a "Name" 5802, an "Area" 5804, a "Price(s)" 5806, a "No. of views" 5808 and a "Status" 5810. The super admin selects the "Edit" button 5812 to edit and the "Back" button 5814 to cancel.

Figure 59:
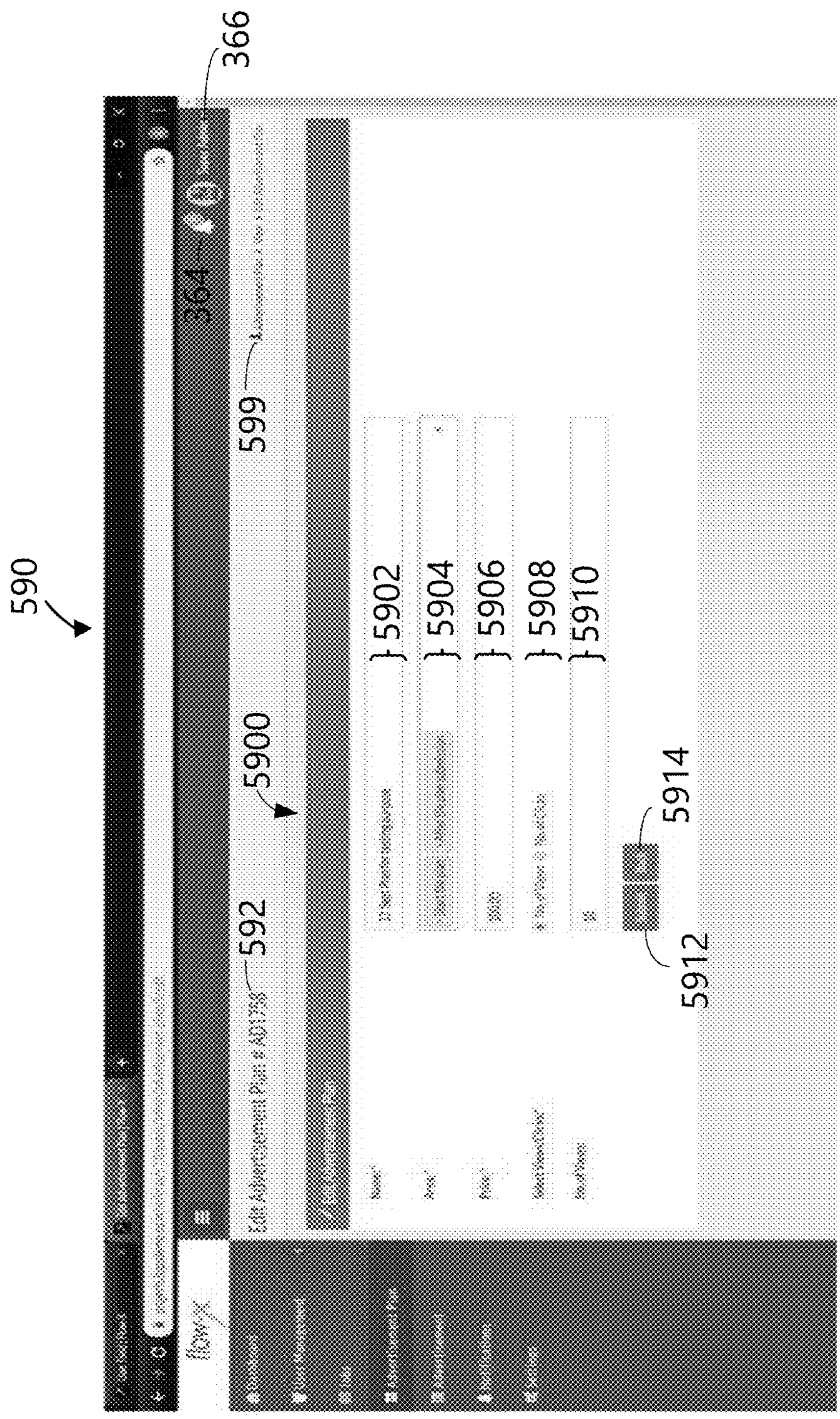
FIG. 59 is a screen display showing the super admin can edit the advertisement plan.

FIG. 59 is a screen display showing the super admin can edit the Advertisement Plan. The screen display 590 includes a title 592 and a detail region 5900. The title 592 includes the "Edit Advertisement Plan" and the advertisement plan number. The current location of the super admin is presented with in the region 599 at the upper right corner. The super admin can edit the "Name" 5902, the "Area" 5904, the "Price" 5906, the "Select Views/Clicks" 5908, and the "No. of Views" 5910. Once all the information is edited, the super admin selects the "Submit" button 5912 to submit the change, or the "Back" button 5914 to go back.

Figure 60:
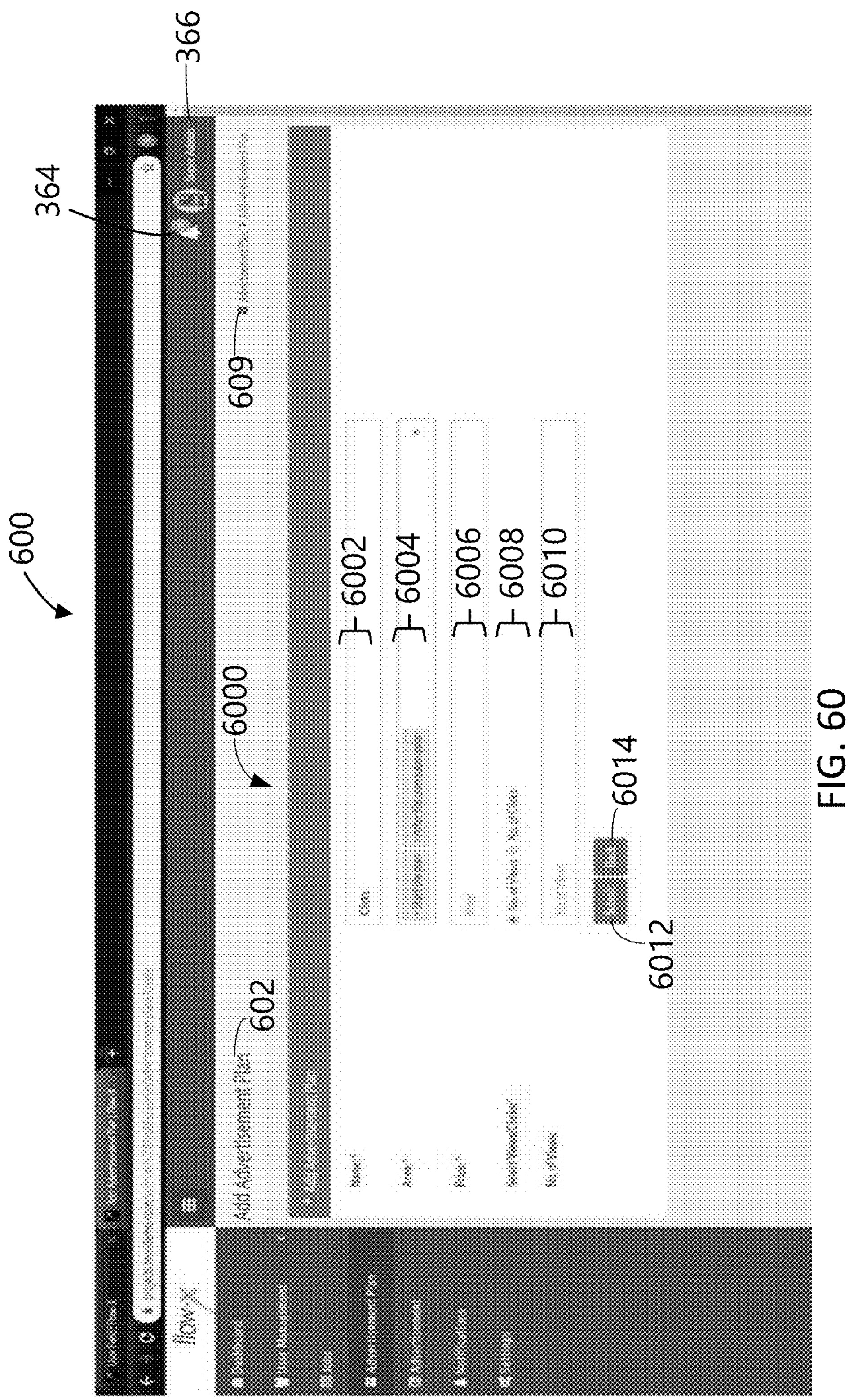
FIG. 60 is a screen display showing the super admin can add an advertisement plan.

FIG. 60 is a screen display 600 shown in response to the super admin selecting the "+ Add Admin" link 574 in screen display 570 of FIG. 57. The title 602 shows as "Add Advertisement Plan". The current location of the super admin is presented within the region 609 at the upper right corner. The super admin can add the information of advertisement in region 6000. The super admin needs to enter information in the "Name" field 6002, the "Area" field 6004, a price in the "price" field 6006, the "Select Views/Clicks" 6008, and the "No. of Views" 6010. The super admin selects the "Submit" button 6012 to submit, or the "Back" button 6014 to cancel.

Figure 61:
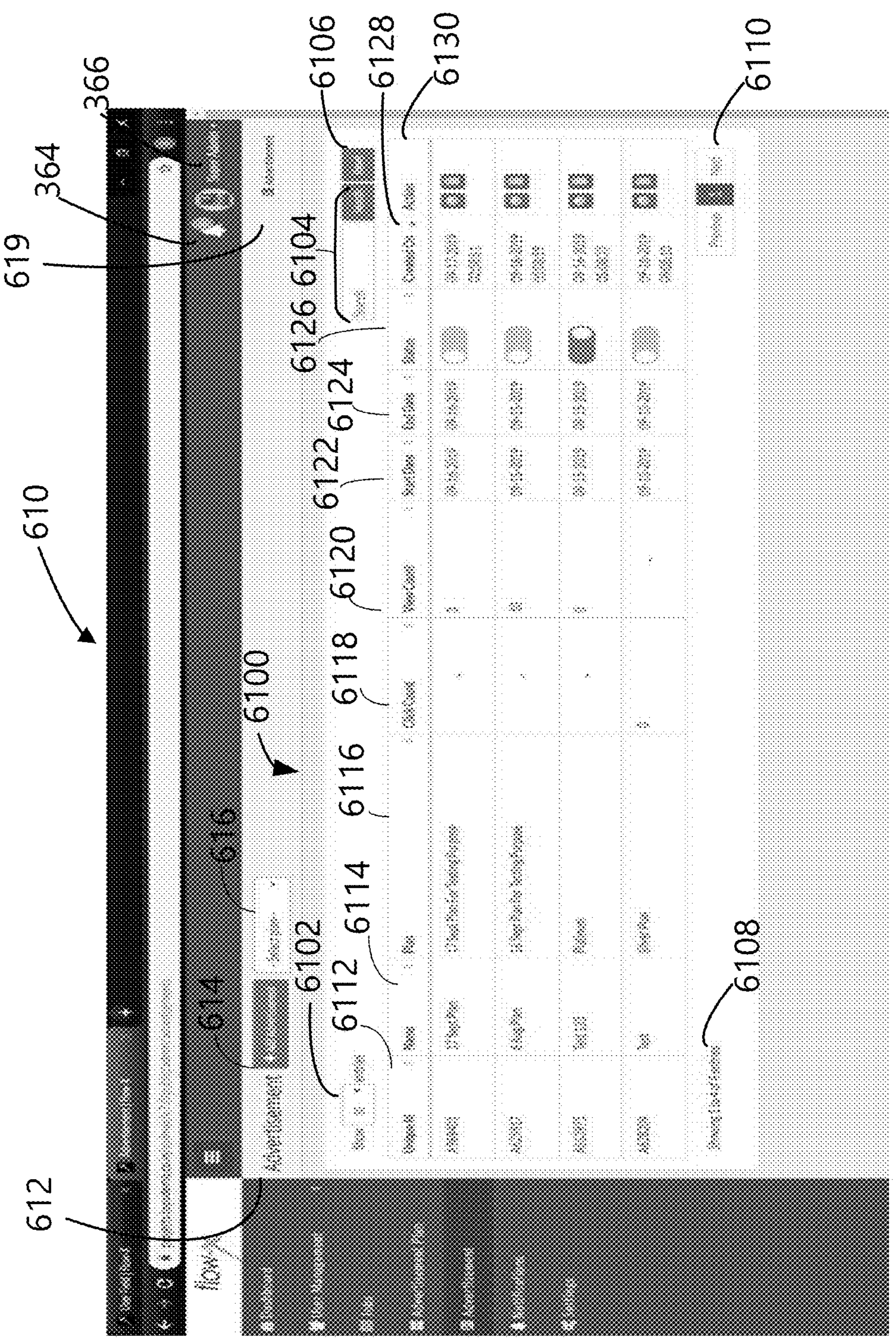
FIG. 61 is a screen display showing all the advertisement plan.

FIG. 61 is a screen display 612 showing the list of advertisements. In response to the super admin selecting the "Advertisement" link 3608 in screen display 360 of FIG. 36, the region 610 is shown. The screen display 610 includes an "Advertisement" title 612, an "+ Add Advertisement" button 614, a "Select Plan" link 616, and a list of advertisements 6100. The current location of the super admin is presented within the region 619. The list of advertisements includes the "Unique Id" column 6112, the "Name" column 6114, the "Plan" column 6116, the "Click Count" 6118, the "View Count" 6120, a "Start Date" 6122, an "End Date" 6124, a "Status" 6126, a "Created On" date 6128, and an "Action" 6130. The super admin may select the page number 6110 to change pages.

Figure 62:
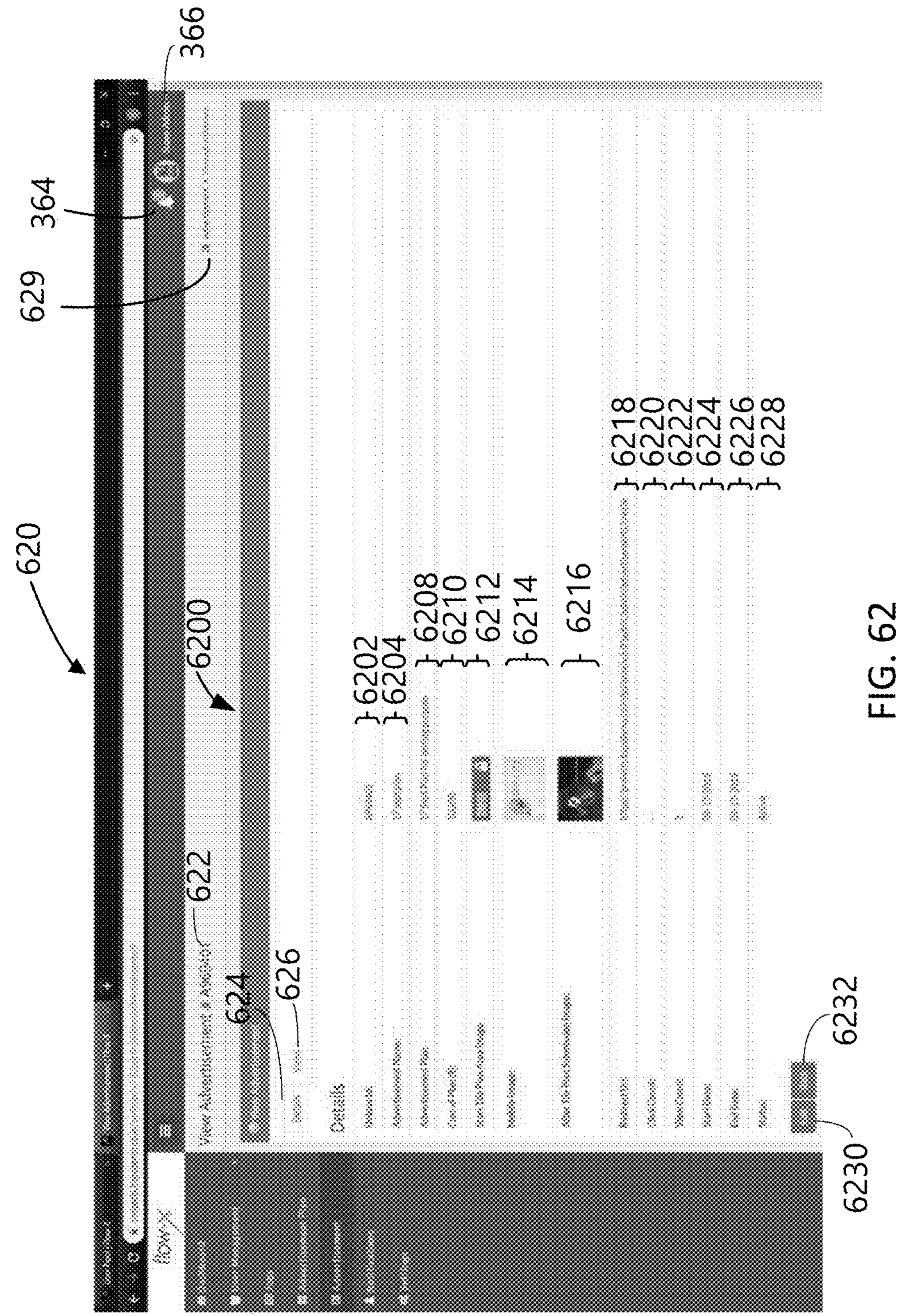
FIG. 62 is a screen display showing the advertisement details.

FIG. 62 is a screen display 620 showing the Advertisement details. The current location of the super admin is presented within the region 629 at the upper right corner. The screen display 620 includes a title 622 and a "View Advertisement" details container 6200. The super admin has the choice to select the "Details" tab 626 in container 6200 to view the details. The "View Details" container 6200 includes an "Unique Id" 6202, an "Advertisement Name" 6204, an "Advertisement Plan" 6206, a "Cost of Plan(s)" 6208, a "Start Tile Plan Area Image" 6210, a "Mobile Image" 6214, an "After Tile Plan Submission Image" 6216, a "Redirect URL" 6218, a "Click Count" 6220, a "View Count" 6222, a "Start Date" 6224, an "End Date" 6226, and a "Status" 6228. The super admin may select the "Edit" button 6230 to edit the advertisement details, or the "Back" button to cancel.

Figure 63:
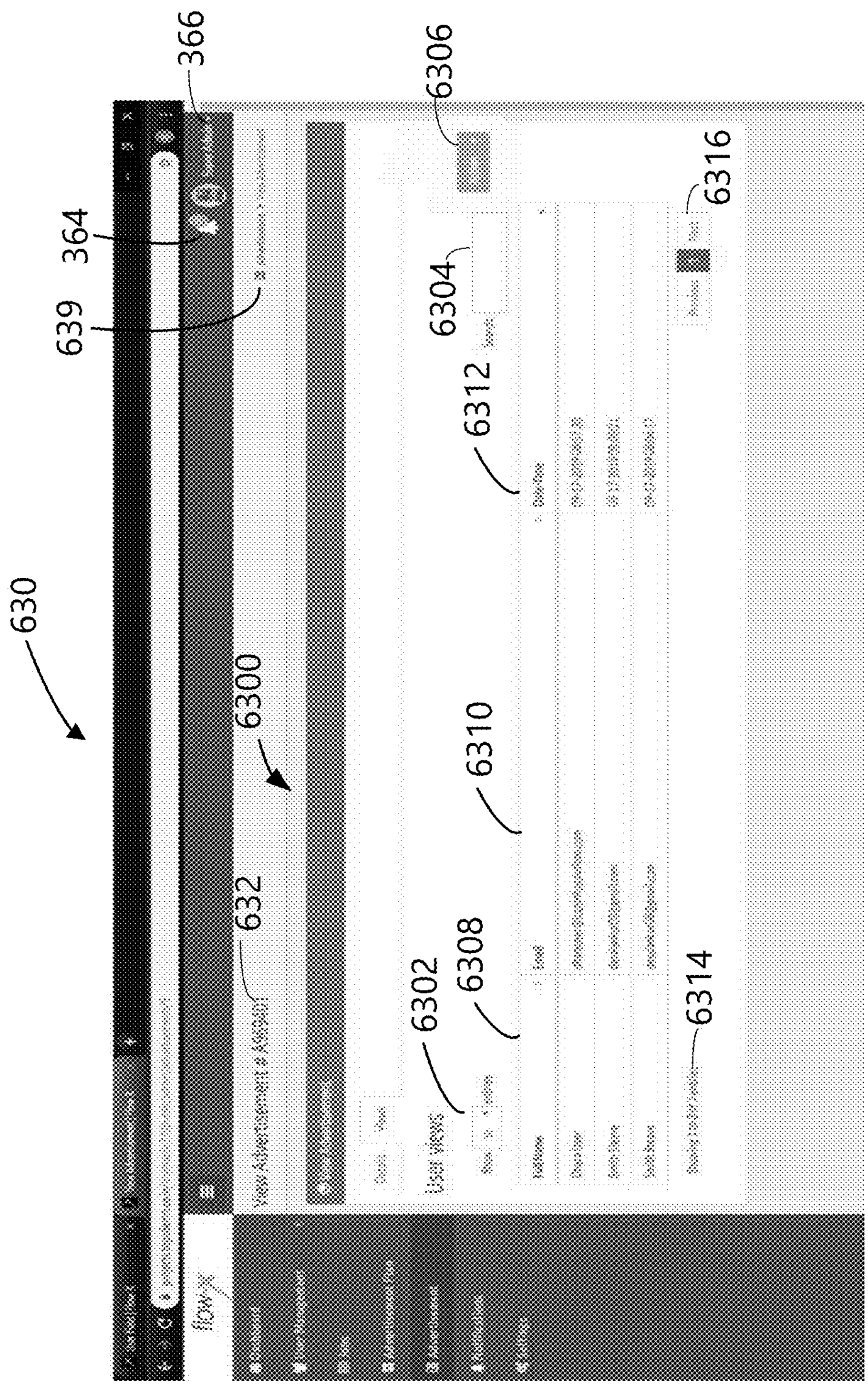
FIG. 63 is a screen display showing the number of user views advertisement, and an action link. link

FIG. 63 is a screen display 630 showing the views for each advertisement. In response to the super admin selecting the "Views" tab to view the viewers in the "User views" container 6300, the screen display 6300 is shown. The current location of the super admin is presented within the region 639. The title of the web page 632 includes a "View Advertisement" title and the Id of the advertisement. The container 6300 includes a show entry 6302, a search file 6304, an "Action" button 6306, and a list of the users. The list of the users is presented with the users who viewed the advertisement, which includes a "Full Name" column 6308, an "Email" column 6310 and a "Date-Time" column 6312. The user can check the number of showing entries 6314 and change the page number 6316.

Figure 64:
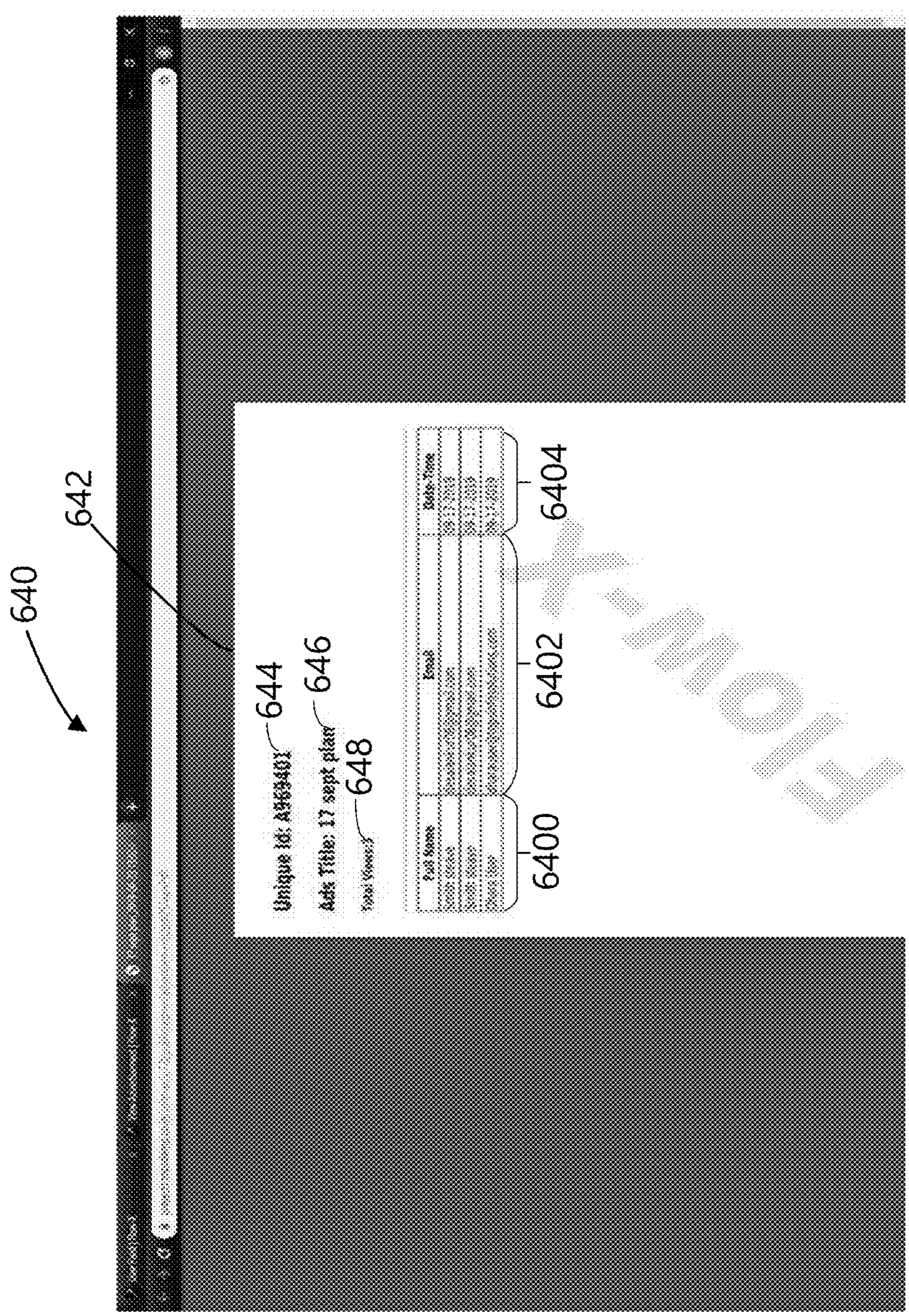
FIG. 64 is a screen display showing that the user views information can be presented in different formats including PDF.

FIG. 64 is a screen display 640 shown in response to a user selecting the "Action" button 6306 in screen display 630 of FIG. 63. A PDF document 642 presents the viewers of the advertisement with an "Unique Id" of the advertisement 644, the title of the advertisement 646, the number of the viewers 648, the "Full Name" of the viewers 6400, the "Email" of the viewers 6402, and the "Date-Time" of the views 6404.

Figure 65:
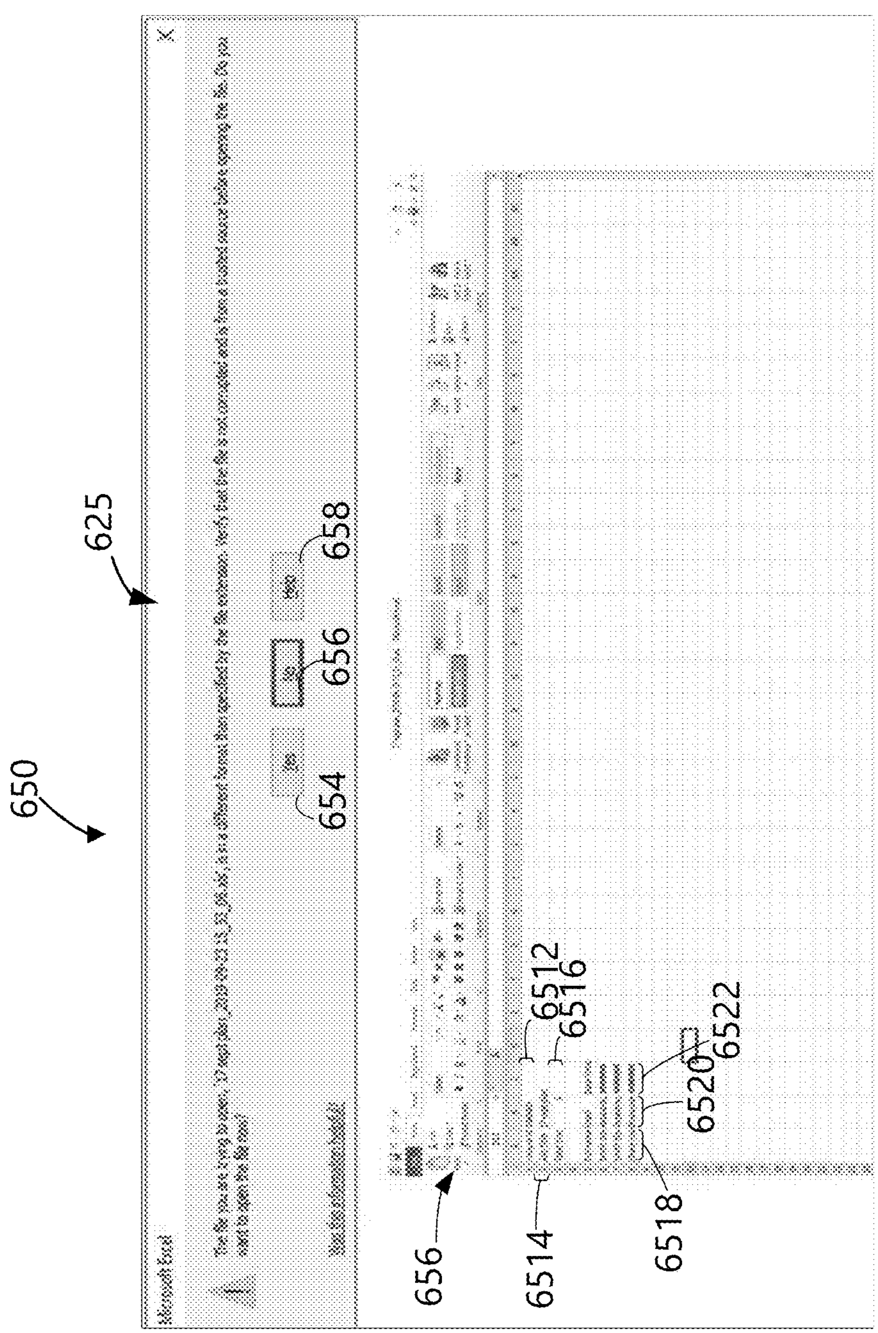
FIG. 65 is a screen display showing the user views information can be presented in different formats including a Microsoft Excel format.

FIG. 65 is a screen display 650 showing the super admin downloads the viewers list in Excel in response with selecting the "Action" button in screen display 630 of FIG. 63. The screen display 630 shows a notification 652. The super admin selects the "Yes' button 654 to confirm or selects the "No" button 656 to deny, or the "Help" button 658 to get help. The display shows the list of viewers viewed the advertisement, which includes the "Unique Id" of the advertisement 6512, the advertisement title 6514, the total number of the views 6516, the "full name" of the viewers 6518, the Email 6520 and the viewing "Date-Time" 6522.

Figure 66:
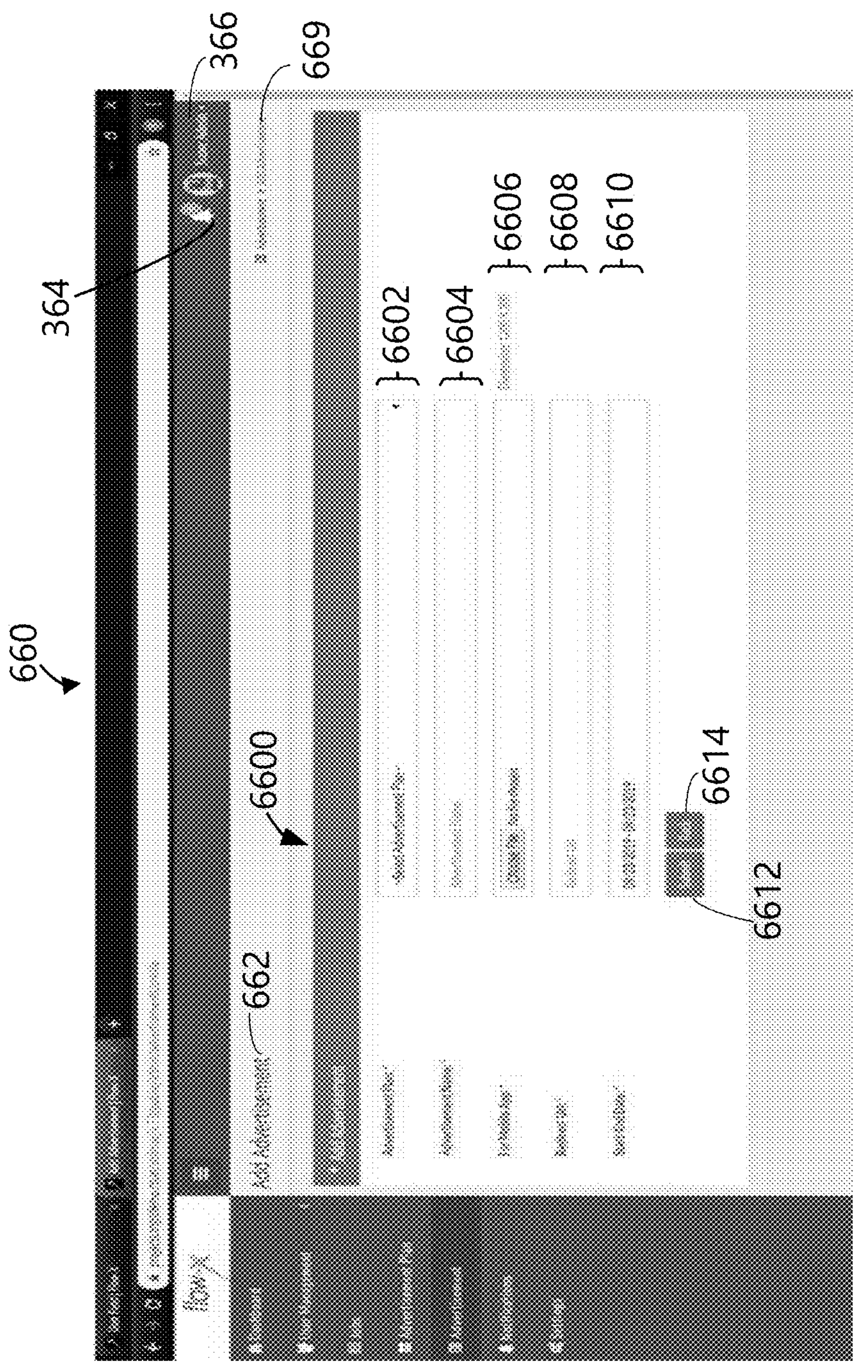
FIG. 66 is a screen display showing that a super admin adds an advertisement.

FIG. 66 is a screen display 660 showing that a super admin may add an advertisement in 6600. The page has "Add Advertisement" 662 as a title. The current location of the super admin is indicated with item 669. In the "Add Advertisement" section 6600, the information about the advertisement is collected. The super admin enters a plan in the "Advertisement Plan" 6602, a name in the "Advertisement Name" 6604, a picture in the "For Mobile App" 6606, an URL in the "Redirect URL" field 6608, and a date period in the "Start-End Date" field 6610. Once the information is collected, a super admin may select the "Submit" button 6612 to submit the information. If the super admin wishes to cancel the adding of the advertisement, the "Back" button 6614 will take the super admin back.

Figure 67:
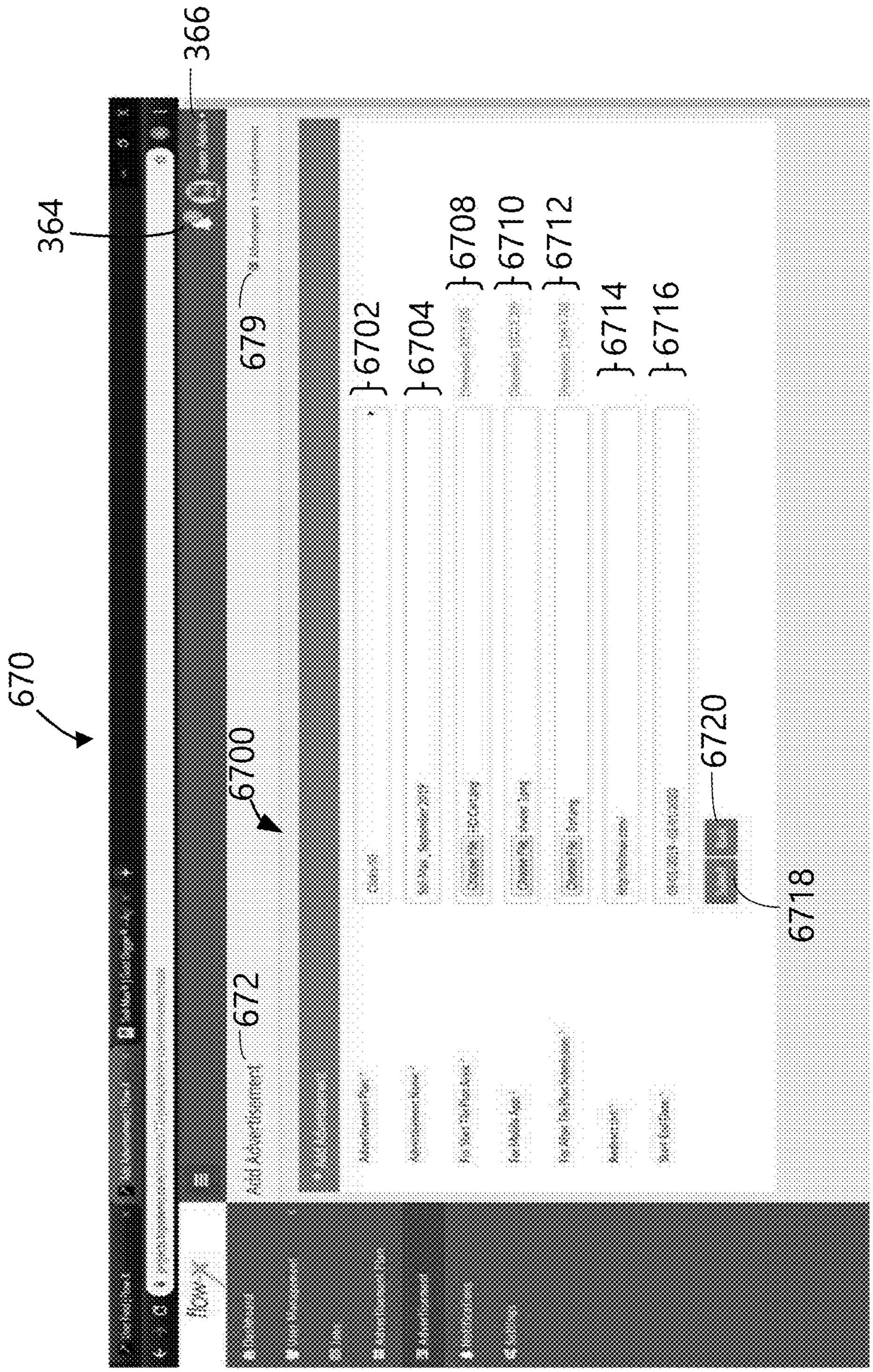
FIG. 67 is a screen display showing the super admin add a "Clicks-50" advertisement plan with an advertisement name.

FIG. 67 is a screen display 670 showing the super admin adds an advertisement plan in region 6700. The page has "Add Advertisement" 672 as a title. The current location of the super admin is indicated with item 679. The super admin enters a plan in the "Advertisement Plan" 6702, a name in the "Advertisement Name" 6704, a picture in the "For Start Tile Plan Area" 6708, a picture in the "For Mobile App" 6710, a picture for the "For After Tile Plan Submissions" 6712, an URL in the "Redirect URL" field 6714, and a date period in the "Start-End Date" field 6716. Once the information is collected, a super admin may select the "Submit" button 6718 to submit the information. If the super admin cancels, the "Back" button 6720 will direct the super admin to go back to previous page.

Figure 68:
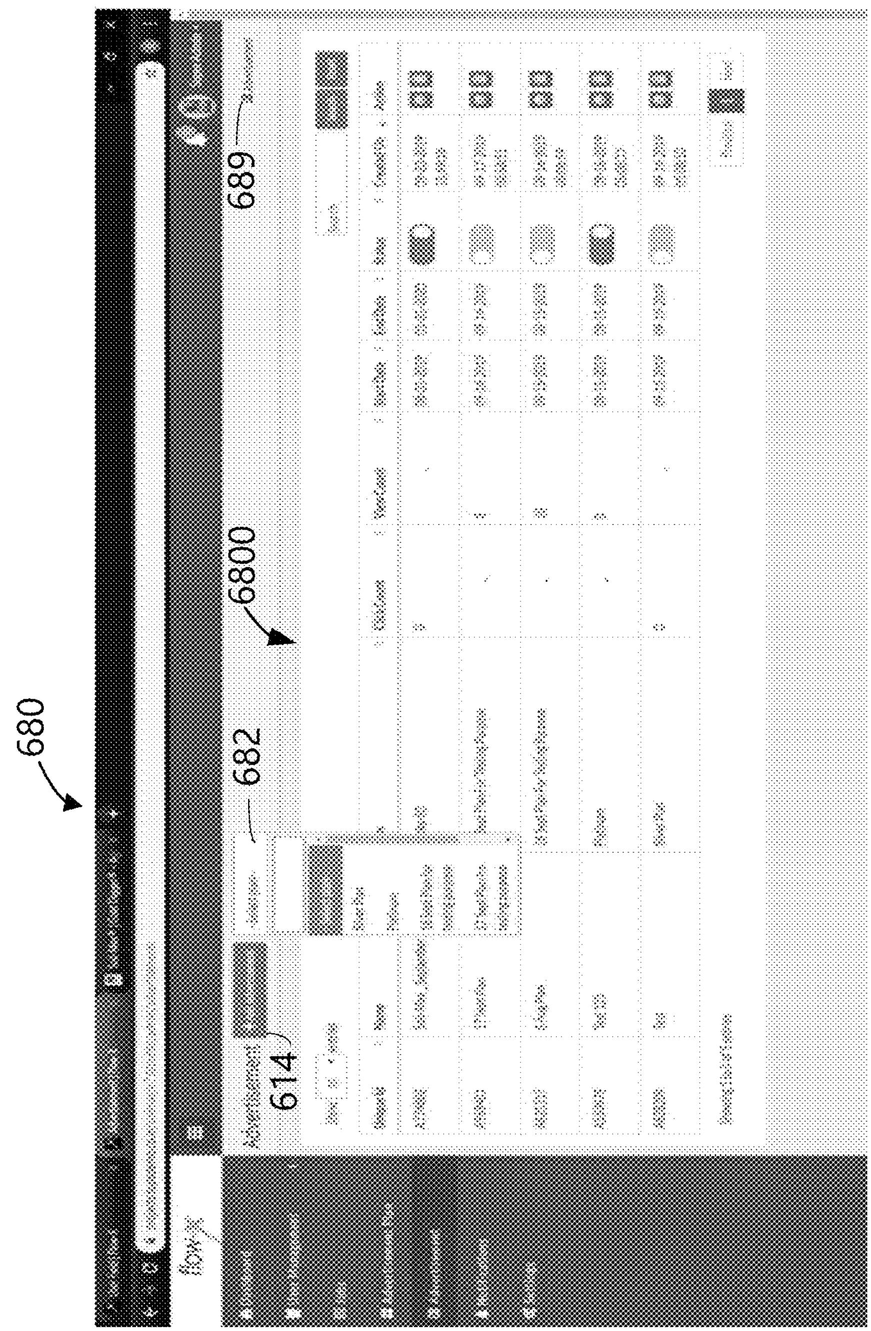
FIG. 68 is a screen display showing the super admin can search for an advertisement by advertisement plan.

FIG. 68 is a screen display 680 showing the super admin can search advertisements by Advertisement Plan. In response to the super admin selecting the "Select Plan" 616 link from the screen display 610 of FIG. 61, the screen display 680 of FIG. 68 is shown.

Figure 69:
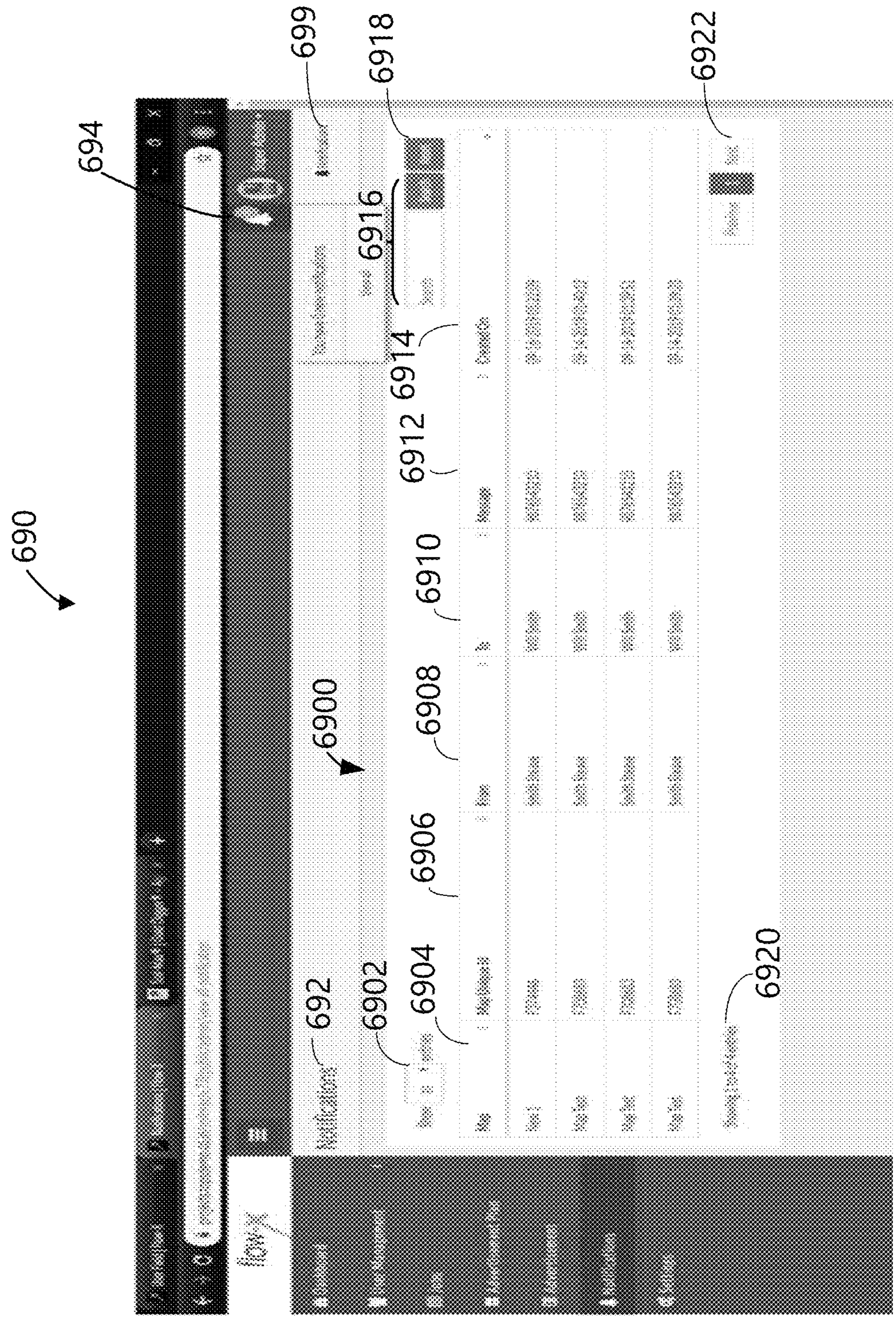
FIG. 69 is a screen display showing the notifications.

FIG. 69 is a screen display showing the notifications. The page has "Notifications" 692 as a title. The current location of the super admin is indicated with item 699. The super admin can check the notification by selecting the "Notification" link 3610 of screen display 3600 in FIG. 36. The super admin can select the notification link 694 to check the notification as displayed in screen display 690. The notification page 6900 includes a list of a notification, a showing entry number 6922, the searching entries on the list 6902, a searching field 6916, a "Reset" button 6918, and a page number 6922 with a "Previous" link and a "Next" link. The list of the notifications includes a "Map" column 6904, a "Map Unique Id" column 6906, a "From" column 6908, a "To" column 6910, a "Message" column 6912, and a "Created On" column 6914.

Figure 70:
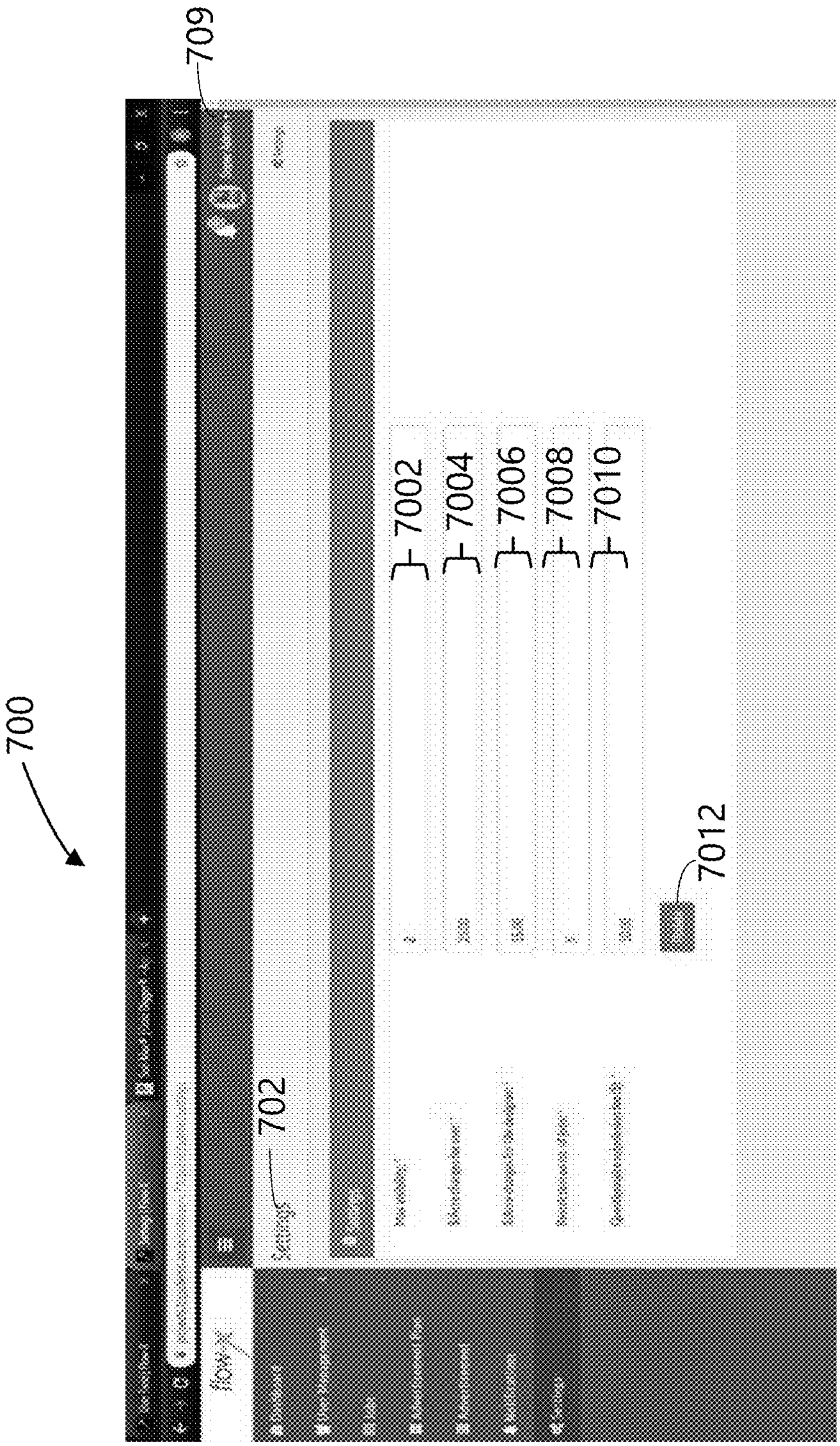
FIG. 70 is a screen display showing the "Setting" web page that allows the super admin to change the price for users and tile designers.

FIG. 70 is a screen display 700 showing the super admin access after selecting the "Setting" link 3612 of screen display 360 of FIG. 36. The page has "Settings" 702 as a title. The current location of the super admin is indicated with item 709. The super admin has the ability to make changes on the "Max visibility" field 7002, the "%/Acre charges for user" field 7004, a "$/Acre charges for tile designer" field 7006, a "Restriction on no. of jobs" 7008, and a "Questionnaire submissions fee ($)" field 7010. Once all the information has been updated, the super admin selects the "Update" button 7012 to update.

Figure 71:
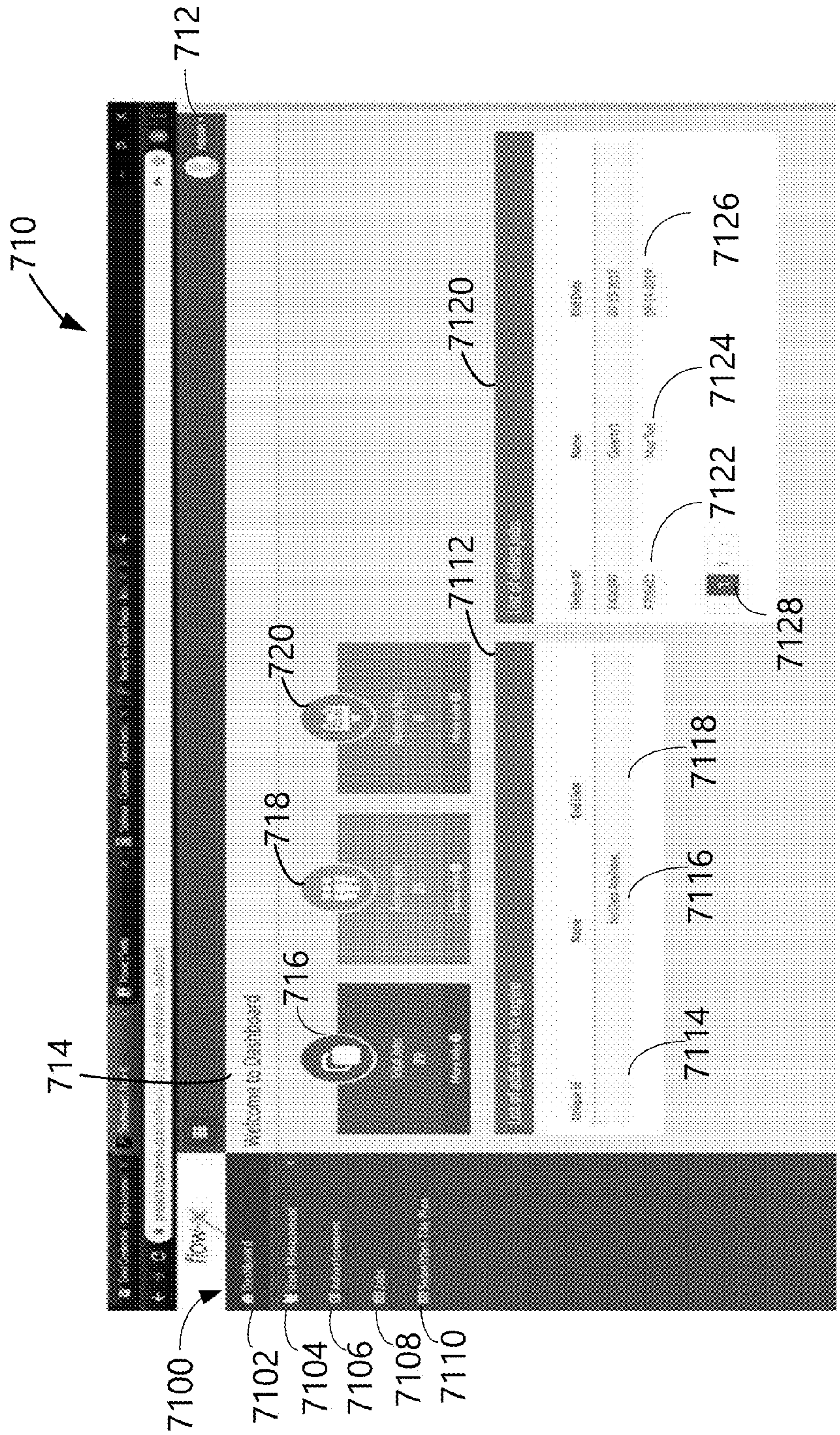
FIG. 71 is a screen display showing the admin's dashboard includes "Menu" bar, "List of advt about to expire", "List of oldest jobs", "Total Jobs", "Active Jobs", "Running Ads", etc.

FIG. 71 is a screen display 710 showing the Admin's Dashboard which includes menu bar 7100, a "List of advt about to expire" box 7112, a "List of oldest jobs" box 7120, a "Total Jobs" box 716, an "Active Jobs" box 718, and a "Running Ads" box 720. The admin name and profile picture 712 are shown. The web page has "Welcome Dashboard" 714 as a title. The menu bar 7100 may include a "Dashboard" item 7102, a "User Management" item 7104, an "Advertisement" item 7106, a "Jobs" item 7108, and a "Submitted Tile Plan" item 7110. The "List of advt about to expire" box 7112 includes a "Unique Id" column 7114, a "Name" column 7116, and an "End Date" column 7118. The "List of oldest jobs" box 7120 includes a "Unique Id" column 7122, a "Name" column 7124, an "End Date" column 7126, and a page number with "Previous" link and "Next" link to change page 7128.

Figure 72:
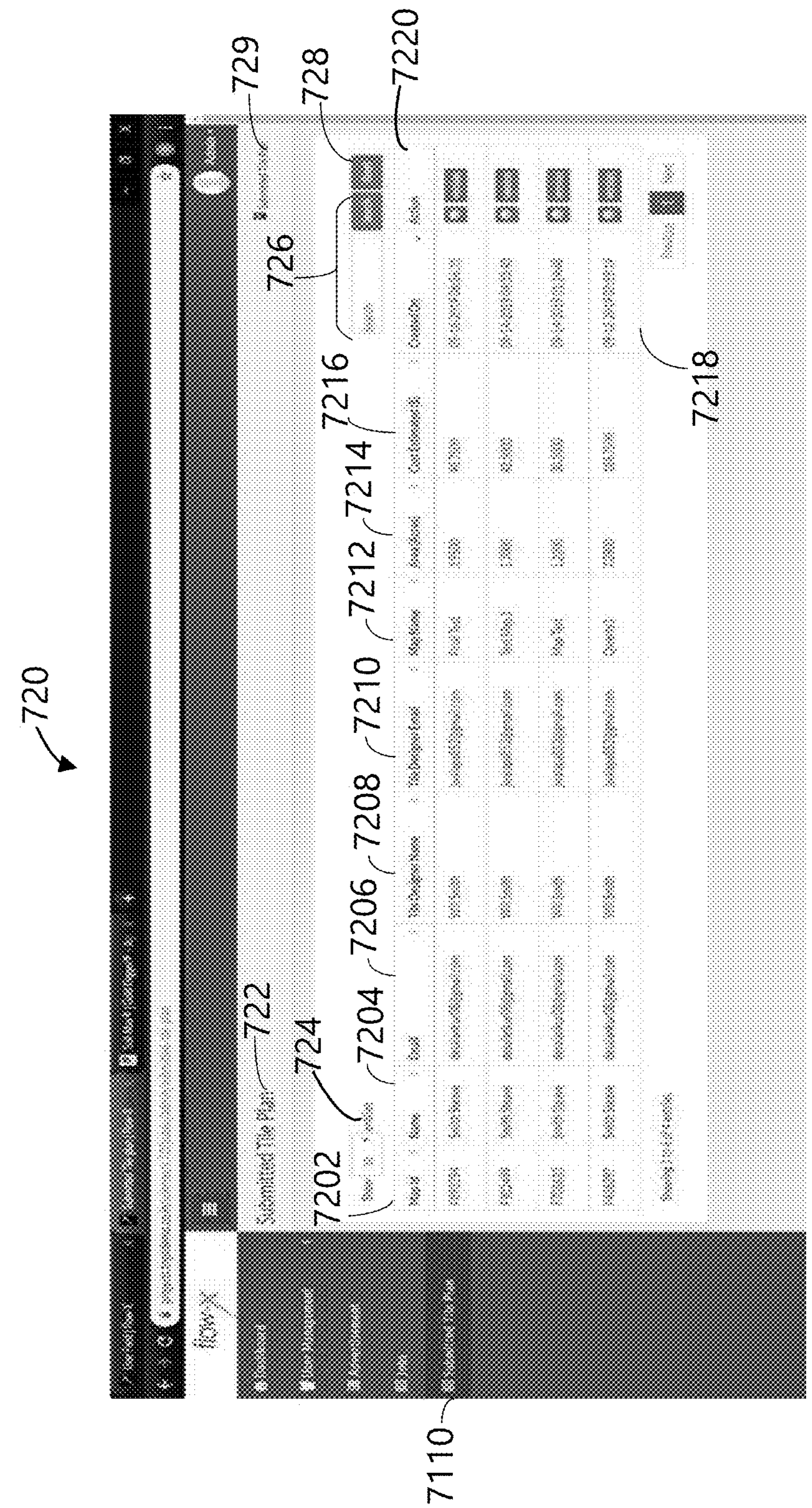
FIG. 72 is a screen display showing the submitted tile plan is in the "Submitted Tile Plan" bar.

FIG. 72 is a screen display 720 showing the submitted tile plan list after the admin has selected the "Submitted Tile Plan" link 7110 of screen display 710 in FIG. 71. The web page has "Submitted Tile Plan" 722 as a title. The current location 729 of the super admin is shown. The "Submitted Tile Plan" page 7200 may include a list of tile plans, a showing entry number 7222, the searching entries on the list 724, a searching field 726, a "Reset" button 728, and a page number 724 with a "Previous" link and a "Next" link. The list of tile plans includes a "Map Id" column 7202, a "Name" column 7204, an "Email" column 7206, a "Tile Designer Name" column 7208, a "Tile Designer Email" column 7210, a "Map Name" 7212, an "Area(Acres)" 7214, a "Cost Estimated($)" 7216, a "Created On" column 7218, and an "Action" 7220.

Figure 73:
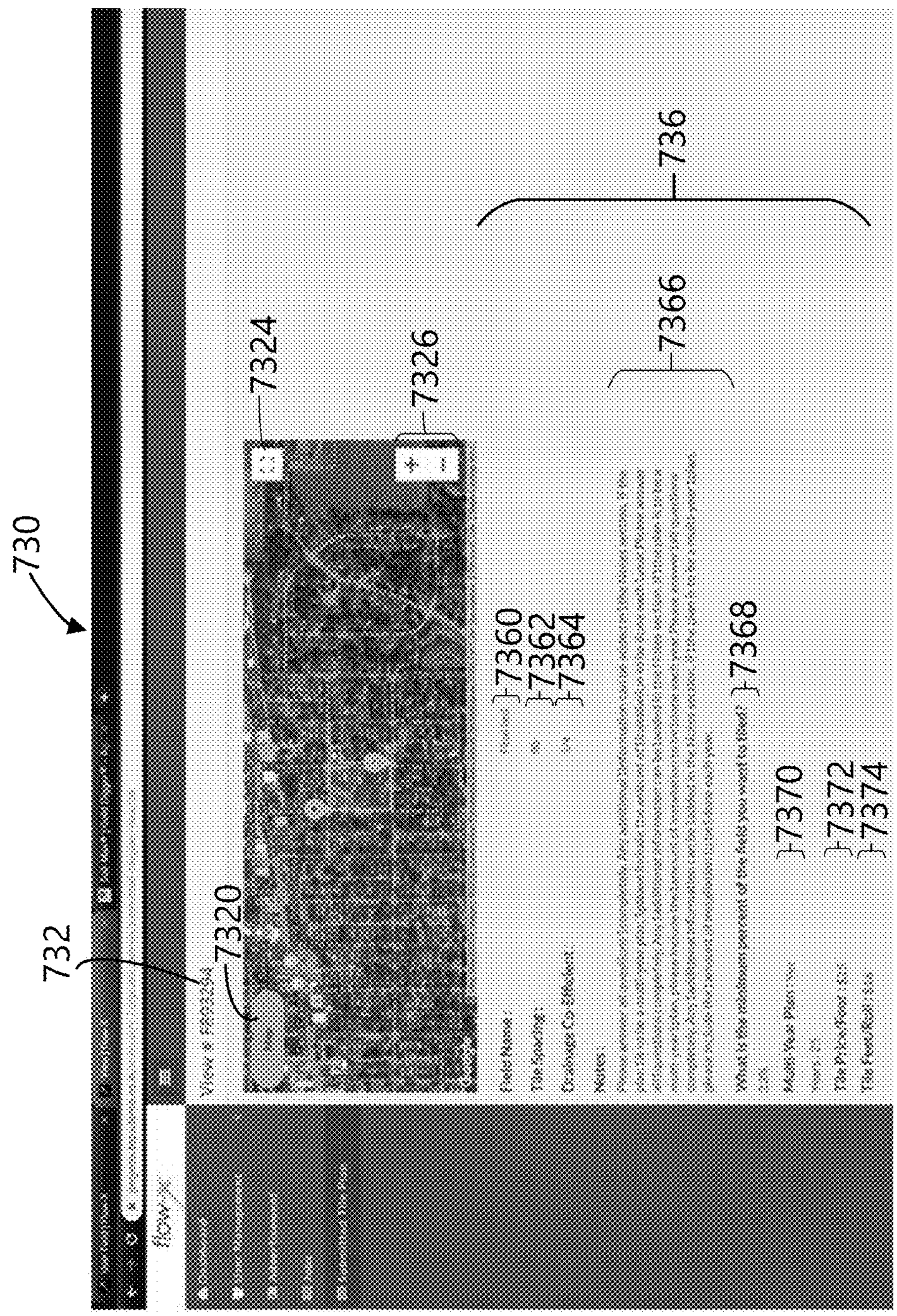
FIG. 73 is a screen display showing the web page for a submitted tile plan.

FIG. 73 is a screen display 730 showing the detail of a submitted tile plan. The detail page includes a tile plan title with a unique ID 732, a map and the questionnaire of the plan 736. The map 734 provides location information of the tile plan. The admin can select the "Map" link 7320 to check the map, the full screen 7324 link to display in full screen, and the controlling zoom 7326 to display larger or smaller. The questionnaire of the plan 736 includes a "Field Name" 7360, a "Tile Spacing" 7362, a "Drainage Co-Efficient" 7364, a "Notes" 7366, a percentage 7368, a "Multi-Year Plan" and years 7370, a "Tile Price/Foot" 7372, and a "Tile Fee/Roll" 7374.

Figure 74:
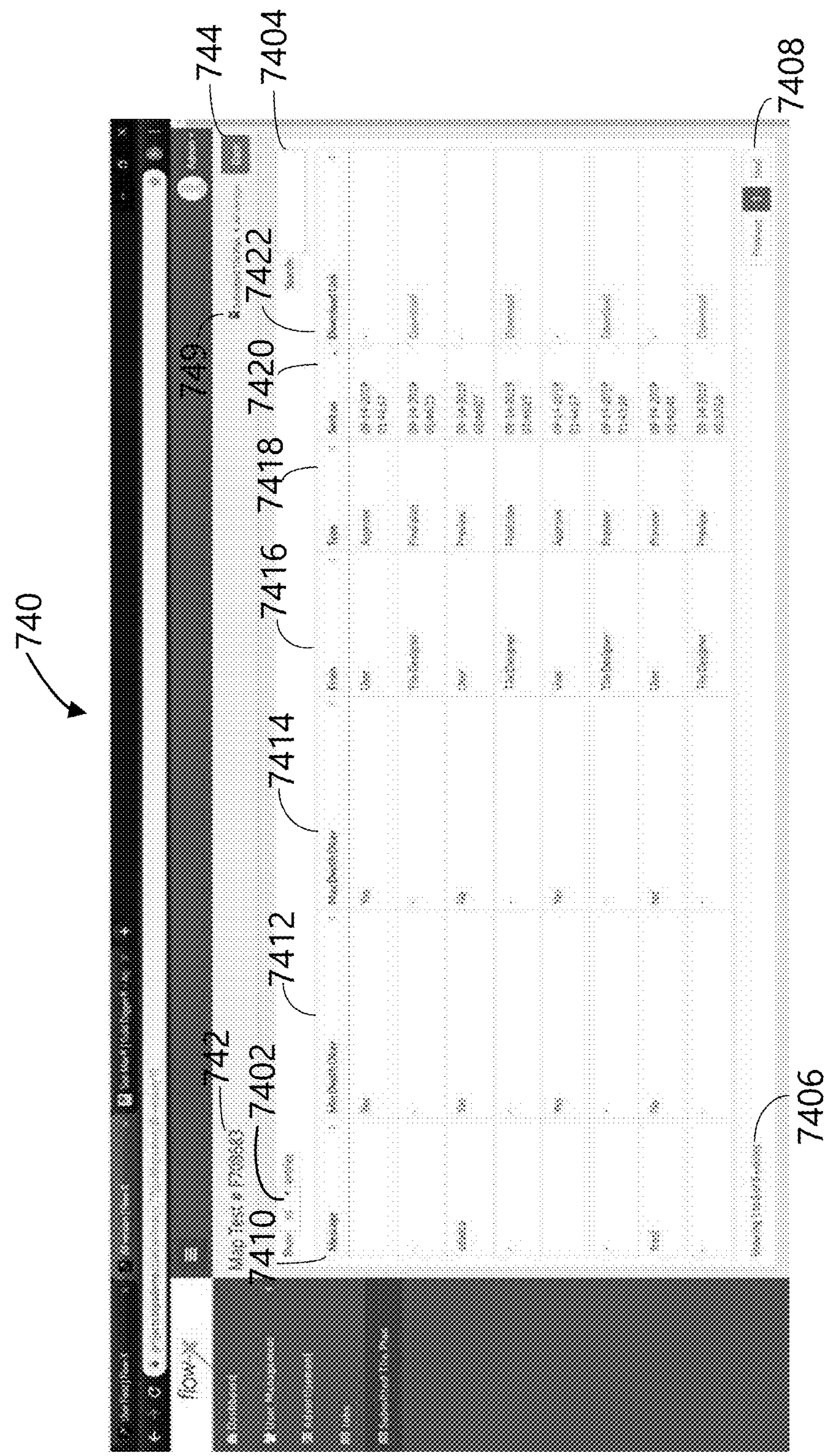
FIG. 74 is a screen display showing the map test between users and tile designers.

FIG. 74 is a screen display 740 showing the Map Test between Users and Tile Designers. The web page has "Map Test" 742 with a unique map number as title. The current location of the super admin within the navigational framework is shown with the link 749. The "Map Test" page includes the process of the map designers, a showing entry number 7406, the searching entries on the list 7402, a searching field 7404, and a page number 7408 with "Previous" link and "Next" link. The list of tile plans includes a "Message" column 7410, a "Min Depth Okay" column 7412, a "Max Depth Okay" column 7414, a "From" column 7416, a "Type" column 7418, a "Sent on" 7420, and a "Download Link" column 7422.

Figure 75:
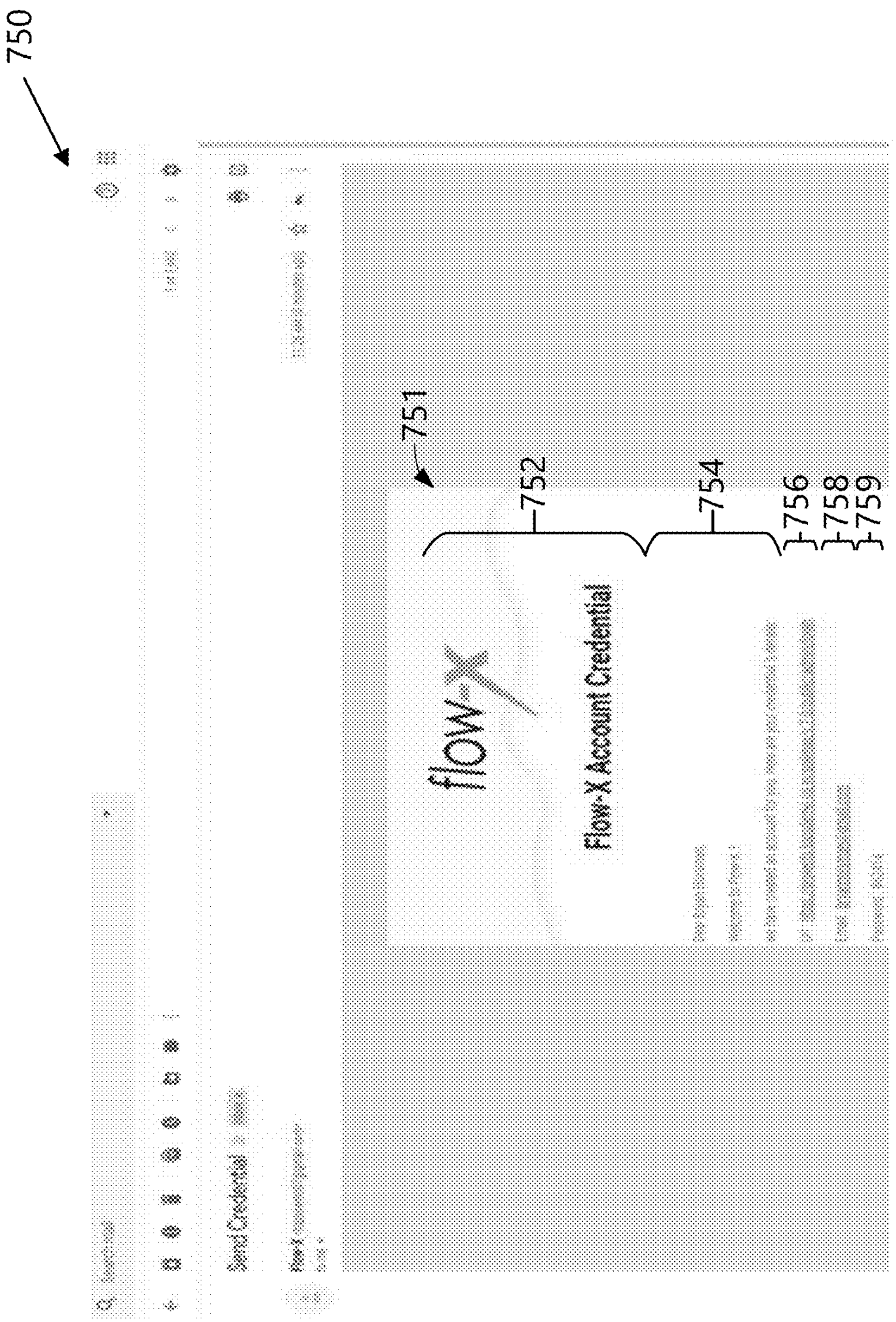
FIG. 75 is a screen display showing a tile designer received a credential email.

FIG. 75 is a screen display 750 showing a tile designer has received a credential email. The email 751 includes a subject 752, a greeting message to the user 754, a "URL" link 756, an "Email" 758, and a "Password" 759.

Figure 76:
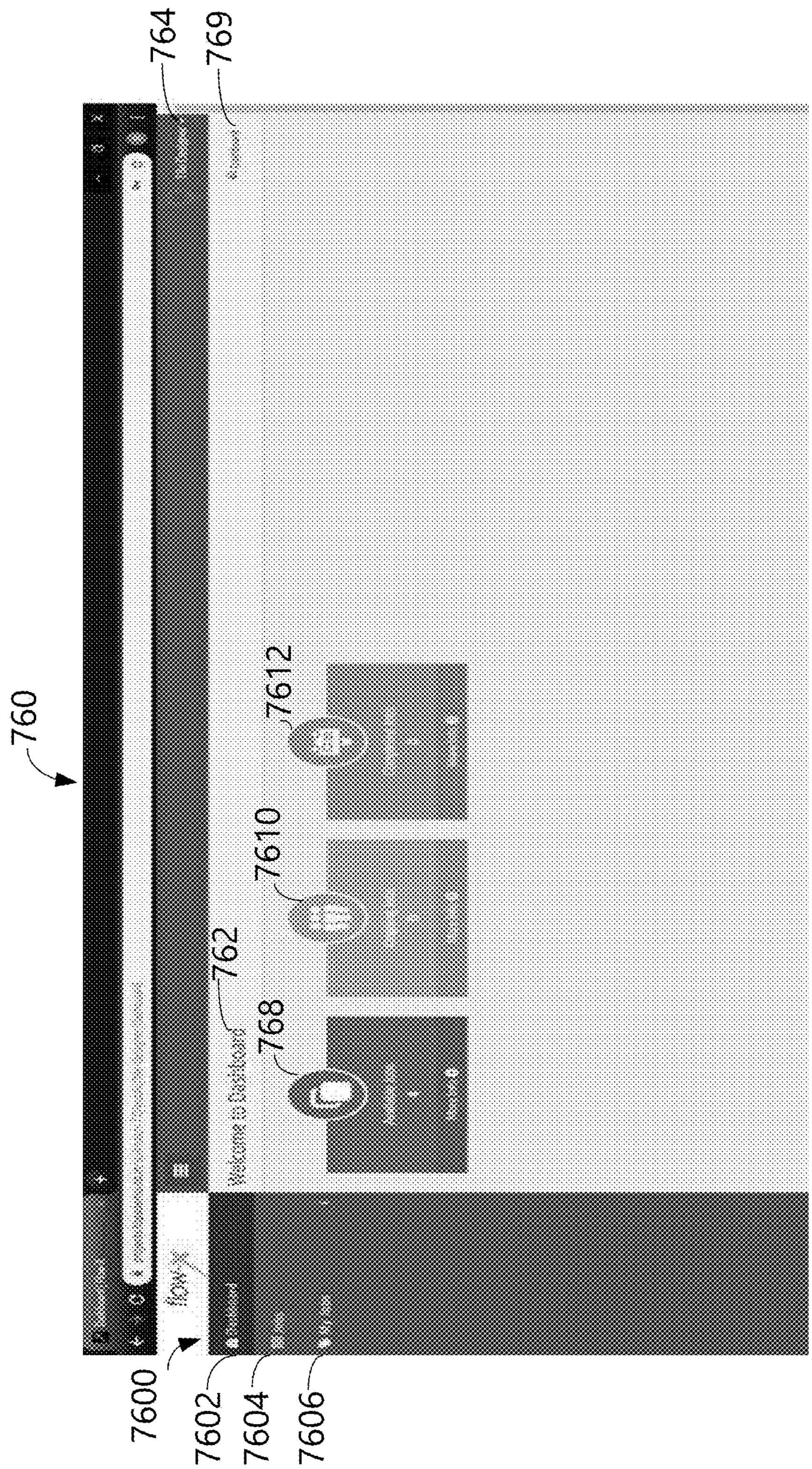
FIG. 76 is a screen display showing the tile designer's dashboard web page.

FIG. 76 is a screen display 760 showing the Tile Designer's Dashboard web page has "Welcome to Dashboard" 762 as title, a "Available Jobs" section 768, an "Ongoing Jobs" section 7610, and a "Completed Jobs" section 7612. The menu bar 7600 includes a "Dashboard" item 7602, a "Jobs" item 7604, and a "My Jobs" item 7606. The admin name and profile picture shows as the link 764. The current location of the super admin is indicated with item 769.

Figure 77:
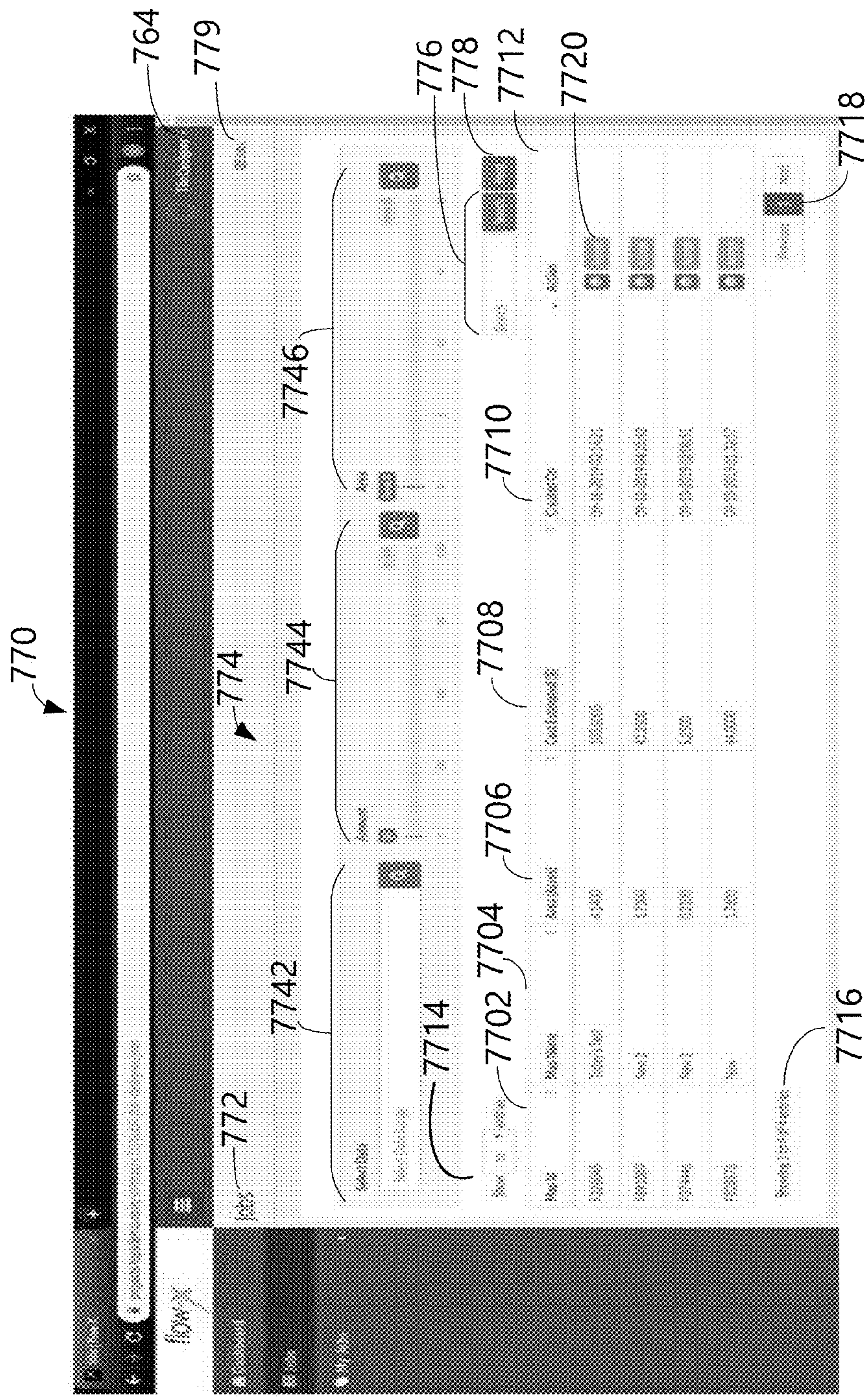
FIG. 77 is a screen display showing the jobs and listed for the tile designer.

FIG. 77 is a screen display 770 showing the job list for a tile designer. The "Jobs" 772 are shown in response with the tile designer selecting the "Jobs" link 7704 of screen display 770. The head 772 of the tile designer page appears with "View" and the ID number. The screen display 770 may include a searching section 774, and a list of jobs, a showing entries number 7716, the searching entries on the list 7714, a searching field 776, a "Reset" 778, and a page number 7718 with "Previous" and "Next" links. The searching section 774 may include a "Select Date" field 7742, an "Amount" 7744, and an "Area" 7746. The list of jobs includes a "Map Id" column 7702, a "Map Name" column 7704, an "Area (Acres)" column 7706, a "Cost Estimated ($)" column 7708, a "Created On" column 7710, and an "Action" 7712. The tile designer may select the "Accept" button 7720 to accept the job.

Figure 78:
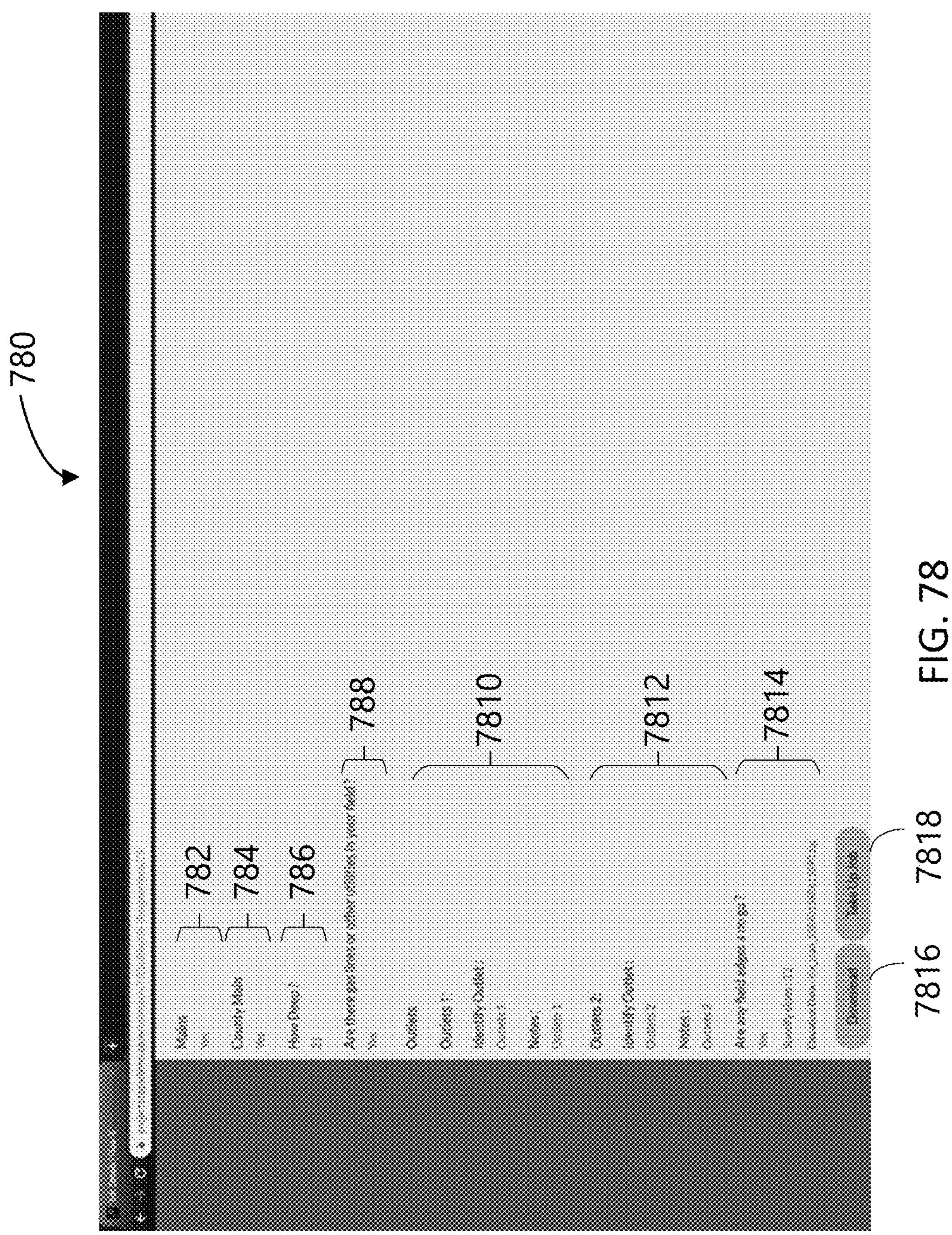
FIG. 78 is a screen display showing details of the job and tile designer can choose to download it or take pp the job.

FIG. 78 is a screen display 780 showing the detail of the job to tile designer. The tile designer has ability to select the "Download" button 7816 to download the job, or the designer may select the "Take Up Job" button 7818 to take up the job. The detail of the job includes a "Main" field 782, a "County Mains" 784, a "How Deep" 786, an answer to the gas lines and utilities in the area 788, an "Outlet 1" information 7810, an "Outlet 2" information 7812 and an answer to the not going to field edges 7814.

Figure 79:
FIG. 79 is a screen display showing "Open Jobs" to the tile designer.

FIG. 79 is a screen display 790 showing "Open Jobs" to the Tile Designer. In response to the tile designers selecting the "My Jobs" link, the "Open Jobs" link 7918 and the "Completed jobs" link 7920 are shown. The "Open Jobs" 792 is shown in response to the tile designer selecting the "Open Jobs" link 7918 of screen display 790. The screen display 790 includes a list of the open jobs 7900 including an entry number 7914, the searching entries on the list 794, a searching field 776, a "Reset" 798, and a page number 7916 with a "Previous" link and a "Next" link. The list of open jobs 7900 includes a "Map Id" column 7902, a "Map Name" column 7904, an "Area (Acres)" column 7906, a "Cost Estimated ($)" column 7908, a "Created On" column 7910, and an "Action" 7912.

Figure 80:
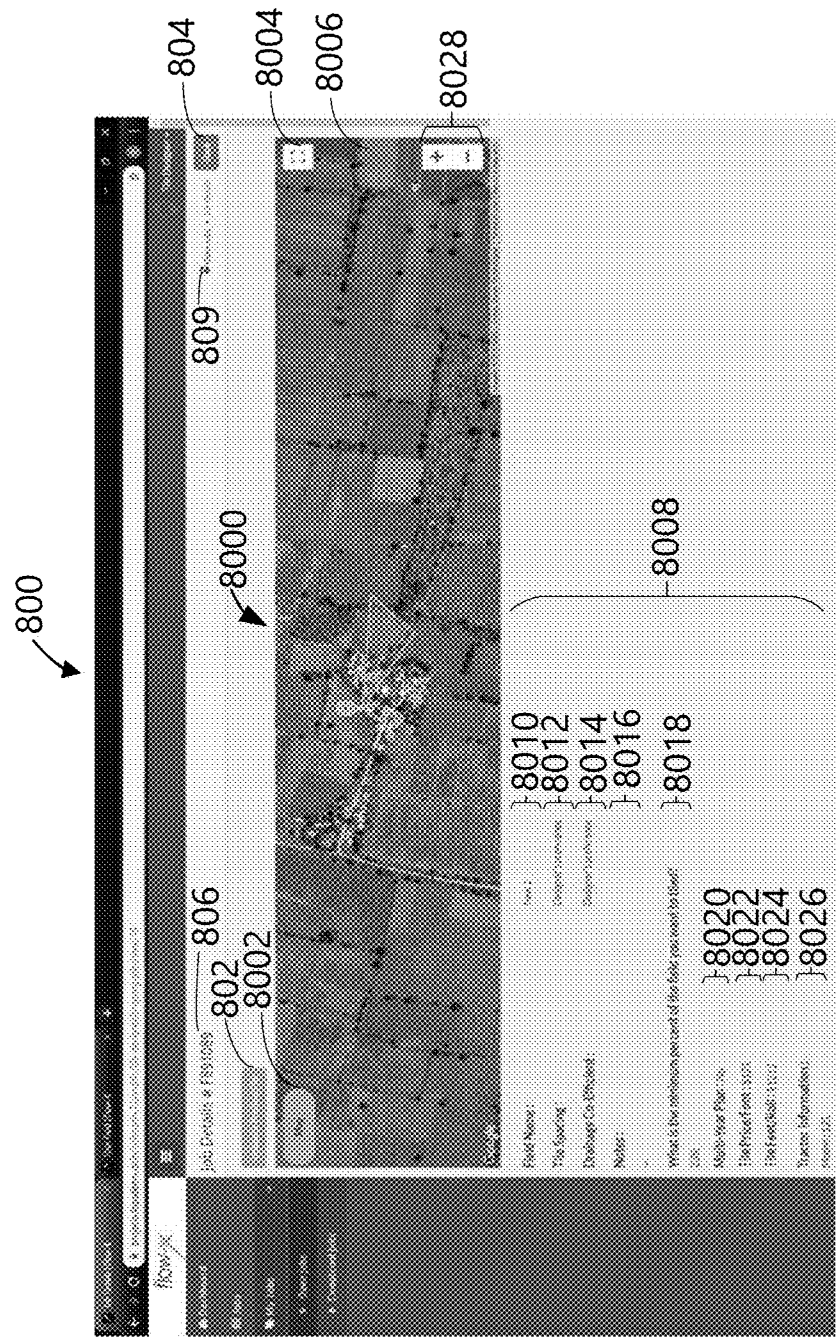
FIG. 80 is a screen display showing a job's details to the tile designer.

FIG. 80 is a screen display 800 showing a job's details to the tile designer. The detail page 8000 includes a tile plan title with a unique ID 806, a map 8006 and the questionnaire of the plan 8008. The map 8006 provides location information of the tile plan. The tile designer can select the "Map" link 8002 to check the map, the full screen 8004 link to display in full screen, and the controlling zoom 8028 to display large and small map. The questionnaire of the open job includes a "Field Name" 8010, a "Tile Spacing" 8012, a "Drainage Co-Efficient" 8014, a "Notes" 8016, a percentage 8018, a "Multi-Year Plan" and years 8020, a "Tile Price/Foot" 8022, a "Tile Fee/Roll" 8024, and a "Tractor Information" 8026. The tile designer can select the "Back" link 804 to go back to the last page. The "Upload a Preview File" button 802 can upload a preview file for the tile designer.

Figure 81:
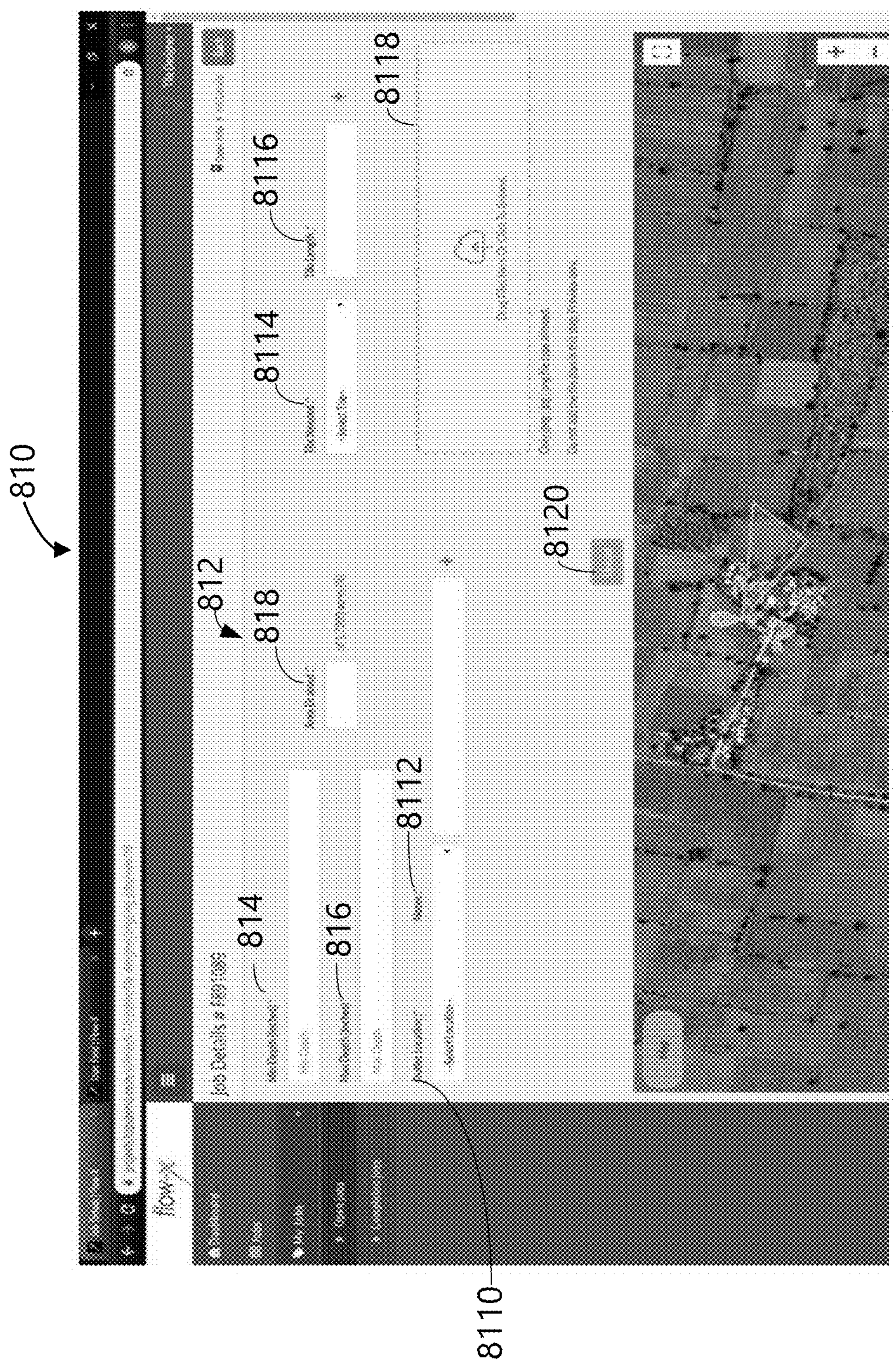
FIG. 81 is a screen display showing the tile designer can upload a preview file to an open job.

FIG. 81 is a screen display 810 showing the tile designer can upload a preview file in job details page. In response to the tile designer selecting "Upload a Preview File" button 802 of screen display 800 in FIG. 80, the upload section 810 is shown. The section 812 may include a "Min Dept (Inches)" 814, a "Max Depth (Inches)" 816, an "Area Drained" 818 an "Outlet Location" 8110, a "Tile Needed" 8114, a "Tile Length" 8116, and a field to upload files 8118. Once all the information is collected, the tile designer selects the "Upload" link 8120 to upload.

Figure 82:
FIG. 82 is a screen display showing a tile designer uploaded a preview file successfully.

FIG. 82 is a screen display 820 showing a tile designer has uploaded a preview file. Once a file has been uploaded, the file information is shown in a form 822. The form includes a "Message" column 824, a "Min Depth Okay" column 826, a "Max Depth Okay" 828, a "From" column 8210, a "Type" column 8212, a "Sent On" column 8214, and a "Download Link" 8216.

Figure 83:
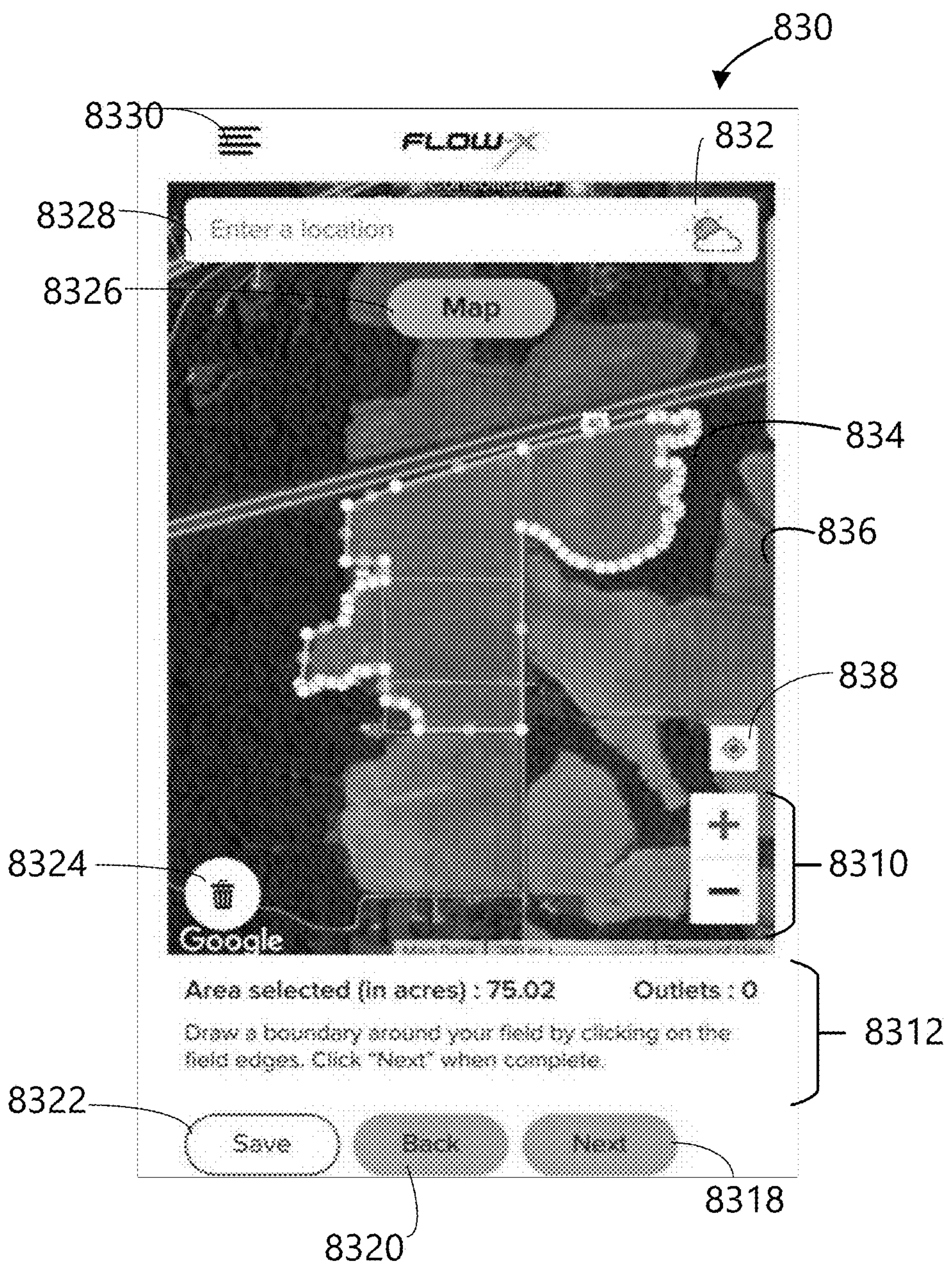
FIG. 83 is a screen display associated with a mobile app which allows a user to identify a field location and define the boundaries for the field.

FIG. 83 is a screen display 830 associated with a mobile app which allows a user to identify a field location and define the boundaries for the field. The user is allowed to draw a field 834 as shown on the map 836 through the mobile app. A user can enter a location in the location input box 8328 and select the map link 8326 to display a map of the field. The user may control the map by controlling zoom 8310 and full screen display link 838. The user can check the weather by selecting the cloud and sun (weather) icon 832 on the right side of the "Enter a location" input box 8328. The user may delete the select field by selecting the link 8324. The selected field detail 8312 is shown below the map 8312. After the field is complete selected, the user may select the "Save" button 8322 to save, or may select the "Back" button 8320 to cancel, or may select the "Next" button 8318 to proceed to the next step. The user may go to the main menu by selecting the "Menu" button 8330.

Figure 84:
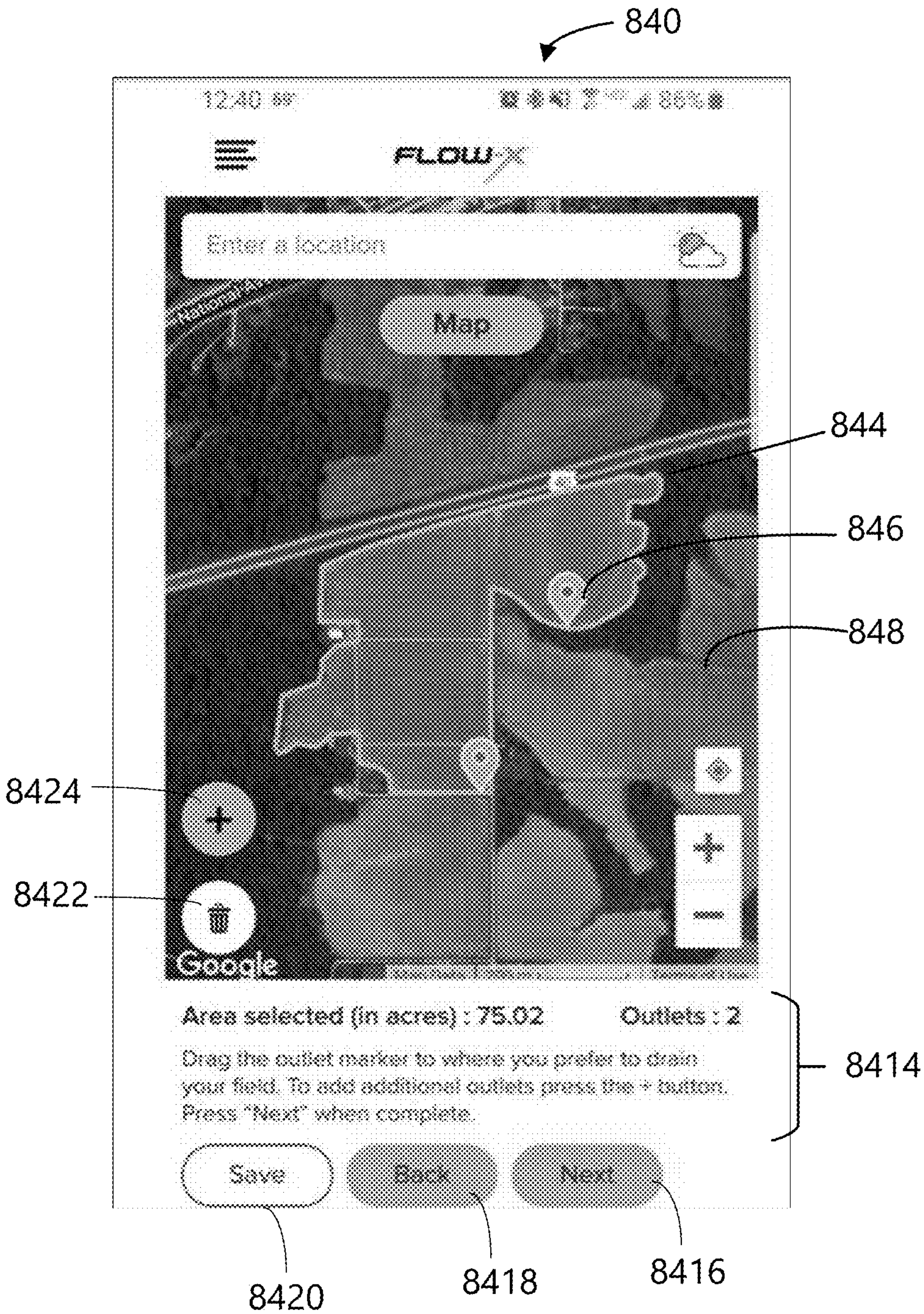
FIG. 84 is a screen display associated with the mobile app which determines an area for the field and allows a user to define the location of drainage outlets within the field.

FIG. 84 is a screen display 840 associated with the mobile app which determines an area for the field and allows a user to define the location of drainage outlets within the field. In response to the user selecting the "Next" button in screen display 830 of FIG. 83. The drainage outlets may be added by the user by selecting the button 8424. The number of drainage outlets is displayed in the details 8414. Other options are the "Save" button 8420 to save, the "Back" button 8418 to go back, and the "Next" button 8416 to proceed to the next step.

Figure 85:
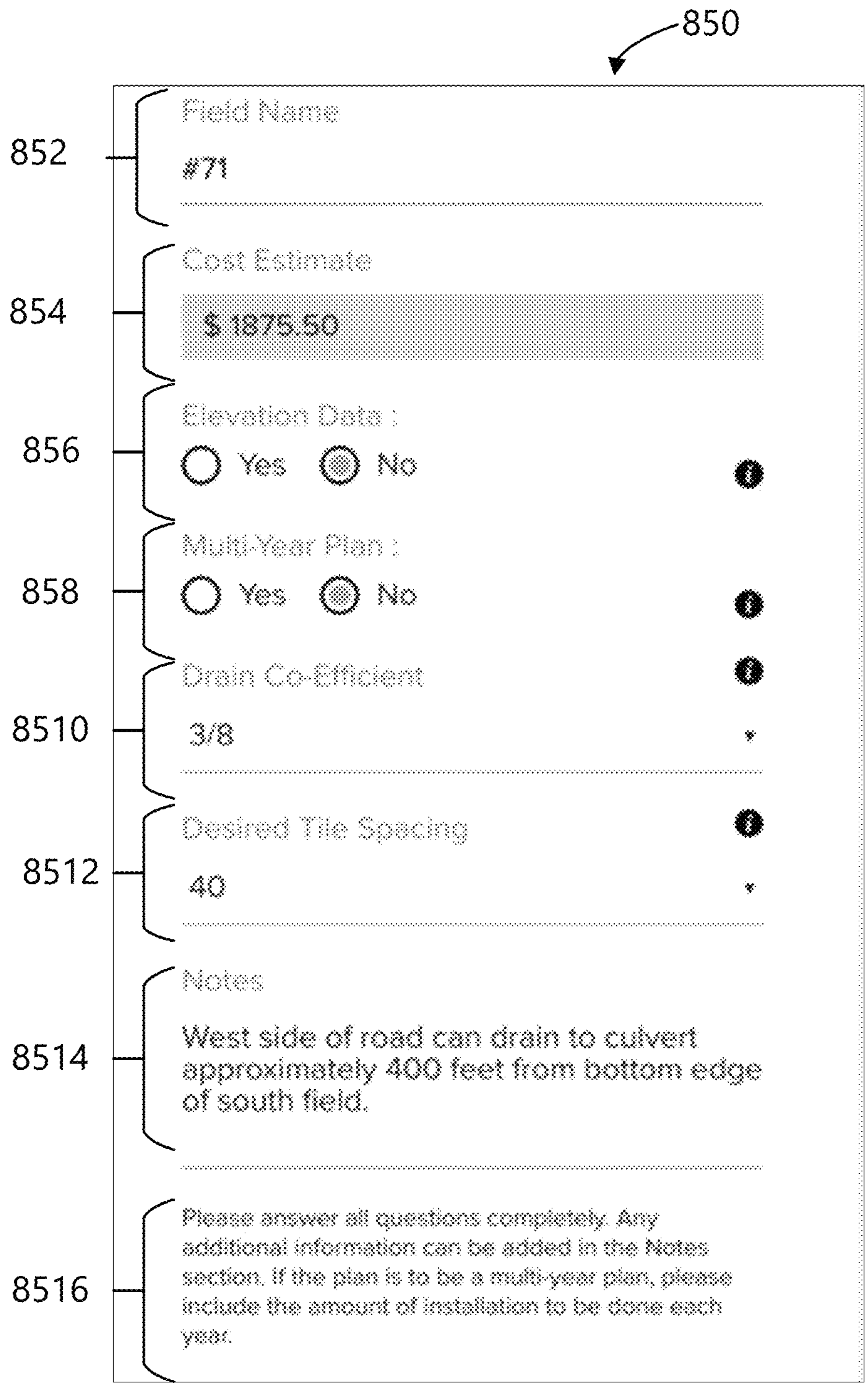
FIG. 85 is a screen display associated with the mobile app which allows a user to specify additional information and provides a cost estimate.

FIG. 85 is a screen display 850 associated with the mobile app which allows a user to specify additional information and provides a cost estimate. The user may enters a name in the "Field Name" field 852, is shown an estimated cost in the "Cost Estimate" field 854, enters a "Yes" or "No" in the "Elevation Data" field 856, a "Yes" or "No" in the "Multi-Year Plan" field 858, a drainage percentage in the "Drain Co-Efficient" field 8510, a desired tile space in the "Desired Tile Spacing" field 8512, and a note in the "Note" field 8514. Instructions 8516 are presented to the user to assist in providing the requested information.

Figure 86:
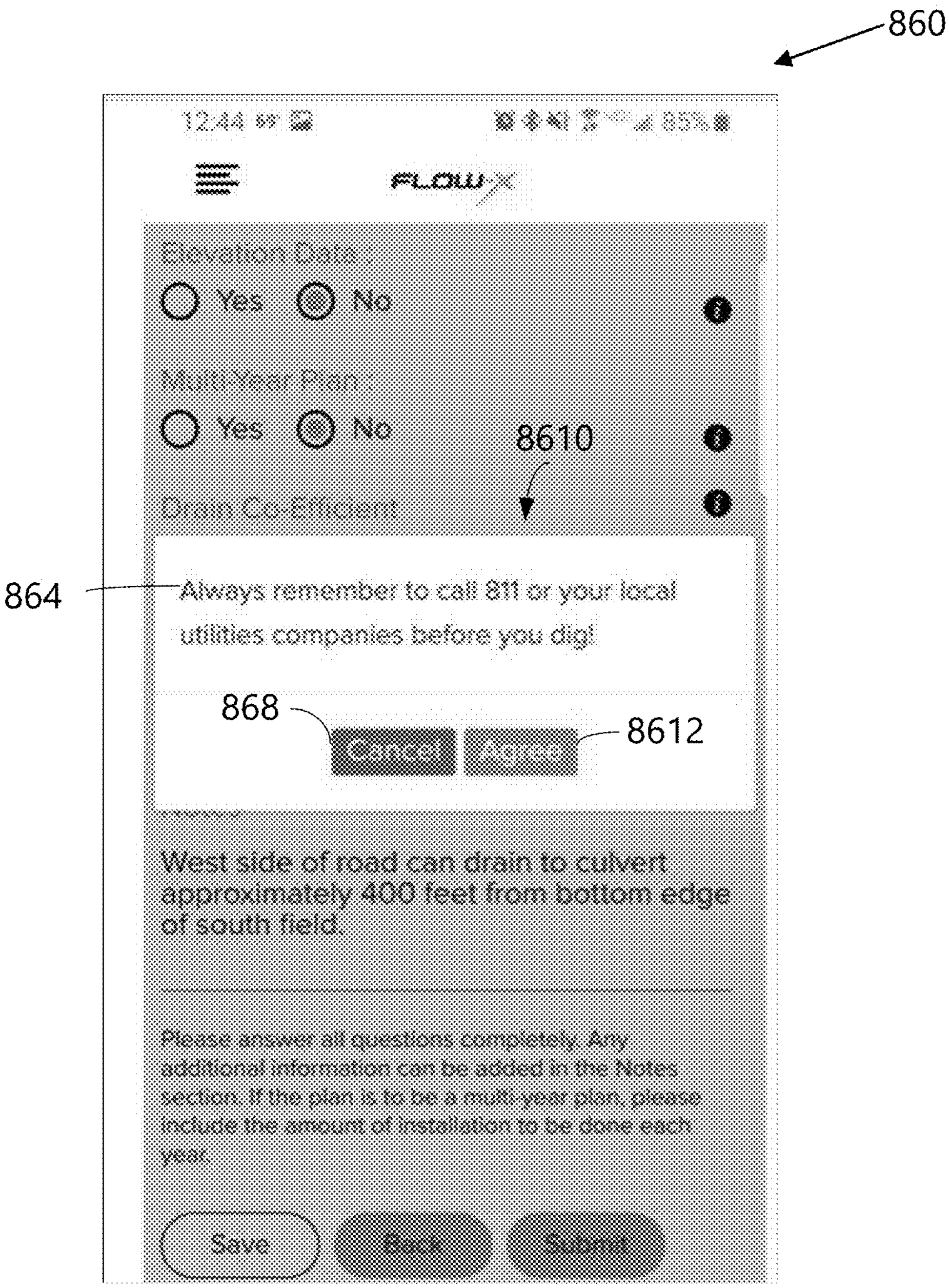
FIG. 86 is a screen display associated with the mobile app which provides a helpful reminder to users to contact local utility companies before digging.

FIG. 86 is a screen display 860 associated with the mobile app which provides a helpful reminder 8610 to users to contact local utility companies before digging. The reminder 8610 may include a message 864, a "Cancel" button 868, and an "Agree" button 8612.

Figure 87:
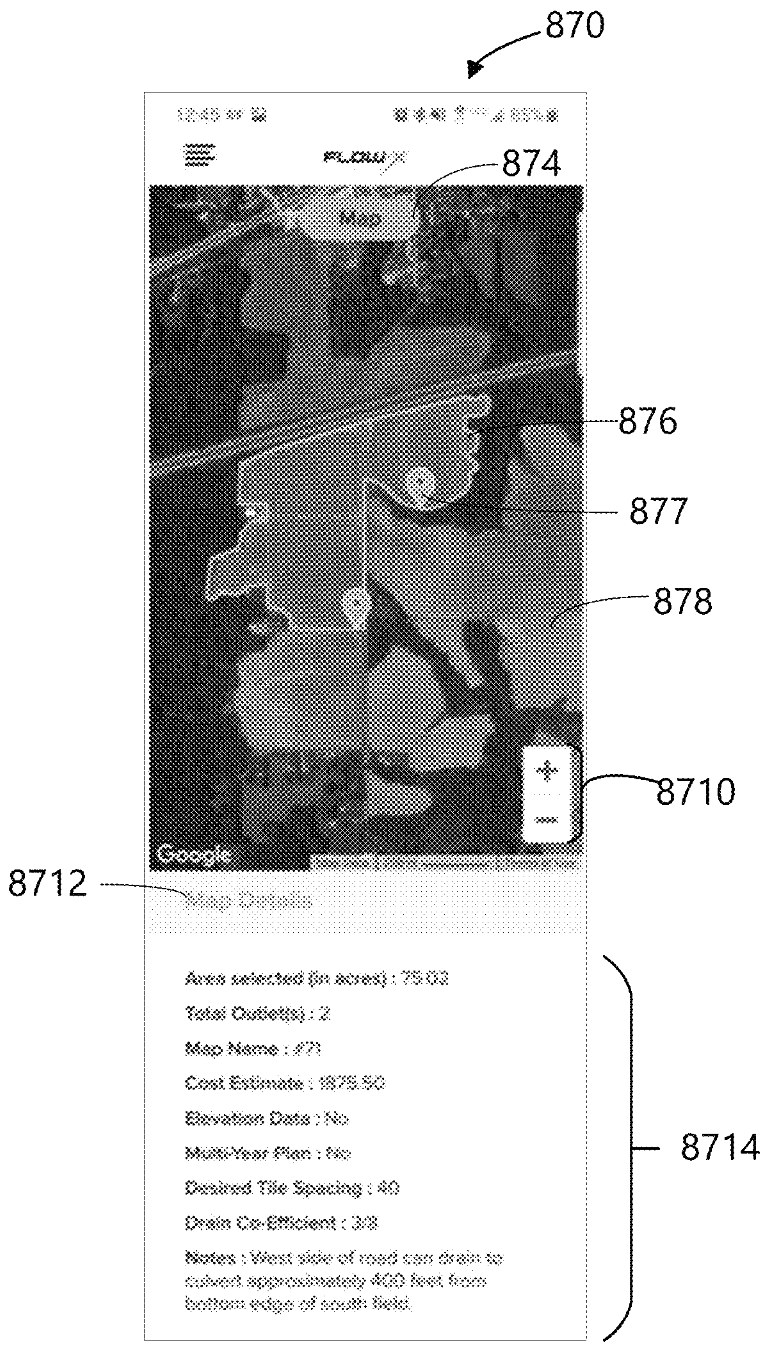
FIG. 87 is another screen display associated with the mobile app which further shows the information provided by the user to be submitted for processing.

FIG. 87 is another screen display associated with the mobile app which further shows the information provided by the user to be submitted for processing. The confirmation page includes a selected field 876 with drainage outlets 877 on a map 878. The user may control zoom of the map to check on the selected field detail. The detail of the tile plan appears below the map in region 8714.

Figure 88:
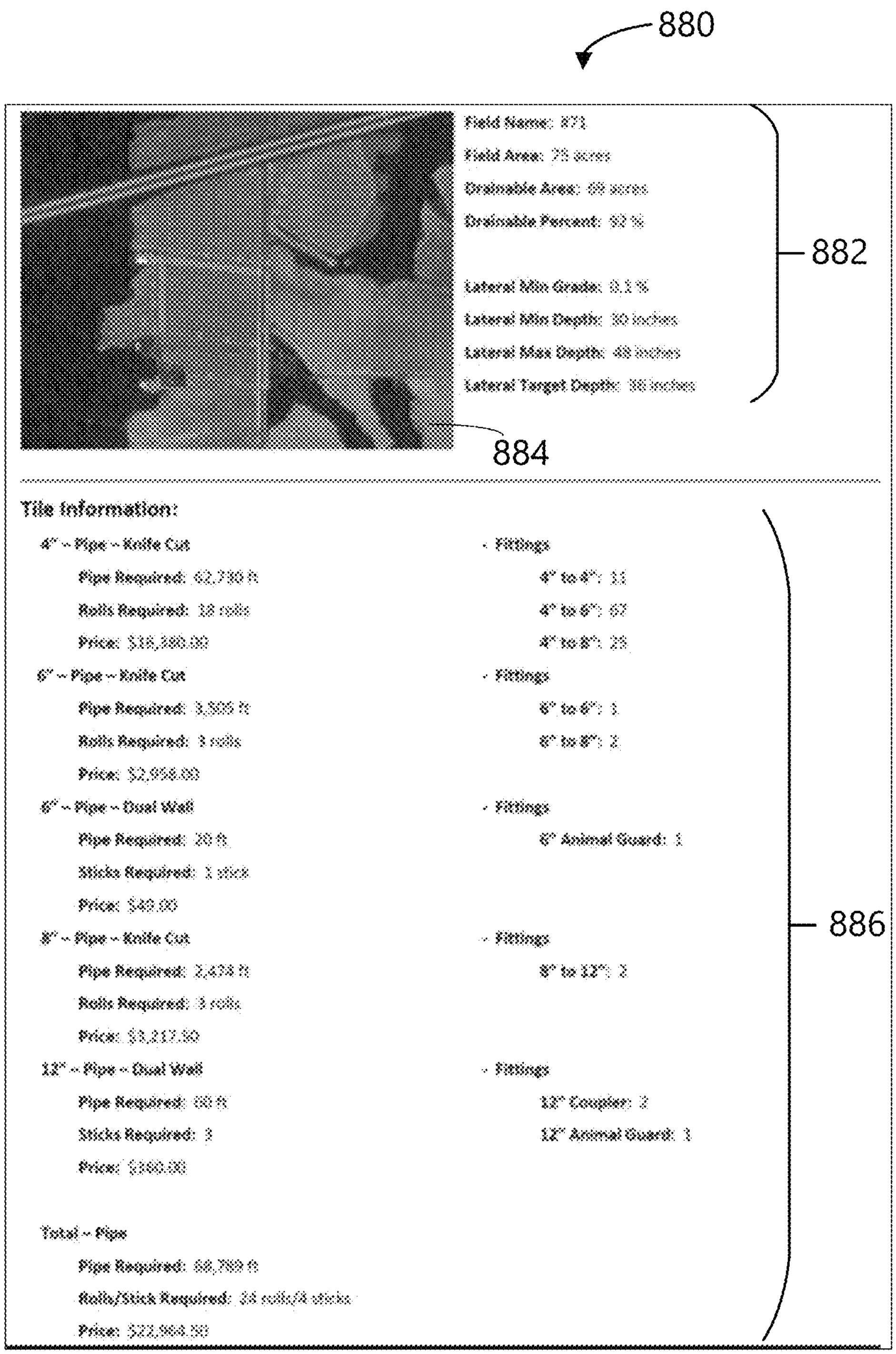
FIG. 88 is another screen display associated with the mobile app which shows information regarding a tile plan for the field.

FIG. 88 is another screen display 880 associated with the mobile app which shows information regarding a tile plan for the field. The submitted information includes details of the field and lateral information in region 882, a selected field map 884, and a region including the tile information 886.

Figure 89:
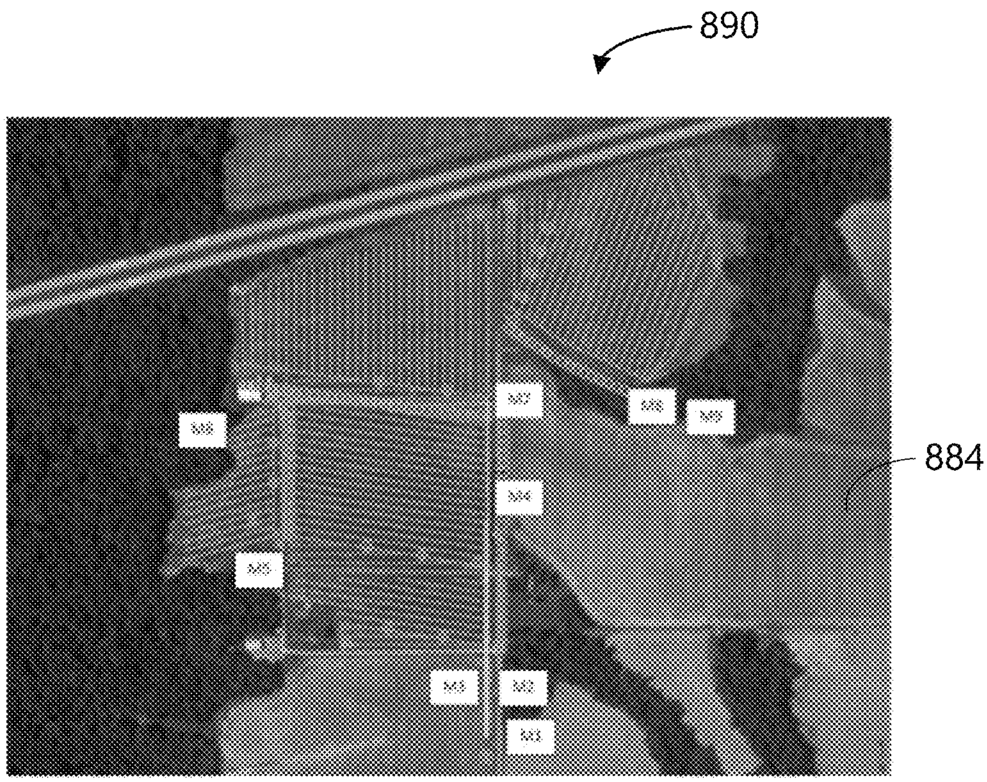
FIG. 89 is another screen display associated with the mobile app which shows location of tile to be installed within the field and additional tile plan information.

FIG. 89 is another screen display 890 associated with the mobile app which shows the location of tile to be installed within the field and additional tile plan information. The tile plan of the field in screen display 890 may include all details of the tile information in form 882 which separates the tile plan of the field in different regions (e.g. M1, M2, M3, M4, M5, M6, M7, M8, M9) on the map 884 and specifies the type of pipe for each region, the length of pipe needed, the minimum grade, the minimum depth, the maximum depth, and a target depth.

Figure 90:
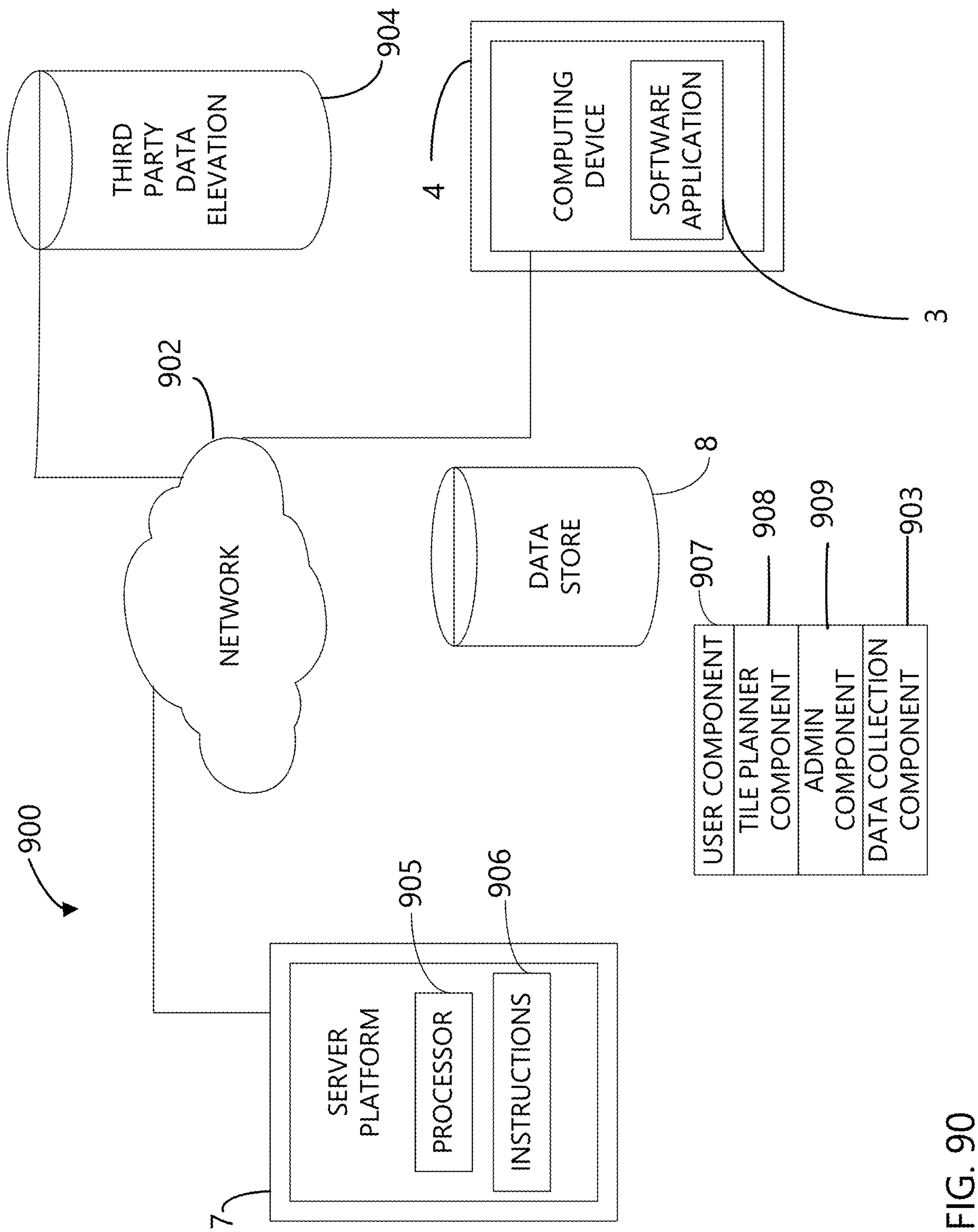
FIG. 90 is a pictorial representation of one example of a system.

FIG. 90 is a pictorial representation of one example of a system 900. A server platform 7 is shown. The server platform may be associated with any number of different cloud providers including Amazon Web Services (AWS) from Amazon, Google Cloud, or may be privately hosted. The server platform 7 includes one or more processors 905 for executing instructions 906. The instructions 906 may include instructions defining a user component 907, instructions defining a tile planner component 908, instructions defining an admin component 909, and instructions defining an additional data collection component 903. The user component 907 provides for interacting with one or more users in order to collect data needed for a tile plan. The interaction may be through a web site or a software application 3 such as a mobile app executing on a computing device 4 associated with the user. The tile planner component 908 provides instructions for interacting with one or more tile planners who design a tile map plan. The admin component 909 provides for interacting with one or more administrators or admins who manage the system. The data collection component 903 may be used such as to acquire additional data which is not provided by the user. The additional data may include third party data 904 such as elevation data such as may be acquired through a government or commercial source. Other types of additional data may include pricing for tile or other materials used in the plan, historical weather data for the field, or other information.

The server platform 7 provides for storing and/or retrieving data from a data store 8 which is in operative communication with the server platform. The data store 8 may be used to store information about or information provided by the user, the tile planner, the administrator, or system generated data about the field, jobs, or other data. The server platform 7 may communicate over the network 902 with one or more computing devices 4 associated with a user. A software application 3 such as a mobile application may be stored on a non-transitory computer readable storage medium of the computing device 4 and executed by one or more processors of the computing device 4.

The software application such as a mobile application and/or web application may also be used to tracking the placement of utilities within a field. It is advantage to know the locations of utilities within a field so that a tile plan may avoid digging anywhere where utilities are located. Generally, the utility tracking feature allows a user to select one or more utilities which may have lines running through the field. Then the user may walk along flag markers within their field which indicate the location of the utilities while carrying a mobile device equipped with location tracking such as GPS tracking, tracking based on triangulation of cellular towers, tracking based on triangulation of Wi-Fi signal sources or tracking based on a combination of different technologies or methods. Once obtained, the mapping of the utilities may be communicated to the tile planner four use in constructing an appropriate tile plan such that utilities are avoided. Examples of utilities may include, without limitation, electric power lines, cables, conduits, and lighting cables; gas, oil steam, petroleum or gaseous material lines; communication, alarm or signal lines, cables or conduit; potable water; reclaimed water, irrigation and slurry lines; sewer and drain lines; proposed excavation; temporary survey marking; and existing tile lines.

Figure 91:
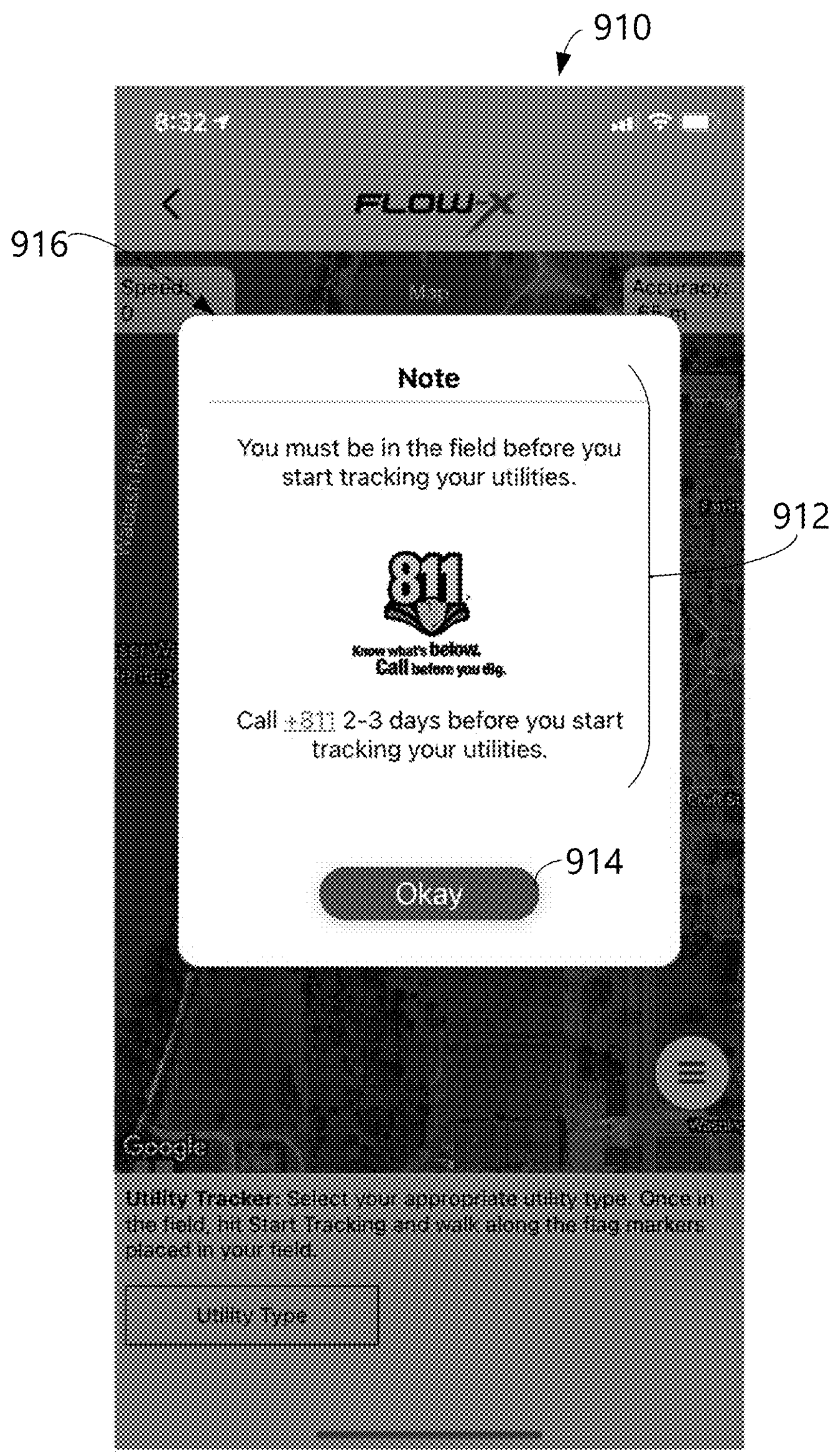
FIG. 91 is a screen display associated with the mobile app which provides a note to users to stay in the field and to contact local utility companies before tracking.

FIG. 91 is a screen display 910 associated with a mobile app or web application which provides a helpful note 916 to users to be in the field before tracking utilities. The note 916 may include a message 912, and an "Okay" button 914. The message 912 may remind the user to call 811 or other appropriate phone number to mark utilities.

Figure 92:
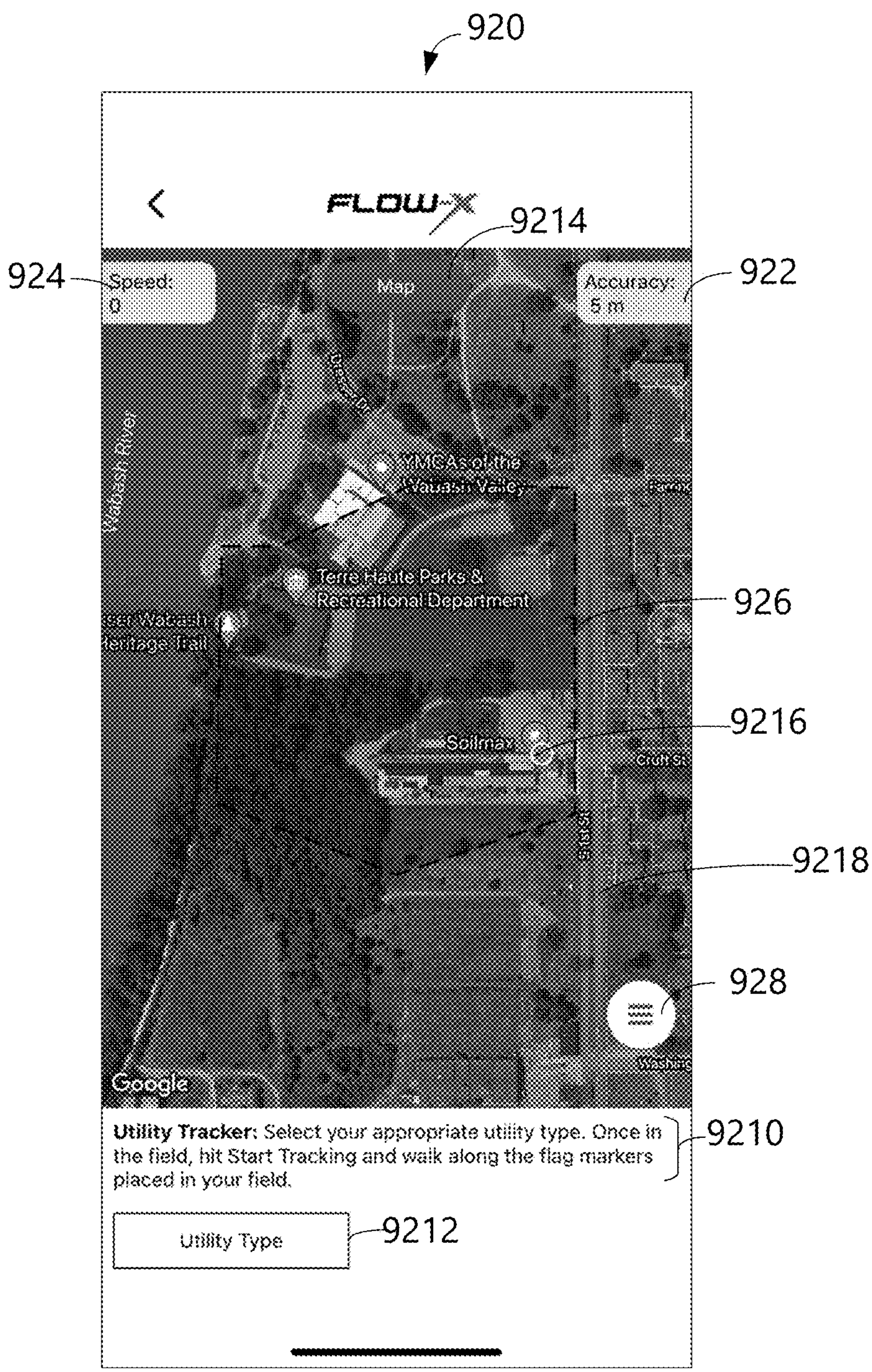
FIG. 92 is another screen display associated with the mobile app which determines the tracking field and the tracking location of utilities.

FIG. 92 is a screen display 920 associated with the mobile app or web application which determines the tracking field and the tracking location of utilities. In response to the user selecting the "Okay" button in screen display 914 of FIG. 91, the utility tracking page 920 includes a selected tracking field 926 with a utility tracker 9216 on a map 9218. The screen displays tracker speed 924, and tracking accuracy 922. The user may access to map by selecting "Map" button 9214, or access to menu by selecting menu link 928. The utility tracker may be added by the user by selecting the button 9212.

Figure 93:
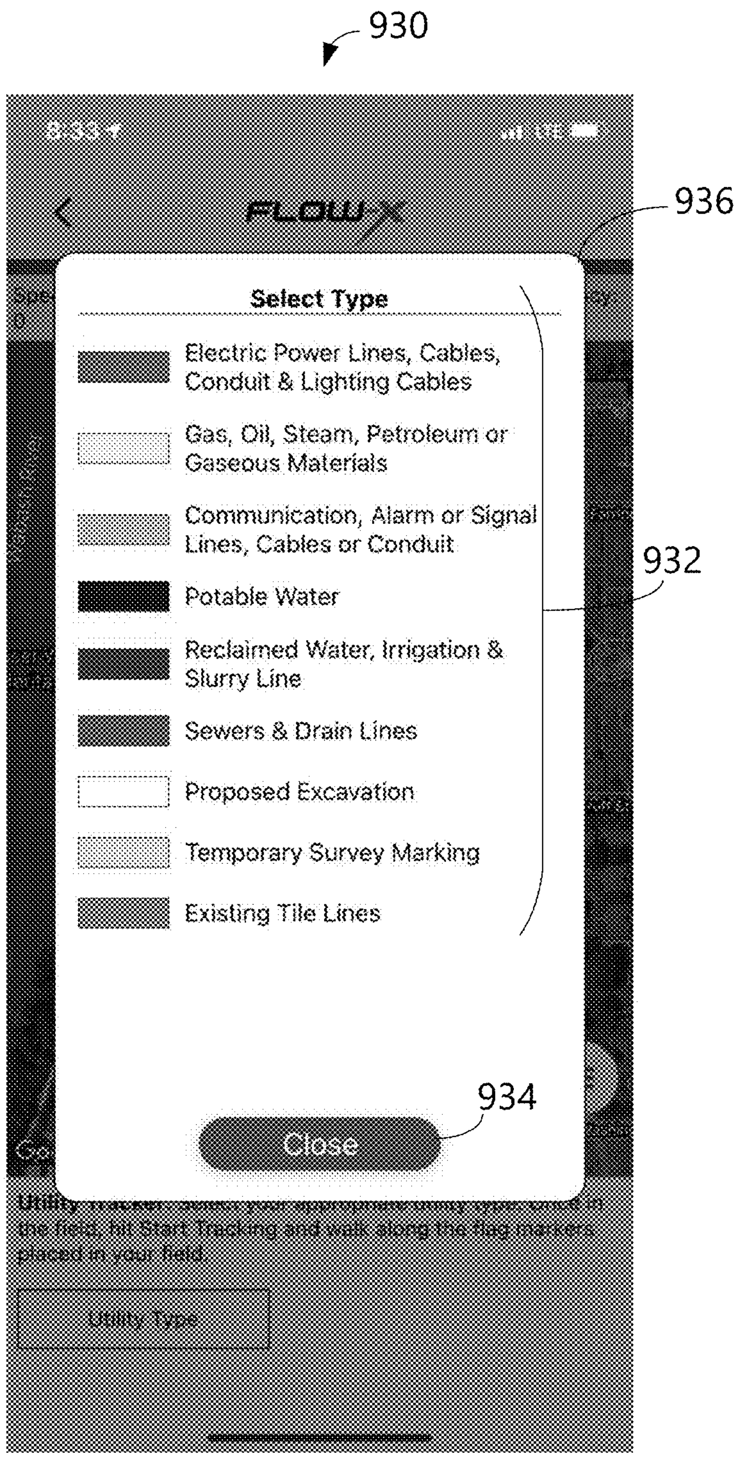
FIG. 93 is another screen display associated with the mobile app which allows users to select the type of utilities they want to track from a provided list.

FIG. 93 is a screen display 930 associate with mobile app which provides a note of utility type 936 to users for selecting the type of utilities they want to track from provided list. In response to the user selecting the "Utility Type" button 9212 in screen display 920 of FIG. 92. The utility type 936 includes a list of utility type 932 to select, and a "Close" button 934 to close.

Figure 94:
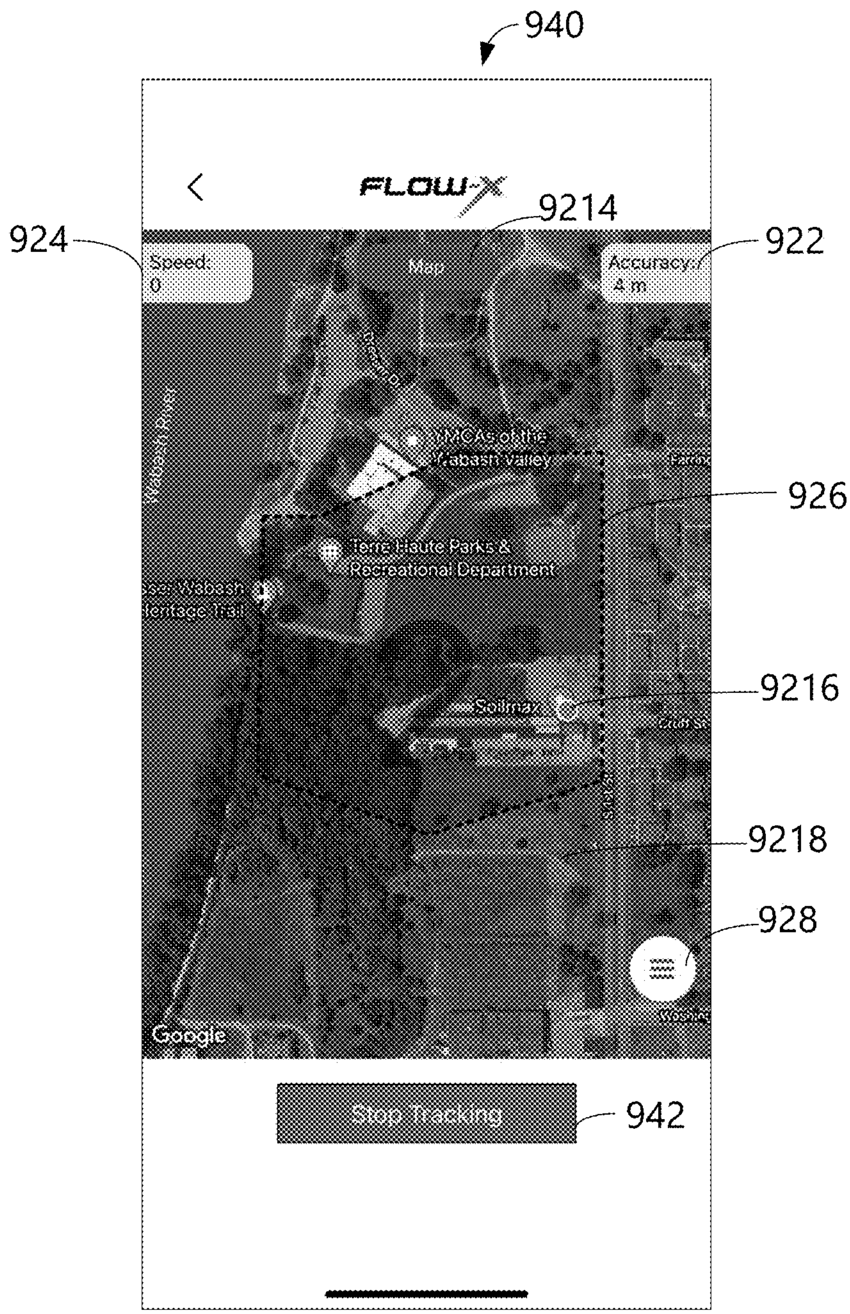
FIG. 94 is a screen display associated with the mobile app during the utility tracking process.

FIG. 94 is a screen display 940 associated with mobile app which shows users is in the utility tracking process after selected a type of utility in screen display 930 of FIG. 93. The user may walk or drive along marked utility lines. During the tracking process, the utility tracker 9216 will track the user in field 926 and will mark the path with the selected utility type. The user can press "Stop Tracking" button 942 to stop tracking.

Figure 95:
FIG. 95 is another screen display associated with mobile app which displays utilities location in real-time during user tracking.

FIG. 95 is a screen display 950 associated with a mobile app or web application which shows the utilities displayed in real-time as the user is tracking them. The real-time tracking displays the selected tracking field 926 with utility tracker 9216 and a tracked utilities line 952 on a map 9218. The user can press "Stop Tracking" button 942 to stop tracking.

Figure 96:
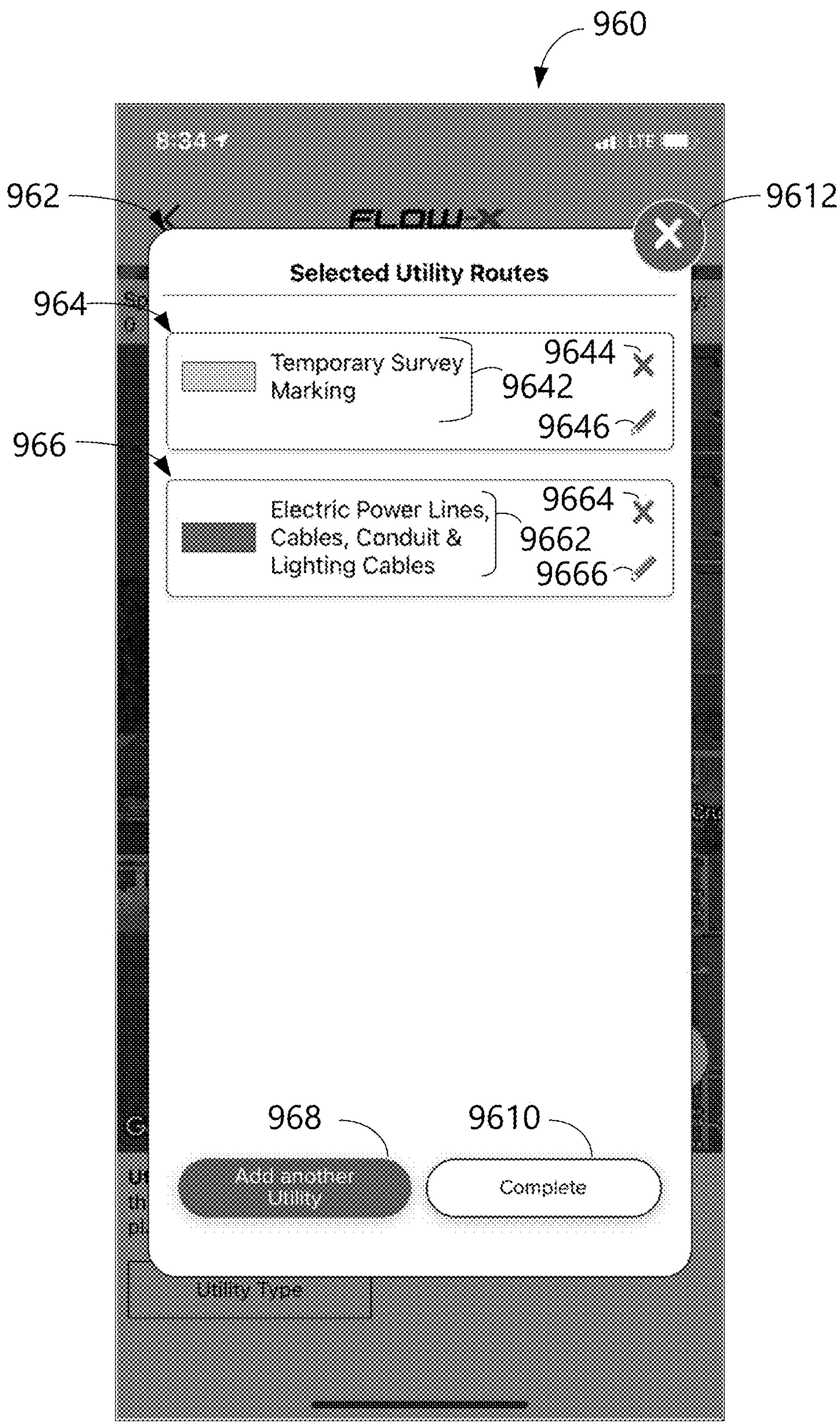
FIG. 96 is a screen display associated with mobile app which allows users to add more utilities.

FIG. 96 is a screen display 960 associated with mobile app which allows users to add more utilities. In response to users selecting the main menu button 928, a pop-up screen 962 displays existing utilities 964 and 966. The existing utilities includes the name of utilities, 9662, a delete button 9644,9664, and edit button 9646, 9666. The user may add another utility by selecting "Add another Utility" button 968, or complete editing by selecting the "Complete" button 9610, or close the window by selecting close button 9612.

Figure 97:
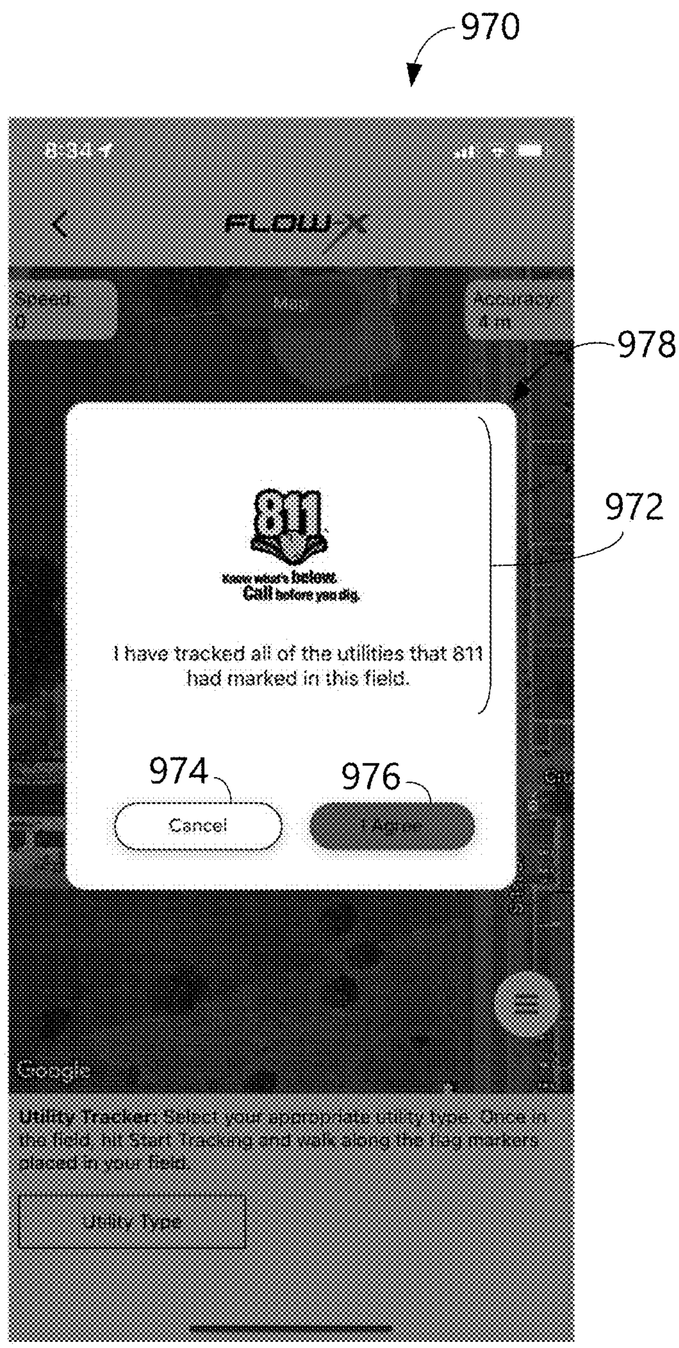
FIG. 97 is a screen display associated with mobile app which allows users to confirm they have tracked all utilities.

FIG. 97 is a screen display 970 associated with mobile app which allows users to confirm they have tracked all utilities. In response to the user selecting "Complete" button 9610, a confirmation page 978 will show a screen display 970. The confirmation page 978 includes a confirmation message 972, a "Cancel" button 974 to cancel, and a "I Agree" button 976 to confirm the message.

The methods described herein or aspects thereof may be incorporated into software in the form of instructions stored on a non-transitory computer or machine readable medium and executed on one or more processors.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments may be described herein as implementing mathematical methodologies including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a farm, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The invention is not to be limited to the particular embodiments described herein. In particular, the invention contemplates numerous variations in segmentation. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

Thus, the present disclosure provides for facilitating obtaining tile plans for users by collecting relevant information from the user through a user interface which assists in defining a field and specifying drainage outlets, utility locations, and other information. The present disclosure further provides for assigning tile planners to specific jobs for implementing tile plans. In addition, the present disclosure allows for one or more administrators to manage the system.

The present disclosure further allows for data to be collected or other information to be obtained from one or more external sources in order to help facilitate the process. For example, mapping data may be used which is obtained from Google or other mapping services. Weather data may be used which is obtained from one or more weather services. Elevation data for a field may be obtained from one or more government or commercial providers. Utility information may be provided by tracking a user using a location-enabled mobile device who travels along a path defining the utility line.

It should be understood that that the present disclosure provides numerous methods and features that may assist a user in specifying the information required for use by a tile planner in formulating a tile plan design. This includes features such as the ability to present a user with map and allow the user to define the boundaries of a field. In some examples, the system may provide for making suggestions as to the location of the boundaries of the field through use of image processing techniques. This further includes features such as the ability to allow a user to specify location of drainage tile outlets within in the field. In some examples, the system may provide for making suggestions as to locations for the drainage tile outlets such as through the use of elevation data for the field obtained from the user or from other data sources such as external databases or external sources. In some examples, the system may provide for identifying the location of utility lines such as by allowing a user to travel through the field with a location tracking enabled mobile device such as a GPS-enabled smart phone. This includes collecting data from the user regarding available equipment such that a tile plan can be constructed which is capable of being completed using the available equipment or is otherwise compatible with the available equipment. In some examples, the system may provide for an automated analysis of collected data. This data may include, for example, a determination of an area for a field, the length of drainage tile line or conduit required and estimated costs for implementing a tile plan. This automated analysis of collected data may be performed for a user prior to communicating the data to a tile planner. The automated analysis of collected data may further provide for additional recommendations or suggestions.

The invention is not to be limited to the particular embodiments described herein. In particular, the invention contemplates numerous variations in the user interface, the data collected from a user, the sources for mapping data, weather data, or elevation, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A method for drainage tile planning, the method comprising steps of:

presenting a first user interface on a display device to a user associated with a field in which drainage tile is to be installed, the first user interface including an interactive map;

defining a set of drainage tile plan requirements by receiving through the first user interface and from the user associated with the field by:

defining a boundary around the field by using the interactive map including the field and receiving through the interactive map and from the user associated with the field a plurality of selections by the user associated with the field of edges of the field displayed on the map, and defining at least one desired drainage outlet position within the field by receiving through the interactive map of the first user interface and from the user associated with the field a selection of the at least one desired drainage outlet position on the interactive map;

storing the set of drainage tile plan requirements on a non-transitory computer readable storage medium;

performing by at least one processor of a computing device an automated analysis of the drainage tile plan requirements received through the user interface;

presenting through the first user interface results of the analysis of the drainage tile plan requirements to the user associated with the field;

communicating over a network the set of drainage tile plan requirements and the analysis of the drainage tile plan requirements to a second user interface, the second user interface associated with a tile planner;

presenting through the second user interface the set of drainage tile plan requirements and the analysis of the drainage tile plan requirements;

receiving through the second user interface a tile plan from the tile planner;

storing the tile plan on the non-transitory computer readable storage medium;

communicating over the network the tile plan to the first user interface; and implementing the tile plan in the field using a tile plow having a tile plow model, a plow maximum depth, and boot sizes specified in the tile plan, wherein implementing includes installing drainage tile in the field based on the tile plan.

2. The method of claim 1 wherein the defining the set of drainage tile plan requirements by receiving through the first user interface and from the user associated with the field further includes defining location of a utility in the field by receiving through the first user interface and from the user associated with the field location information associated with the utility as the user travels a path within the field defining location of the utility and wherein location information is determined using a mobile computing device presenting the first user interface and having a global positioning system (GPS) receiver.

3. The method of claim 1 wherein the results of the analysis of the drainage tile plan requirements includes an estimate of an area of the field.

4. The method of claim 3 wherein the results of the analysis of the drainage tile plan requirements includes an estimate of the length of tile required for implementing a tile plan meeting the drainage tile plan requirements.

5. The method of claim 3 wherein the results of the analysis of the drainage tile plan requirements includes an estimate of cost for implementing a plan meeting the drainage tile plan requirements.

6. The method of claim 1 wherein the step of presenting a first user interface to a user associated with a field in which drainage tile is to be installed is performing using instructions executed by one or more processors of a server platform.

7. The method of claim 1 wherein the drainage tile plan separates the field into a plurality of different regions.

8. The method of claim 7 wherein a type of pipe is specified for each of the plurality of different regions and a length of pipe is specified for each type of pipe.

9. The method of claim 1 further comprises receiving as input through the first user interface elevation data for the field.

10. The method of claim 9 further comprising determining by the at least one processor of the computing device at least one proposed location for the at least one desired drainage outlet position and presenting through the first user interface the at least one proposed location for the at least one desired drainage outlet position.

11. The method of claim 10 wherein the determining by the at least one processor of the computing device the at least one proposed location for the at least one desired drainage outlet position is performed using the elevation data for the field.

12. The method of claim 1 further comprising receiving as input from a data source elevation data for the field.

13. The method of claim 12 further comprising determining by the at least one processor of the computing device at least one proposed location for the at least one desired drainage outlet position and presenting through the first user interface the at least one proposed location for the at least one desired drainage outlet position.

14. The method of claim 13 herein the determining by the at least one processor of the computing device the at least one proposed location for the at least one desired drainage outlet position is performed using the elevation data for the field.

15. The method of claim 1 further comprising receiving as input through the first user interface a desired tile spacing and a drain coefficient.

16. The method of claim 1 further comprising receiving as input through the first user interface equipment information wherein the equipment information includes a tile plow model, a plow maximum depth, and boot sizes available for the plow.

17. A method for drainage tile planning, the computer implemented method comprising steps of:

presenting a first user interface to a user associated with a field in which drainage tile is to be installed;

receiving as input from a data source or through the first user interface elevation data for the field;

determining by the at least one processor of the computing device and using the elevation data at least one proposed location for the at least one desired drainage outlet position and presenting through the first user interface the at least one proposed location for the at least one desired drainage outlet position;

defining a set of drainage tile plan requirements by receiving through the first user interface and from the user associated with the field by:

defining a boundary around the field by displaying an interactive map including the field and receiving through the first user interface and from the user associated with the field a plurality of selections by the user associated with the field of edges of the field displayed on the interactive map, and defining at least one desired drainage outlet position within the field by receiving through the user interface and from the user associated with the field a selection of the at least one desired drainage outlet position on the map;

storing the set of drainage tile plan requirements on a non-transitory computer readable storage medium;

performing by at least one processor of a computing device an automated analysis of the drainage tile plan requirements received through the user interface;

presenting through the first user interface results of the analysis of the drainage tile plan requirements to the user associated with the field;

communicating over a network the set of drainage tile plan requirements and the analysis of the drainage tile plan requirements to a second user interface, the second user interface associated with a tile planner;

presenting through the second user interface the set of drainage tile plan requirements and the analysis of the drainage tile plan requirements;

receiving through the second user interface a tile plan from the tile planner;

storing the tile plan on the non-transitory computer readable storage medium;

communicating over the network the tile plan to the first user interface;

implementing the tile plan in the field using a tile plow having a tile plow model, a plow maximum depth, and boot sizes specified in the tile plan, wherein implementing includes installing drainage tile in the field based on the tile plan.

18. The method of claim 17 wherein the defining the set of drainage tile plan requirements by receiving through the first user interface and from the user associated with the field further includes defining location of a utility in the field by receiving through the first user interface and from the user associated with the field location information associated with the utility as the user travels a path within the field defining location of the utility and wherein location information is determined using a mobile computing device presenting the first user interface and having a global positioning system (GPS) receiver.

* * * * *